United States Patent
Laroia et al.

(10) Patent No.: US 8,774,846 B2
(45) Date of Patent: Jul. 8, 2014

(54) METHODS AND APPARATUS RELATING TO WIRELESS TERMINAL BEACON SIGNAL GENERATION, TRANSMISSION, AND/OR USE

(75) Inventors: Rajiv Laroia, Far Hills, NJ (US); Sundeep Rangan, Jersey City, NJ (US); Arnab Das, Summit, NJ (US); Frank A. Lane, Asbury, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 508 days.

(21) Appl. No.: 11/621,955

(22) Filed: Jan. 10, 2007

(65) Prior Publication Data

US 2007/0247365 A1    Oct. 25, 2007

Related U.S. Application Data

(60) Provisional application No. 60/758,010, filed on Jan. 11, 2006, provisional application No. 60/758,011, filed on Jan. 11, 2006, provisional application No. 60/758,012, filed on Jan. 11, 2006, provisional application No. 60/845,052, filed on Sep. 15, 2006, provisional application No. 60/845,051, filed on Sep. 15, 2006, provisional application No. 60/863,304, filed on Oct. 27, 2006.

(51) Int. Cl.
*H04B 7/00* (2006.01)
*H04W 36/00* (2009.01)

(52) U.S. Cl.
USPC .......... 455/502; 455/41.2; 455/507; 455/436; 370/346; 370/336; 370/350

(58) Field of Classification Search
USPC ............... 455/41.2, 507, 436, 502, 466, 403; 370/336, 346, 350, 338, 208, 458; 375/260
See application file for complete search history.

(56) References Cited

U.S. PATENT DOCUMENTS

| 2,972,743 A | 2/1961 | Svensson et al. |
|---|---|---|
| 5,216,693 A | 6/1993 | Nakamura |

(Continued)

FOREIGN PATENT DOCUMENTS

| CN | 1310927 A | 8/2001 |
|---|---|---|
| CN | 1327354 A | 12/2001 |

(Continued)

OTHER PUBLICATIONS

International Search Report—PCT/US2007/060348, International Search Authority—European Patent Office—May 29, 2007.

(Continued)

*Primary Examiner* — Mahendra Patel
(74) *Attorney, Agent, or Firm* — James K. O'Hare

(57) ABSTRACT

A portable wireless terminal generates and transmits a beacon signal. The beacon signal includes a sequence of beacon signal bursts, each beacon signal burst including one or more beacon symbols. A beacon symbol is transmitted using the air link resources of a beacon symbol transmission unit at a relatively high transmission power level with respect to user data symbols transmitted from the same wireless terminal, thus facilitating easy detection by other wireless terminals. The beacon symbols of the beacon signal occupy a small fraction of the total available air link resources. Beacon signals can, and sometimes do, convey wireless terminal identification information, via the location of the beacon symbols within the portion of the air link resource reserved for beacon symbol transmission units.

68 Claims, 31 Drawing Sheets

(56) References Cited

U.S. PATENT DOCUMENTS

| | | |
|---|---|---|
| 5,233,627 A | 8/1993 | Kozima et al. |
| 5,535,425 A | 7/1996 | Watanabe |
| 5,583,870 A * | 12/1996 | Delprat et al. ............... 370/337 |
| 5,701,589 A | 12/1997 | Lee et al. |
| 5,726,893 A | 3/1998 | Schuchman et al. |
| 5,754,542 A | 5/1998 | Ault et al. |
| 5,805,575 A | 9/1998 | Kamin, Jr. |
| 5,818,871 A | 10/1998 | Blakeney, II et al. |
| 5,839,074 A | 11/1998 | Plehn |
| 5,844,900 A | 12/1998 | Hong et al. |
| 5,852,780 A | 12/1998 | Wang et al. |
| 5,903,618 A | 5/1999 | Miyake |
| 5,940,765 A * | 8/1999 | Haartsen ...................... 455/462 |
| 5,953,323 A | 9/1999 | Haartsen |
| 5,991,639 A | 11/1999 | Rautiola et al. |
| 5,995,500 A | 11/1999 | Ma |
| 5,995,844 A | 11/1999 | Fukuda |
| 6,011,515 A | 1/2000 | Radcliffe et al. |
| 6,047,178 A | 4/2000 | Frlan |
| 6,175,747 B1 | 1/2001 | Tanishima et al. |
| 6,230,012 B1 | 5/2001 | Willkie et al. |
| 6,377,608 B1 | 4/2002 | Zyren |
| 6,389,062 B1 | 5/2002 | Wu |
| 6,473,418 B1 | 10/2002 | Laroia et al. |
| 6,545,997 B1 | 4/2003 | Bohnke et al. |
| 6,574,266 B1 | 6/2003 | Haartsen |
| 6,580,981 B1 | 6/2003 | Masood et al. |
| 6,609,010 B1 | 8/2003 | Dolle et al. |
| 6,611,507 B1 | 8/2003 | Hottinen et al. |
| 6,614,769 B1 | 9/2003 | Erlick et al. |
| 6,650,629 B1 | 11/2003 | Takahashi et al. |
| 6,671,525 B2 | 12/2003 | Allen et al. |
| 6,725,058 B2 | 4/2004 | Rinne et al. |
| 6,728,232 B2 | 4/2004 | Hasty, Jr. et al. |
| 6,735,448 B1 | 5/2004 | Krishnamurthy et al. |
| 6,741,836 B2 | 5/2004 | Lee et al. |
| 6,744,743 B2 | 6/2004 | Walton et al. |
| 6,760,599 B1 | 7/2004 | Uhlik |
| 6,763,013 B2 | 7/2004 | Kennedy |
| 6,771,963 B1 | 8/2004 | Cheng et al. |
| 6,859,463 B1 | 2/2005 | Mayor et al. |
| 6,882,632 B1 | 4/2005 | Koo et al. |
| 6,882,851 B2 | 4/2005 | Sugar et al. |
| 6,920,171 B2 | 7/2005 | Souissi et al. |
| 6,922,388 B1 | 7/2005 | Laroia et al. |
| 6,934,299 B2 | 8/2005 | Kaatz |
| 6,940,827 B2 | 9/2005 | Li et al. |
| 6,940,843 B2 | 9/2005 | Goodall et al. |
| 6,975,600 B1 | 12/2005 | Vaughan et al. |
| 6,975,855 B1 | 12/2005 | Wallenius |
| 6,982,987 B2 | 1/2006 | Cain |
| 6,990,087 B2 | 1/2006 | Rao et al. |
| 7,006,451 B2 | 2/2006 | Kuwahara |
| 7,013,145 B1 | 3/2006 | Centore, III |
| 7,016,649 B1 | 3/2006 | Narasimhan et al. |
| 7,019,616 B2 | 3/2006 | Fernandez |
| 7,027,409 B2 | 4/2006 | Cain |
| 7,035,221 B2 | 4/2006 | Furukawa et al. |
| 7,039,372 B1 | 5/2006 | Sorrells et al. |
| 7,072,650 B2 | 7/2006 | Stanforth |
| 7,092,391 B2 | 8/2006 | Umeda |
| 7,130,368 B1 | 10/2006 | Aweya et al. |
| 7,133,697 B2 | 11/2006 | Judd et al. |
| 7,136,655 B2 | 11/2006 | Skafidas et al. |
| 7,146,130 B2 | 12/2006 | Hsu et al. |
| 7,149,201 B2 | 12/2006 | Hunzinger |
| 7,164,885 B2 | 1/2007 | Jonsson et al. |
| 7,167,463 B2 | 1/2007 | Alapuranen |
| 7,174,187 B1 | 2/2007 | Ngan |
| 7,218,689 B2 | 5/2007 | Gupta |
| 7,224,954 B2 | 5/2007 | Okajima et al. |
| 7,228,138 B2 | 6/2007 | Hansson et al. |
| 7,233,602 B2 | 6/2007 | Chen et al. |
| 7,246,235 B2 | 7/2007 | Ellison et al. |
| 7,248,570 B2 | 7/2007 | Bahl et al. |
| 7,260,399 B1 | 8/2007 | Oh et al. |
| 7,269,169 B1 | 9/2007 | Venkataraman et al. |
| 7,280,467 B2 | 10/2007 | Smee et al. |
| 7,280,810 B2 | 10/2007 | Feher |
| 7,313,628 B2 | 12/2007 | Chaskar et al. |
| 7,333,829 B2 | 2/2008 | Malone et al. |
| 7,336,626 B1 | 2/2008 | Barratt et al. |
| 7,336,927 B2 | 2/2008 | Diaz Cervera et al. |
| 7,339,883 B2 | 3/2008 | Santhoff et al. |
| 7,342,834 B2 | 3/2008 | Ishibashi |
| 7,342,896 B2 | 3/2008 | Ayyagari |
| 7,342,900 B2 | 3/2008 | Xiong et al. |
| 7,352,733 B2 | 4/2008 | Green |
| 7,366,200 B2 | 4/2008 | Laroia et al. |
| 7,378,953 B2 | 5/2008 | Coronel et al. |
| 7,388,845 B2 | 6/2008 | Laroia et al. |
| 7,388,857 B2 | 6/2008 | Sharma |
| 7,401,224 B2 | 7/2008 | Gantman et al. |
| 7,426,396 B2 | 9/2008 | Iwasaki et al. |
| 7,440,754 B2 | 10/2008 | Bahl et al. |
| 7,457,646 B2 | 11/2008 | Mahany et al. |
| 7,477,897 B2 | 1/2009 | Bye |
| 7,493,149 B1 | 2/2009 | Doyle et al. |
| 7,499,418 B2 | 3/2009 | Oprescu-Surcobe et al. |
| 7,502,341 B2 | 3/2009 | Matoba et al. |
| 7,512,096 B2 | 3/2009 | Kuzminskiy et al. |
| 7,545,771 B2 | 6/2009 | Wentink et al. |
| 7,548,758 B2 | 6/2009 | Periyalwar et al. |
| 7,570,969 B2 | 8/2009 | Hwang et al. |
| 7,586,881 B2 | 9/2009 | Hansen et al. |
| 7,590,183 B2 | 9/2009 | Yonge, III |
| 7,613,426 B2 | 11/2009 | Kuehnel et al. |
| 7,626,975 B2 | 12/2009 | Colban et al. |
| 7,653,011 B2 | 1/2010 | Rahman et al. |
| 7,657,276 B2 | 2/2010 | Sakoda |
| 7,660,595 B2 | 2/2010 | Ramaswamy et al. |
| 7,664,055 B2 | 2/2010 | Nelson |
| 7,664,130 B2 | 2/2010 | Sakoda et al. |
| 7,720,029 B2 | 5/2010 | Orava et al. |
| 7,720,172 B2 | 5/2010 | Nakagawa et al. |
| 7,724,713 B2 | 5/2010 | Del Prado Pavon et al. |
| 7,729,240 B1 | 6/2010 | Crane et al. |
| 7,756,521 B2 | 7/2010 | Gerlach et al. |
| 7,925,010 B2 | 4/2011 | Sannino et al. |
| 8,542,658 B2 | 9/2013 | Laroia et al. |
| 8,554,226 B2 | 10/2013 | Laroia et al. |
| 2001/0055980 A1 | 12/2001 | Sato |
| 2002/0105970 A1* | 8/2002 | Shvodian ...................... 370/468 |
| 2002/0128049 A1 | 9/2002 | Davis |
| 2002/0131121 A1 | 9/2002 | Jeganathan et al. |
| 2002/0131386 A1 | 9/2002 | Gwon |
| 2002/0193945 A1 | 12/2002 | Tan et al. |
| 2002/0196771 A1 | 12/2002 | Vij et al. |
| 2002/0196844 A1 | 12/2002 | Rafie et al. |
| 2003/0002482 A1 | 1/2003 | Kubler et al. |
| 2003/0007473 A1 | 1/2003 | Strong et al. |
| 2003/0012188 A1 | 1/2003 | Zelig et al. |
| 2003/0054818 A1 | 3/2003 | Bahl |
| 2003/0063655 A1 | 4/2003 | Young |
| 2003/0069035 A1 | 4/2003 | Shurvinton |
| 2003/0078031 A1 | 4/2003 | Masuda |
| 2003/0078037 A1 | 4/2003 | Auckland et al. |
| 2003/0108016 A1 | 6/2003 | Bonta |
| 2003/0128659 A1 | 7/2003 | Hirsch |
| 2003/0128690 A1* | 7/2003 | Elliott et al. .................. 370/351 |
| 2003/0142631 A1 | 7/2003 | Silvester |
| 2003/0145064 A1 | 7/2003 | Hsu et al. |
| 2003/0169697 A1 | 9/2003 | Suzuki et al. |
| 2003/0174067 A1 | 9/2003 | Soliman |
| 2003/0217266 A1 | 11/2003 | Epp et al. |
| 2004/0005904 A1 | 1/2004 | Wolf et al. |
| 2004/0008661 A1 | 1/2004 | Myles |
| 2004/0009781 A1 | 1/2004 | Andrews et al. |
| 2004/0028003 A1 | 2/2004 | Diener |
| 2004/0032536 A1 | 2/2004 | Islam et al. |
| 2004/0047324 A1 | 3/2004 | Diener |
| 2004/0057400 A1 | 3/2004 | Walsh et al. |
| 2004/0063458 A1 | 4/2004 | Hori |
| 2004/0064568 A1 | 4/2004 | Arora |

(56) References Cited

U.S. PATENT DOCUMENTS

| | | |
|---|---|---|
| 2004/0067773 A1 | 4/2004 | Rachabathuni et al. |
| 2004/0072558 A1 | 4/2004 | Van Bosch |
| 2004/0077346 A1 | 4/2004 | Krenik et al. |
| 2004/0077366 A1 | 4/2004 | Panasik et al. |
| 2004/0081117 A1 | 4/2004 | Malek et al. |
| 2004/0082326 A1 | 4/2004 | Shaw et al. |
| 2004/0082356 A1 | 4/2004 | Walton et al. |
| 2004/0090924 A1 | 5/2004 | Giaimo |
| 2004/0095902 A1 | 5/2004 | Laroia et al. |
| 2004/0095904 A1 | 5/2004 | Laroia et al. |
| 2004/0106401 A1 | 6/2004 | Ormson |
| 2004/0114521 A1 | 6/2004 | Sugaya |
| 2004/0125776 A1 | 7/2004 | Haugli et al. |
| 2004/0125778 A1 | 7/2004 | Lin et al. |
| 2004/0127204 A1 | 7/2004 | Belmont |
| 2004/0127214 A1 | 7/2004 | Reddy |
| 2004/0127240 A1 | 7/2004 | Li |
| 2004/0133689 A1 | 7/2004 | Vasisht |
| 2004/0145604 A1 | 7/2004 | Min |
| 2004/0147223 A1 | 7/2004 | Cho |
| 2004/0152464 A1 | 8/2004 | Sugaya |
| 2004/0162871 A1 | 8/2004 | Pabla et al. |
| 2004/0165563 A1 | 8/2004 | Hsu et al. |
| 2004/0176059 A1 | 9/2004 | Hayem et al. |
| 2004/0190483 A1 | 9/2004 | Shahaf et al. |
| 2004/0203762 A1 | 10/2004 | Liu et al. |
| 2004/0204850 A1 | 10/2004 | MacNeille |
| 2004/0240401 A1 | 12/2004 | Willenegger et al. |
| 2004/0240405 A1 | 12/2004 | Okazaki |
| 2004/0240476 A1 | 12/2004 | Joshi |
| 2004/0249448 A1 | 12/2004 | Gault |
| 2004/0258006 A1* | 12/2004 | An .................. 370/310 |
| 2004/0259529 A1 | 12/2004 | Suzuki |
| 2005/0009578 A1 | 1/2005 | Liu |
| 2005/0025092 A1 | 2/2005 | Morioka |
| 2005/0037754 A1 | 2/2005 | Liu et al. |
| 2005/0058102 A1 | 3/2005 | Santhoff et al. |
| 2005/0058117 A1 | 3/2005 | Morioka et al. |
| 2005/0058229 A1 | 3/2005 | Alagha |
| 2005/0060535 A1 | 3/2005 | Bartas |
| 2005/0063344 A1 | 3/2005 | Winzell |
| 2005/0063416 A1 | 3/2005 | Shin et al. |
| 2005/0068934 A1* | 3/2005 | Sakoda ............ 370/350 |
| 2005/0075118 A1 | 4/2005 | Lewis et al. |
| 2005/0085190 A1 | 4/2005 | Nishikawa |
| 2005/0085214 A1* | 4/2005 | Laroia et al. ........ 455/403 |
| 2005/0088980 A1 | 4/2005 | Olkkonen et al. |
| 2005/0090266 A1 | 4/2005 | Sheynblat |
| 2005/0105491 A1 | 5/2005 | Chaskar et al. |
| 2005/0111397 A1 | 5/2005 | Attar et al. |
| 2005/0117525 A1 | 6/2005 | Poustchi |
| 2005/0117530 A1 | 6/2005 | Abraham |
| 2005/0128991 A1* | 6/2005 | Dayanandan et al. ........ 370/338 |
| 2005/0129221 A1 | 6/2005 | Dickens et al. |
| 2005/0135295 A1 | 6/2005 | Walton |
| 2005/0143119 A1 | 6/2005 | Chandra et al. |
| 2005/0152280 A1 | 7/2005 | Pollin et al. |
| 2005/0153736 A1 | 7/2005 | Ganton |
| 2005/0157660 A1 | 7/2005 | Mandato et al. |
| 2005/0176371 A1 | 8/2005 | Palin et al. |
| 2005/0177639 A1* | 8/2005 | Reunamaki et al. ........ 709/227 |
| 2005/0185628 A1 | 8/2005 | Watanabe et al. |
| 2005/0185669 A1 | 8/2005 | Welborn et al. |
| 2005/0201308 A1 | 9/2005 | Sekiya et al. |
| 2005/0220201 A1 | 10/2005 | Laroia et al. |
| 2005/0226175 A1 | 10/2005 | Gupta |
| 2005/0227692 A1 | 10/2005 | Kawashima et al. |
| 2005/0227698 A1 | 10/2005 | Nonin et al. |
| 2005/0233742 A1 | 10/2005 | Karaoguz et al. |
| 2005/0233746 A1 | 10/2005 | Laroia et al. |
| 2005/0238083 A1 | 10/2005 | Laroia et al. |
| 2005/0250469 A1 | 11/2005 | Laroia et al. |
| 2005/0254435 A1 | 11/2005 | Moakley et al. |
| 2005/0265218 A1 | 12/2005 | Molisch et al. |
| 2005/0265221 A1 | 12/2005 | Batra et al. |
| 2005/0276243 A1 | 12/2005 | Sugaya et al. |
| 2005/0281320 A1 | 12/2005 | Neugebauer |
| 2005/0286477 A1 | 12/2005 | Gupta et al. |
| 2006/0013160 A1 | 1/2006 | Haartsen |
| 2006/0014542 A1 | 1/2006 | Khandekar et al. |
| 2006/0019660 A1 | 1/2006 | Li |
| 2006/0020556 A1 | 1/2006 | Hamnen |
| 2006/0023686 A1 | 2/2006 | Jeong et al. |
| 2006/0025151 A1 | 2/2006 | Karaoguz et al. |
| 2006/0031583 A1 | 2/2006 | Fujii et al. |
| 2006/0034315 A1 | 2/2006 | Maekawa et al. |
| 2006/0039332 A1 | 2/2006 | Kotzin |
| 2006/0046728 A1 | 3/2006 | Jung et al. |
| 2006/0058059 A1 | 3/2006 | Kim |
| 2006/0073847 A1 | 4/2006 | Pirzada et al. |
| 2006/0083199 A1 | 4/2006 | Yang |
| 2006/0088010 A1 | 4/2006 | Buchwald et al. |
| 2006/0089099 A1 | 4/2006 | Buchwald et al. |
| 2006/0094456 A1 | 5/2006 | Rittle et al. |
| 2006/0105741 A1 | 5/2006 | Suh et al. |
| 2006/0111104 A1 | 5/2006 | Hyslop |
| 2006/0114853 A1 | 6/2006 | Hasty et al. |
| 2006/0116113 A1 | 6/2006 | Gass |
| 2006/0116877 A1 | 6/2006 | Pickering et al. |
| 2006/0178131 A1 | 8/2006 | Huotari et al. |
| 2006/0203789 A1 | 9/2006 | Iacono et al. |
| 2006/0203795 A1* | 9/2006 | Welborn et al. ............ 370/345 |
| 2006/0215611 A1 | 9/2006 | Nakagawa et al. |
| 2006/0223511 A1 | 10/2006 | Hagale et al. |
| 2006/0223574 A1 | 10/2006 | Chandra |
| 2006/0233125 A1 | 10/2006 | Pajukoski et al. |
| 2006/0251017 A1 | 11/2006 | Bishop |
| 2006/0253736 A1 | 11/2006 | Rudolf et al. |
| 2007/0019717 A1 | 1/2007 | Laroia et al. |
| 2007/0054624 A1 | 3/2007 | Kashiwagi |
| 2007/0064742 A1 | 3/2007 | Shvodian |
| 2007/0066360 A1 | 3/2007 | Sato et al. |
| 2007/0070179 A1 | 3/2007 | van Rooyen |
| 2007/0086424 A1* | 4/2007 | Calcev et al. ............ 370/350 |
| 2007/0097922 A1 | 5/2007 | Parekh et al. |
| 2007/0100222 A1 | 5/2007 | Mastrototaro et al. |
| 2007/0104138 A1 | 5/2007 | Rudolf et al. |
| 2007/0111734 A1 | 5/2007 | Beppu et al. |
| 2007/0136459 A1 | 6/2007 | Roche et al. |
| 2007/0142084 A1 | 6/2007 | Van Niekerk et al. |
| 2007/0153729 A1 | 7/2007 | Alapuranen |
| 2007/0160016 A1 | 7/2007 | Jain |
| 2007/0165589 A1 | 7/2007 | Sakoda |
| 2007/0201423 A1 | 8/2007 | Laroia et al. |
| 2007/0206554 A1 | 9/2007 | Laroia et al. |
| 2007/0211677 A1 | 9/2007 | Laroia et al. |
| 2007/0211678 A1 | 9/2007 | Li et al. |
| 2007/0211679 A1 | 9/2007 | Laroia et al. |
| 2007/0211680 A1 | 9/2007 | Laroia et al. |
| 2007/0213046 A1 | 9/2007 | Li et al. |
| 2007/0254596 A1 | 11/2007 | Corson et al. |
| 2007/0255960 A1 | 11/2007 | Hon et al. |
| 2007/0270190 A1 | 11/2007 | Hisky et al. |
| 2007/0274275 A1 | 11/2007 | Laroia et al. |
| 2007/0274276 A1 | 11/2007 | Laroia et al. |
| 2007/0286111 A1 | 12/2007 | Corson et al. |
| 2007/0291714 A1 | 12/2007 | Laroia et al. |
| 2007/0291715 A1 | 12/2007 | Laroia et al. |
| 2008/0002647 A1 | 1/2008 | Laroia et al. |
| 2008/0002648 A1 | 1/2008 | Laroia et al. |
| 2008/0013519 A1 | 1/2008 | Kwon et al. |
| 2008/0031193 A1 | 2/2008 | Laroia et al. |
| 2008/0037487 A1 | 2/2008 | Li et al. |
| 2008/0039066 A1 | 2/2008 | Laroia et al. |
| 2008/0043656 A1 | 2/2008 | Yoon et al. |
| 2008/0069072 A1* | 3/2008 | Callaway et al. ............ 370/342 |
| 2008/0075033 A1 | 3/2008 | Shattil |
| 2008/0112334 A1 | 5/2008 | Laroia et al. |
| 2008/0123600 A1 | 5/2008 | Fodor |
| 2008/0212651 A1 | 9/2008 | Santhoff et al. |
| 2008/0212771 A1 | 9/2008 | Hauser |
| 2008/0318612 A1 | 12/2008 | Axnas et al. |
| 2009/0017858 A1 | 1/2009 | Kwon et al. |
| 2009/0040996 A1 | 2/2009 | Laroia et al. |

(56) References Cited

U.S. PATENT DOCUMENTS

| | | | |
|---|---|---|---|
| 2009/0059841 A1 | 3/2009 | Laroia et al. | |
| 2009/0092075 A1 | 4/2009 | Corson et al. | |
| 2009/0190558 A1 | 7/2009 | Strutt et al. | |
| 2009/0282253 A1 | 11/2009 | Rose et al. | |
| 2009/0296669 A1 | 12/2009 | Uchiyama et al. | |
| 2010/0128652 A1 | 5/2010 | Lee et al. | |
| 2013/0343283 A1 | 12/2013 | Laroia | |

FOREIGN PATENT DOCUMENTS

| | | | |
|---|---|---|---|
| CN | 1371583 A | 9/2002 | |
| CN | 1397117 A | 2/2003 | |
| CN | 1411237 | 4/2003 | |
| CN | 1578314 A | 2/2005 | |
| CN | 1596005 A | 3/2005 | |
| CN | 1650594 A | 8/2005 | |
| CN | 1663156 | 8/2005 | |
| CN | 1689345 A | 10/2005 | |
| CN | 1909386 A | 2/2007 | |
| EP | 0469659 A1 | 2/1992 | |
| EP | 0776134 A2 | 5/1997 | |
| EP | 0848567 A1 | 6/1998 | |
| EP | 0969602 A1 | 1/2000 | |
| EP | 1089586 A1 | 4/2001 | |
| EP | 1119137 A1 | 7/2001 | |
| EP | 1241838 A2 | 9/2002 | |
| EP | 1326386 A1 | 7/2003 | |
| EP | 1408651 A1 | 4/2004 | |
| EP | 1469659 A1 | 10/2004 | |
| EP | 1496668 | 1/2005 | |
| EP | 1549094 A1 | 6/2005 | |
| EP | 1562333 | 8/2005 | |
| EP | 1566944 | 8/2005 | |
| EP | 1592176 A1 | 11/2005 | |
| EP | 1670183 A1 | 6/2006 | |
| EP | 1895714 A1 | 3/2008 | |
| EP | 2312885 A1 | 4/2011 | |
| GB | 232251 A1 | 3/1926 | |
| GB | 2375014 A1 | 10/2002 | |
| GB | 2410653 A | 8/2005 | |
| JP | 7023465 | 1/1995 | |
| JP | 07143567 | 6/1995 | |
| JP | 8307934 | 11/1996 | |
| JP | 9107583 | 4/1997 | |
| JP | 10013324 | 1/1998 | |
| JP | 11289583 A | 10/1999 | |
| JP | 11355291 | 12/1999 | |
| JP | 2001069060 A | 3/2001 | |
| JP | 2001069557 A | 3/2001 | |
| JP | 2001118191 A | 4/2001 | |
| JP | 2002502164 A | 1/2002 | |
| JP | 2002112347 A | 4/2002 | |
| JP | 2002208891 A | 7/2002 | |
| JP | 2002223470 | 8/2002 | |
| JP | 2002232337 A | 8/2002 | |
| JP | 2002325281 A | 11/2002 | |
| JP | 2002344458 A | 11/2002 | |
| JP | 2003503920 | 1/2003 | |
| JP | 2003143644 A | 5/2003 | |
| JP | 2003158525 A | 5/2003 | |
| JP | 2003249939 A | 9/2003 | |
| JP | 2003258703 A | 9/2003 | |
| JP | 2003348636 A | 12/2003 | |
| JP | 2004032462 A | 1/2004 | |
| JP | 2004053510 A | 2/2004 | |
| JP | 2004128785 A | 4/2004 | |
| JP | 2004146883 A | 5/2004 | |
| JP | 2004147015 A | 5/2004 | |
| JP | 2004180297 A | 6/2004 | |
| JP | 2004242187 A | 8/2004 | |
| JP | 2004247820 A | 9/2004 | |
| JP | 2004254254 A | 9/2004 | |
| JP | 2004260258 A | 9/2004 | |
| JP | 2004260748 A | 9/2004 | |
| JP | 2004336351 A | 11/2004 | |
| JP | 2004533762 A | 11/2004 | |
| JP | 2004349777 A | 12/2004 | |
| JP | 2004350168 A | 12/2004 | |
| JP | 2004363877 A | 12/2004 | |
| JP | 2005033808 A | 2/2005 | |
| JP | 2005045368 | 2/2005 | |
| JP | 2005065101 A | 3/2005 | |
| JP | 2005072910 A | 3/2005 | |
| JP | 2005086234 A | 3/2005 | |
| JP | 2005086408 | 3/2005 | |
| JP | 2005124121 A | 5/2005 | |
| JP | 2005136529 A | 5/2005 | |
| JP | 2005151525 A | 6/2005 | |
| JP | 2005167502 A | 6/2005 | |
| JP | 2005210703 A | 8/2005 | |
| JP | 2005223722 A | 8/2005 | |
| JP | 2005223767 A | 8/2005 | |
| JP | 2005523616 A | 8/2005 | |
| JP | 2005236819 A | 9/2005 | |
| JP | 2005244698 A | 9/2005 | |
| JP | 2005252645 A | 9/2005 | |
| JP | 2005253038 A | 9/2005 | |
| JP | 2005253047 A | 9/2005 | |
| JP | 2005277599 A | 10/2005 | |
| JP | 2005277815 A | 10/2005 | |
| JP | 2005295400 | 10/2005 | |
| JP | 2005328231 | 11/2005 | |
| JP | 2005348203 | 12/2005 | |
| JP | 2005354326 A | 12/2005 | |
| JP | 2005537762 T | 12/2005 | |
| JP | 2006005792 A | 1/2006 | |
| JP | 2006501777 A | 1/2006 | |
| JP | 2007509531 | 4/2007 | |
| JP | 2007525891 A | 9/2007 | |
| JP | 2007533256 | 11/2007 | |
| JP | 2008507219 T | 3/2008 | |
| JP | 2008228128 A | 9/2008 | |
| JP | 4927869 | 2/2012 | |
| KR | 960012088 B1 | 9/1996 | |
| KR | 100225765 B1 | 10/1999 | |
| KR | 20000035806 A | 6/2000 | |
| KR | 20000076038 | 12/2000 | |
| KR | 10362135 | 11/2002 | |
| KR | 20030024435 A | 3/2003 | |
| TW | 545006 B | 8/2003 | |
| TW | I230525 | 4/2005 | |
| TW | I239782 | 9/2005 | |
| TW | M286515 | 1/2006 | |
| TW | I250742 | 3/2006 | |
| TW | M292848 | 6/2006 | |
| WO | WO9701256 | 1/1997 | |
| WO | WO9749258 | 12/1997 | |
| WO | WO9808321 | 2/1998 | |
| WO | 9839938 A2 | 9/1998 | |
| WO | WO0074429 | 12/2000 | |
| WO | WO0101717 A1 | 1/2001 | |
| WO | 0192992 A2 | 12/2001 | |
| WO | 0223758 | 3/2002 | |
| WO | WO0249387 A1 | 6/2002 | |
| WO | 02078271 A1 | 10/2002 | |
| WO | 02082742 A1 | 10/2002 | |
| WO | 02091623 A1 | 11/2002 | |
| WO | WO03001742 | 1/2003 | |
| WO | 03039054 | 5/2003 | |
| WO | WO-03039064 A1 | 5/2003 | |
| WO | WO03090037 A2 | 10/2003 | |
| WO | 2004012464 A2 | 2/2004 | |
| WO | 2004019529 A2 | 3/2004 | |
| WO | WO2004023241 A2 | 3/2004 | |
| WO | 2004032536 A2 | 4/2004 | |
| WO | WO2004047348 A1 | 6/2004 | |
| WO | WO2004066646 A1 | 8/2004 | |
| WO | WO2004071022 A1 | 8/2004 | |
| WO | 2004080103 A1 | 9/2004 | |
| WO | WO2004077920 A2 | 9/2004 | |
| WO | 2005022846 A1 | 3/2005 | |
| WO | WO2005020517 | 3/2005 | |
| WO | WO2005027556 A1 | 3/2005 | |

(56) References Cited

FOREIGN PATENT DOCUMENTS

| WO | 2005038606 A2 | 4/2005 |
|---|---|---|
| WO | 2005039105 A1 | 4/2005 |
| WO | WO2005034433 A1 | 4/2005 |
| WO | WO2005038606 | 4/2005 |
| WO | WO2005039128 | 4/2005 |
| WO | 2005053346 A1 | 6/2005 |
| WO | 2005053347 A1 | 6/2005 |
| WO | WO2005013529 | 6/2005 |
| WO | WO2005053253 | 6/2005 |
| WO | WO2005055527 | 6/2005 |
| WO | WO2005060209 A1 | 6/2005 |
| WO | WO2005062552 A1 | 7/2005 |
| WO | 2005071998 A1 | 8/2005 |
| WO | 2005076543 A1 | 8/2005 |
| WO | WO2005079012 A1 | 8/2005 |
| WO | 2005109657 A1 | 11/2005 |
| WO | WO2005109916 | 11/2005 |
| WO | WO2005109917 A1 | 11/2005 |
| WO | 2005117463 A1 | 12/2005 |
| WO | WO2005119478 | 12/2005 |
| WO | 2006000617 A1 | 1/2006 |
| WO | 2006006138 A1 | 1/2006 |
| WO | 2006007946 A1 | 1/2006 |
| WO | WO2006057815 | 6/2006 |
| WO | WO2006138122 A2 | 12/2006 |
| WO | 2007038896 A2 | 4/2007 |
| WO | 2007082247 | 7/2007 |
| WO | 2007082281 | 7/2007 |
| WO | WO2008014336 A2 | 1/2008 |
| WO | 2008020162 A2 | 2/2008 |
| WO | 2008072346 A1 | 6/2008 |

OTHER PUBLICATIONS

Written Opinion—PCT/US2007/060348, International Search Authority—European Patent Office—May 29, 2007.
International Preliminary Report on Patentability—PCT/US2007/060348, International Search Authority—The International Bureau of WIPO—Geneva, Switzerland—Jul. 15, 2008.
Costa-Requena J. et al: "Incentive Problem for Ad Hoc Networks Scalability" Autonomic and Autonomous Systems and International Conference on Networking and Services, 2005. ICAS-ICNS 2005. Joint International Conference on Papette, Tahiti Oct. 23-28, 2005, Piscataway, NJ, USA, IEEE, Oct. 23, 2005, pp. 70-70, XP010864809.
European Search Report—EP10176878—Search Authority—Munich—Apr. 11, 2011.
European Search Report—EP10178266—Search Authority—Munich—Apr. 5, 2011.
European Search Report—EP10189181, Search Authority—Munich Patent Office, Mar. 9, 2011.
European Search Report—EP10189182—Search Authority—Munich—Mar. 10, 2011.
European Search Report—EP10191747—Search Authority—Munich—Mar. 18, 2011.
European Search Report—EP11150402—Search Authority—Munich—Mar. 14, 2011.
European Search Report—EP11150397—Search Authority—Munich—Mar. 15, 2011.
Taiwan Search Report—096101138—TIPO—Jan. 4, 2011.
Taiwan Search Report—TW096101103—TIPO—Jan. 28, 2011.
Taiwan Search Report—TW096101104—TIPO—Jan. 27, 2011.
Taiwan Search Report—TW096101119—TIPO—Mar. 10, 2011.
Taiwan Search Report—TW096101125—TIPO—Nov. 5, 2010.
Taiwan Search Report—TW096101130—TIPO—Jan. 14, 2011.
Taiwan Search Report—TW096101132—TIPO—Jan. 31, 2011.
Translation of Office Action in Japan application 2008-550500 corresponding to U.S. Appl. No. 11/621,984, citing Niels_Hoven_et_al_pgs_250_255_year_2005, JP2005354326, JP2005151525, JP2001069060, JP2002232337 and JP2005537762 dated Mar. 29, 2011.
Translation of Office Action in Japan application 2008-550506 corresponding to U.S. Appl. No. 11/621,966, citing JP9107583, JP10013324, JP2003249939 and JP11355291 dated Mar. 29, 2011.
Translation of Office Action in Japan application 2008-550523 corresponding to U.S. Appl. No. 11/621,990, citing JP2004349777, JP2004336351, JP2005065101, JP2004260748, JP2004242187 and JP20042542542 dated Mar. 29, 2011.
Translation of Office Action in Korean Application 2008-7019606 corresponding to U.S. Appl. No. 11/621,967, citing GB2375014 and US20050025092 dated Feb. 23, 2011.
European Search Report—EP10166886, Search Authority—Munich Patent Office, Aug. 2, 2010.
European Search Report—EP10187769 ,Search Authority—Munich Patent Office, Dec. 2, 2010.
Juels, A. et al.: "Client Puzzles: A Cryptographic Countermeasure Against Connection Depletion Attacks" Proceedings of NDSS. Networks and Distributed Security Systems, XX, XX, Feb. 3, 1999, pp. 151-165, XP002340691 paragraph [0001] paragraph [0003.
Niels Hoven, Anant Sahai; "Power Scaling for Cognitive Radio"; 2005 International Conference on Wireless Networks, Communications and Mobile Computing; pp. 250-255.
Taiwanese Search report—096101127—TIPO—Jul. 16, 2010.
Waters, B. et al.: "New Client Puzzle Outsourcing Techniques for DoS Resistance" CCS'04, Oct. 29, 2004, pp. 1-11, XP002538930 Washington, DC, USA abstract paragraph [01.2].
IEEE Computer Society, Part 15.4: Wireless Medium Access Control (MAC) and Physical Layer (PHY) Specifications for Low-Rate Wireless Personal Area Network (LRWPANs), IEEE Std 802. 15.4 (TM)—2003, The United States of America, IEEE, Oct. 1, 2003, pp. 13 to 21, 45 to 47, 111 to 120, and 147 to 153.
IEEE Computer Society, Part 15.3: Wireless Medium Access Control (MAC) and Physical Layer (PHY) Specifications for High Rate Wireless Personal Area Networks (WPANs), IEEE Std 802. 15. 3 (TM)—2003, The United States of America, IEEE, Sep. 29, 2003, pp. 164 and 165.
IEEE, Part 15.3: Wireless Medium Access Control (MAC) and Physical Layer (PHY) Specifications for High Rate Wireless Personal Area Networks (WPANs), 802.15.3, The United States of America, IEEE, Sep. 29, 2003, IEEE Std 802. 15. Mar. 2003, pp. 8 to 16, 108 to 111,116 to 117, 170 to 171,and 204 to206.
Wada, Y. et al., "Consideration of OFDM Cellular System Using Single Band", IEICE Year 2002 Communication Society Convention Lecture Papers 1, Sep. 10-13, 2002, p. 355, B-5-58.
Yanchao Zhang, Wei Liu, Wenjing Lou, Yuguang Fang; Anonymous Handshakes in Mobile Ad Hoc Networks; Milcom 2004—2004 IEEE Military Communications Conference; pp. 1193-1199; XP-002432989.
Hung-Yu Wei, Richard D. Gitlin; Incentive Scheduling for Cooperative Relay in WWAN/WLAN Two-Hop-Relay Network; IEEE Communications Society/ WCNC 2005; pp. 1696-1701.
Niels Hoven, Anant Sahai; Power Scaling for Cognitive Radio; 2005 International Conference on Wireless Networks, Communications and Mobile Computing; pp. 250-255.
Jose Costa-Requena, Raimo Kantola, Nicklas Beijar; Incentive, ICAS/ICNS 2005.
Carlos Cordeiro, Kiran Challapali, Dagnachew Birru, Sai Shankar; IEEE 802.22: The First Worldwide Wireless Standard Based on Cognitive Radios; 2005 IEEE ; pp. 328-337: XP-10855130A.
Cabric D et al: "Implementation Issues in Spectrum Sensing for Cognitive Radios" Signals, Systems and Computers, 2004. Conference Record of the Thirty-Eighth ASILOMAR Conference on Pacific Grove, CA Nov. 7-10, 2004 pp. 772-776 XP-010781056.
Ylianttila et al: "Geolocation Information and Inter-Technology Handoff" ICC 2000. 2000 IEEE International Conference on Communications. Conference Record. New Orleans, LA, Jun. 18-22, 2000, pp. 1573-1577,—XP-001208676.
Spyridon Panagiotakis et al: "Intelligent Service Mediation for Supporting Advanced Location and Mobility—Aware Service Provisioning in Reconfigurable Mobile Networks" IEEE Personal Communications, Oct. 2002 p. 28-38, XP-011093874.
Dagres et al., "Flexible Radio: A General Framework With PHY-Layer Algorithm-Design Insights" EUROCON 2005, Nov. 22-24, 2005 p. 120-123, XP-10916036.

(56) References Cited

OTHER PUBLICATIONS

Van De Beek, "ML Estimation of Time and Frequency Offset in OFDM Systems" IEEE Transactions on Signal Processing, vol. 45 No. 7 Jul. 1997, XP-11057861.

Brandes S et al: "Reduction of Out-Of-Band Radiation in OFDM Based Overlay Systems" New Frontiers in Dynamic Spectrum Access Networks, 2005. DYSPAN 2005. 2005 First IEEE International Symposium on Baltimore, MD, USA Nov. 8-11, 2005, Piscataway, NJ, USA,IEEE, (Nov. 11, 2005), pp. 662-665, XP010855171 ISBN: 1-4244-0013-9.

Taiwan Search Report—TW96101128—TIPO—Feb. 19, 2012.

Hlavacs H., et al., "Enhancing ZRTP by using Computational Puzzles", Journal of Universal Computer Science, Feb. 28, 2008, vol. 14 No. 5, pp. 693-716.

Kim S., et al., "Reliable transfer on wireless sensor networks", IEEE SECON 2004—IEEE, 2004, pp. 449-459.

Feng W et al., "Design and implementation of network puzzles", INFOCOM 2005 Proceedings IEEE 24th Annual Joint Conference of the IEEE Computer and Communications Societies Mar. 2005, pp. 2372-2382, vol. 4.

\* cited by examiner

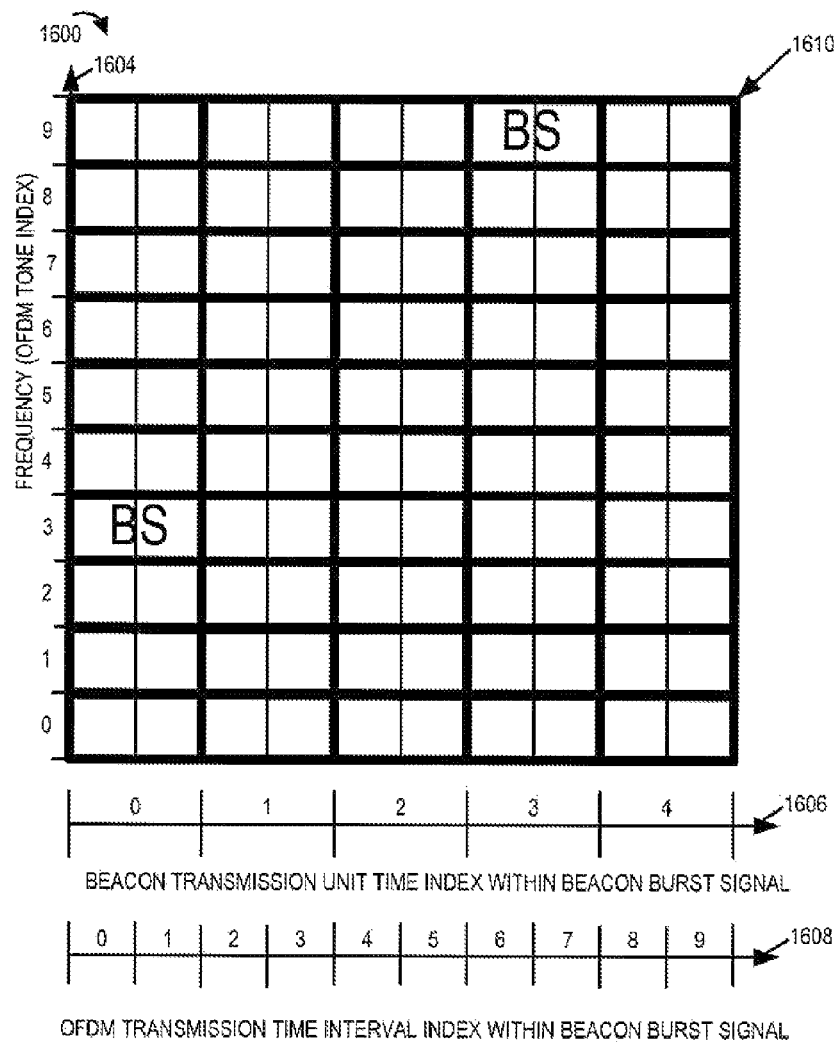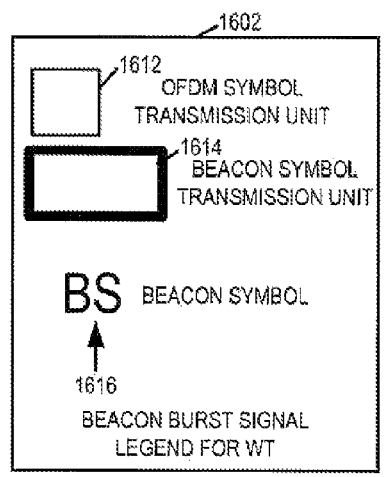
FIGURE 16

US 8,774,846 B2

METHODS AND APPARATUS RELATING TO WIRELESS TERMINAL BEACON SIGNAL GENERATION, TRANSMISSION, AND/OR USE

RELATED APPLICATIONS

The present application claims the benefit of U.S. Provisional Patent Application Ser. No. 60/758,011 filed on Jan. 11, 2006, titled "METHODS AND APPARATUS FOR USING BEACON SIGNALS FOR IDENTIFICATION, SYNCHRONIZATION OR ACQUISITION IN AN AD HOC WIRELESS NETWORK", U.S. Provisional Patent Application Ser. No. 60/758,010 filed on Jan. 11, 2006, titled "METHODS AND APPARATUS FOR FACILITATING IDENTIFICATION, SYNCHRONIZATION OR ACQUISITION USING BEACON SIGNALS", U.S. Provisional Patent Application Ser. No. 60/758,012 filed on Jan. 11, 2006, titled "METHODS AND APPARATUS FOR USING BEACON SIGNALS IN A COGNITIVE RADIO NETWORK", U.S. Provisional Patent Application Ser. No. 60/863,304 filed on Oct. 27, 2006, U.S. Provisional Patent Application Ser. No. 60/845,052 filed on Sep. 15, 2006, and U.S. Provisional Patent Application Ser. No. 60/845,051 filed on Sep. 15, 2006 each of which is hereby incorporated by reference and all of which are assigned to the assignee hereof.

FIELD

Various embodiments are directed to methods and apparatus for wireless communication and, more particularly, to methods and apparatus related to wireless terminal beacon signal generation, transmission, and/or use in a wireless network, e.g., an ad hoc wireless network.

BACKGROUND

In a wireless network, e.g., an ad hoc network, in which a network infrastructure does not exist, a terminal has to combat certain challenges in order to set up a communication link with another peer terminal. One challenge is that when a terminal just powers up or moves into a new area, the terminal may have to first find out whether another terminal is present in the vicinity before any communication between the two terminals can start.

The general solution to the above problem of identification and acquisition is to let the terminal transmit and/or receive signals according to certain protocol. Note that the protocol and the signal have to be designed carefully so that the solution is robust and power efficient. Robustness is essential. For example, the terminals often may not have a common timing reference, e.g., because of the lack of the network infrastructure. So it is possible that when a first terminal is transmitting a signal and a second terminal is not in the receiving mode, the transmitted signal does not help the second terminal to detect the presence of the first terminal. Power efficiency has great impact on the battery life of the terminals and is thus another important issue in the wireless system.

In addition to solving the above problem of identification and acquisition, the terminals need to be synchronized with each other to enable proper peer-to-peer communication.

In view of the above discussion, it should be appreciated that there is a need for new and improved ways for identification, acquisition, or synchronization, especially in a wireless system in which the network infrastructure is not available.

SUMMARY

In accordance with various embodiments, a wireless terminal, e.g., a battery powered portable wireless terminal, transmits a special signal, called a beacon signal. A beacon signal includes a sequence of beacon signal bursts, each beacon signal burst including one or more beacon symbols, each beacon symbol occupying a beacon symbol transmission unit. The air link resources associated with a beacon signal burst include a set of beacon symbol transmission units some of which are occupied by beacon symbols and some of which are nulls. In some embodiments, beacon symbols in a beacon signal burst occupy less than 10% of the available beacon symbols transmission units of the beacon signal burst. A total air link resource, e.g., a combination of frequency and time, available for communication includes, from the wireless terminal's perspective, portions available for transmission of beacon burst signals and portions designated for other uses, e.g., beacon signal monitoring, user data signaling, and/or silence portions. In terms of the total resource available for communication, the beacon symbols of the beacon signal occupy a small fraction, e.g., in some embodiments no more than 1% of the total air link resource available for communication. In some such embodiments, the beacon symbols of the beacon signal occupy no more than 0.1% of the total air link resource available for communication. In terms of power, the average per symbol transmission power level associated with a beacon symbol of the beacon signal is much higher, e.g., in some embodiments at least 10 dB higher, than the average per symbol transmission power level of a data symbol. In some embodiments, the average per symbol transmission power level associated with a beacon symbol of the beacon signal is at least 16 dB higher than the average per symbol transmission power level of a data symbol.

In various embodiments of orthogonal frequency division multiplexing (OFDM) systems, a basic transmission unit is an OFDM tone-symbol, i.e., a single tone over a single transmission symbol period. In some such embodiments, a beacon symbol transmission unit is a single OFDM tone-symbol. In other such embodiments, a beacon symbol transmission unit is a set of contiguous OFDM tone-symbols, e.g., two or three adjacent tone-symbols using the same tone.

The beacon signal, in some embodiments, includes a sequence of beacon signal bursts, each of the beacon signal bursts includes one or more beacon symbols, each beacon symbol may correspond to a site tone, over a small number of transmission symbol periods, e.g., one or two symbol periods. The terminal transmits the beacon signal bursts in an intermittent (i.e., non-continuous) manner so that there are a number of symbol periods between a first and a second beacon signal bursts. In one embodiment, the number of symbol periods between two successive beacon signal bursts is fixed and constant, in which case the beacon signal includes periodic bursts of energy. In another embodiment, the number of symbol periods between two successive beacon signal bursts is a time varying sequence, picked from a set of predetermined or pseudo-random sequences. The tone of the beacon signal in some embodiments varies from one burst to another.

In accordance with various embodiments, a receiver scans the spectrum of interest to search for a beacon signal for the purpose of detecting the presence of another transmitter, e.g., a wireless terminal, obtaining some identification of that transmitter, and estimating the timing and/or frequency, synchronization information related to the transmitter. In one embodiment, the step of scanning includes estimating the energy of the received signal in each of a plurality of transmission units corresponding to the spectrum of interest and detecting an energy outlier by comparing the estimated energy with some threshold. In some embodiments, the step of scanning includes estimating the energy of the received signal in a plurality of transmission units and detecting an energy outlier by comparing the estimated energy with some threshold.

Since a beacon signal can be easily detected at a receiver, as it is an energy outlier, a beacon signal can be used to carry a small amount of information. Information in a beacon signal can be decoded by determining which beacon transmission unit or units carry the beacon symbols. For example information can be included in the frequency of the tone(s) of the beacon symbol in a given burst, the time position of the beacon symbol(s) in a given burst, the number of beacon symbols in a given burst, the inter-burst interval, and/or the tone hopping sequences. Among other things, this information can also be used to identify the transmitter and/or the type of transmitter. In another embodiment, the information can be about the maximum power that the transmitter is capable of transmitting.

The beacon signal occupies a small fraction of the total available air link resources. In an OFDM embodiment, let N denote the total number of tones in the spectrum of interest. In any reasonably long time interval, e.g., a few seconds, suppose the number of OFDM symbol periods is T. Then the total number of OFDM tone-symbols is N*T. The number of tone-symbols occupied by the beacon signal in that time interval is significantly less than N*T, e.g., in some embodiments no more than 0.1% of N*T.

Moreover, in any reasonably long time interval, e.g., of a few seconds or the duration of the entire transmit burst during which the terminal is in a data session and transmitting (i.e., the terminal is sending user data and/or control information using the spectrum of interest), suppose that the average per tone-symbol transmission power is $P_{avg}$. Then, the transmission power of each beacon symbol is much higher, e.g., in some embodiments at least 10 dB higher, than $P_{avg}$. In some embodiments, the transmission power of each beacon symbol is at least 16 dB higher than $P_{avg}$. In one embodiment, the transmission power of a beacon symbol is constant, i.e., does not vary with time, for a given transmitter. In another embodiment, the per tone-symbol transmission power of the beacon signal is the same for multiple transmitters, so that a receiver can derive information, such as path loss from those transmitters to the receiver, from the power of the beacon signals received from those transmitters.

In one embodiment, the wireless terminal keeps on transmitting the beacon signal even if the terminal determines that there is no other terminal in the vicinity.

In accordance with various embodiments, the wireless terminal listens to the spectrum of interest and attempts to detect a beacon signal, which may be sent by a different terminal. The terminal may continuously be in the listening mode (i.e., on time) for a time interval of a few symbol periods. The on time is followed by an off time during which the terminal is in a power saving mode and does not receive any signal, e.g., turn off the receive modules. In one embodiment, the length of the on time is a function of the beacon signal transmission pattern, including the transmission duration of a beacon signal burst and/or the duration between successive beacon signal bursts.

If the (first) terminal detects the presence of another (second) terminal, the first terminal should use the detected beacon signal to derive the timing used by the second terminal. The information used to derive the timing includes the frequency location of the tones used in the detected beacon signal bursts and/or the time interval between the detected successive beacon signal bursts. The first terminal should synchronize its transmitter and receiver to the derived timing, and then send a signal to the second terminal using the derived timing, in order to establish a communication link between the two terminals.

In various embodiments, a method of operating a portable wireless terminal includes: transmitting a beacon signal including a sequence of beacon signal bursts, each beacon signal burst including one or more beacon symbols, each beacon symbol occupying a beacon symbol transmission unit, one or more beacon symbols being transmitted during each burst. A portable wireless terminal, in accordance with various embodiments, includes: a beacon signal generation module for generating a beacon signal including a sequence of beacon signal bursts, each beacon signal burst including one or more beacon symbols; and a transmission module for transmitting said generated beacon signal, using beacon signal transmission units, each beacon symbol occupying a beacon symbol transmission unit, one or more beacon symbols being transmitted during each beacon signal burst.

While various embodiments have been discussed in the summary above, it should be appreciated that not necessarily all embodiments include the same features and some of the features described above are not necessary but can be desirable in some embodiments. Numerous additional features, embodiments and benefits are discussed in the detailed description which follows.

BRIEF DESCRIPTION OF THE FIGURES

FIG. 16 is a drawing and corresponding legend illustrating a feature of some embodiments, in which a beacon symbol transmission unit includes a plurality of OFDM symbol transmission units.

DETAILED DESCRIPTION

Figure 1:
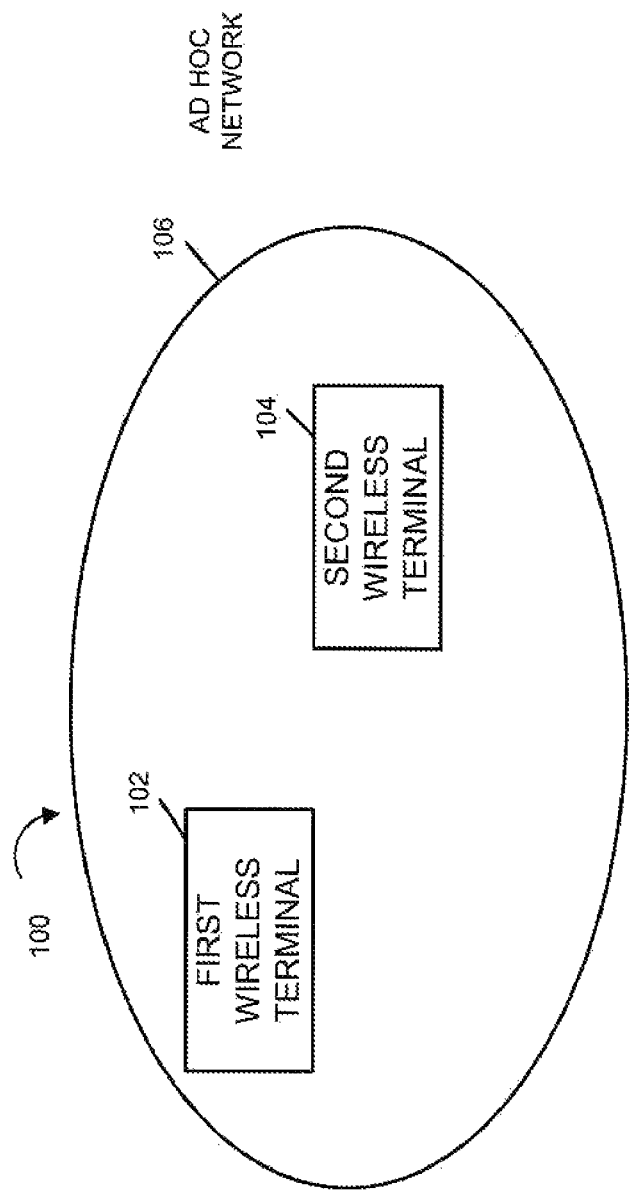
FIG. 1 illustrates an exemplary ad hoc communication network implemented in accordance with various embodiments.

FIG. 1 illustrates an exemplary ad hoc communication network 100 implemented in accordance with various embodiments. Two exemplary wireless terminals, namely a first wireless terminal 102 and a second wireless terminal 104 are present in a geographic area 106. Some spectrum band is available to be used by the two wireless terminals for the purpose of communication. The two wireless terminals use the available spectrum band to establish a peer-to-peer communication link between each other.

Because the ad hoc network may not have a network infrastructure, the wireless terminals may not have a common timing or frequency reference. This results in certain challenges in the ad hoc network. To elaborate, consider the problem of how either of the terminals detects the presence of the other.

For the sake of description in the following it is assumed that at a given time, the wireless terminal can either transmit or receive, but not both. It is understood that people with ordinary skills in the field can apply the same principles to the case where the terminal can both transmit and receive at the same time.

Figure 2:
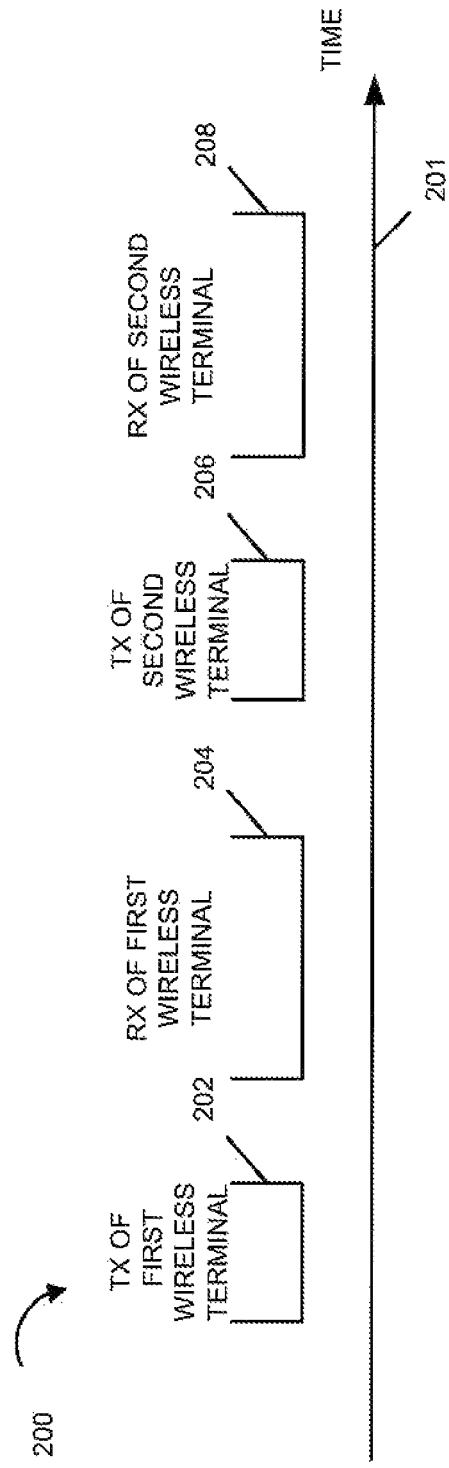
FIG. 2 illustrates an exemplary user misdetection problem in an ad hoc network when there is no common timing reference.

FIG. 2 includes drawing 200 used to describe one possible scheme that the two wireless terminals may use to find each other. The first terminal transmits some signal in time interval 202, and receives signal in time interval 204. Meanwhile, the second wireless terminal transmits some signal in time interval 206, and receives signal in time interval 208. Note that if the first wireless terminal can both transmit and receive at the same time then the time intervals 202 and 204 may overlap with each other.

Note that because the two terminals do not have a common timing reference, their TX (transmit) and RX (receive) timings are not synchronized. In particular, FIG. 2 shows that the time intervals 204 and 206 do not overlap. When the first wireless terminal is listening the second wireless terminal does not transmit, and when the second wireless terminal is transmitting the first wireless terminal does not listen. Therefore, the first wireless terminal does not detect the presence of the second terminal. Similarly, the time intervals 202 and 208 do not overlap. Therefore, the second wireless terminal does not detect the presence of the first wireless terminal either.

There are ways to overcome the above misdetection problem. For example, a wireless terminal may randomize the time interval in which the TX and RX procedure is carried out, so that over time the two wireless terminals will detect each other probabilistically. However, the cost is the delay and the resultant, battery power consumption. In addition, the power consumption is also determined by the power requirement in the TX and RX procedure. For example, it may require less processing power to detect one form of the signal than to detect another form.

It is an advantage of various embodiments that a new signal TX and RX procedure is implemented and used to reduce the delay of detecting the presence of another terminal and the associated power consumption.

In accordance with various embodiments, a wireless terminal transmits a special signal, called a beacon signal, which occupies a small fraction e.g., in some embodiments no more than 0.1%, of the total amount of available air link communication resource. In some embodiments, air link communication resources are measured in terms of minimum or basic transmission units, e.g., OFDM tone symbols in an OFDM system. In some embodiments, air link communication resources can be measured in terms of degrees of freedom, where a degree of freedom is the minimum unit of resource which can be used for communication. For example, in a CDMA system, a degree of freedom can be a spreading code, a time corresponding to a symbol period. In general, the degrees of freedom in a given system are orthogonal with each other.

Consider an exemplary embodiment of a frequency division multiplexing system, e.g., an OFDM system. In that system, information is transmitted in a symbol-by-symbol manner. In a symbol transmission period, the total available bandwidth is divided into a number of tones, each of which can be used to carry information.

Figure 3:
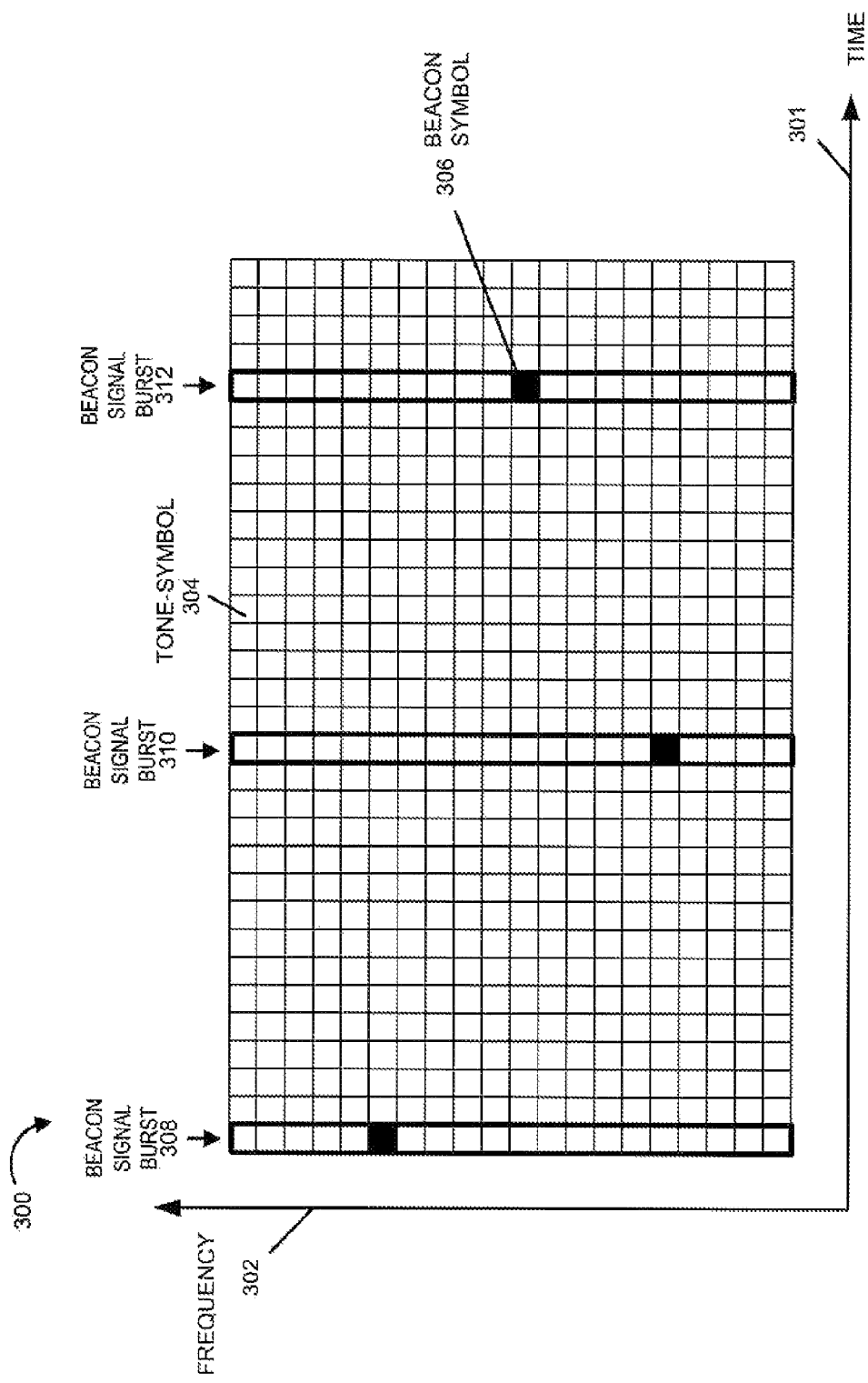
FIG. 3 illustrates an exemplary air link resource being used to communicate a beacon signal including three exemplary beacon signal bursts, each beacon signal burst including one beacon symbol.

FIG. 3 includes drawing 300 showing the available resource in an exemplary OFDM system. The horizontal axis 301 represents time and the vertical axis 302 represents frequency. A vertical column represents each of the tones in a given symbol period. Each small box 304 represents a tone-symbol, which is the air link resource of a single tone over a single transmission symbol period. A minimum transmission unit in the OFDM symbol is a tone-symbol.

The beacon signal includes a sequence of beacon signal bursts (308, 310, 312), which are transmitted sequentially over time. A beacon signal burst includes a small number of beacon symbols. In this example, each beacon symbol burst (308, 310, 312) includes one beacon symbol and 19 nulls. In this example, each beacon symbol is a single tone over one transmission period. A beacon signal burst includes, in some embodiments, beacon symbols of the same tone over a small number of transmission symbol periods, e.g., one or two symbol periods. FIG. 3 shows three small black boxes, each of which (306) represents a beacon symbol. In this case, a beacon symbol uses the air link resource of one tone-symbol, i.e., one beacon symbol transmission unit is an OFDM tone-symbol. In another embodiment, a beacon symbol comprises one tone transmitted over two consecutive symbol periods, and a beacon symbol transmission unit comprises two adjacent OFDM tone-symbols.

The beacon signal occupies a small fraction of the total minimum transmission units. Denote N the total number of tones of the spectrum of interest. In any reasonably long time interval, e.g., of one or two seconds, suppose the number of symbol periods is T. Then the total number of minimum transmission units is N*T. In accordance with various embodiments, the number of tone-symbols occupied by the beacon signal in the time interval is significantly less than N*T, e.g., in some embodiments no more than 0.1% of N*T.

The tone of the beacon symbol in a beacon signal burst, in some embodiments, varies (hops) from one burst to another. In accordance with various embodiments, the tone-hopping pattern of the beacon symbol is in some embodiments a function of the wireless terminal and can be, and sometimes is, used as an identification of the terminal or an identification of the type to which the terminal belongs. In general, information in a beacon signal can be decoded by determining which minimum transmission units convey the beacon symbols. For example, information can be included in the frequency of the tone(s) of the beacon symbol(s) in a given beacon signal burst, the number of beacon symbols in a given burst, the duration of a beacon signal burst, and/or the inter-burst interval, in addition to the tone hopping sequences.

Figure 4:
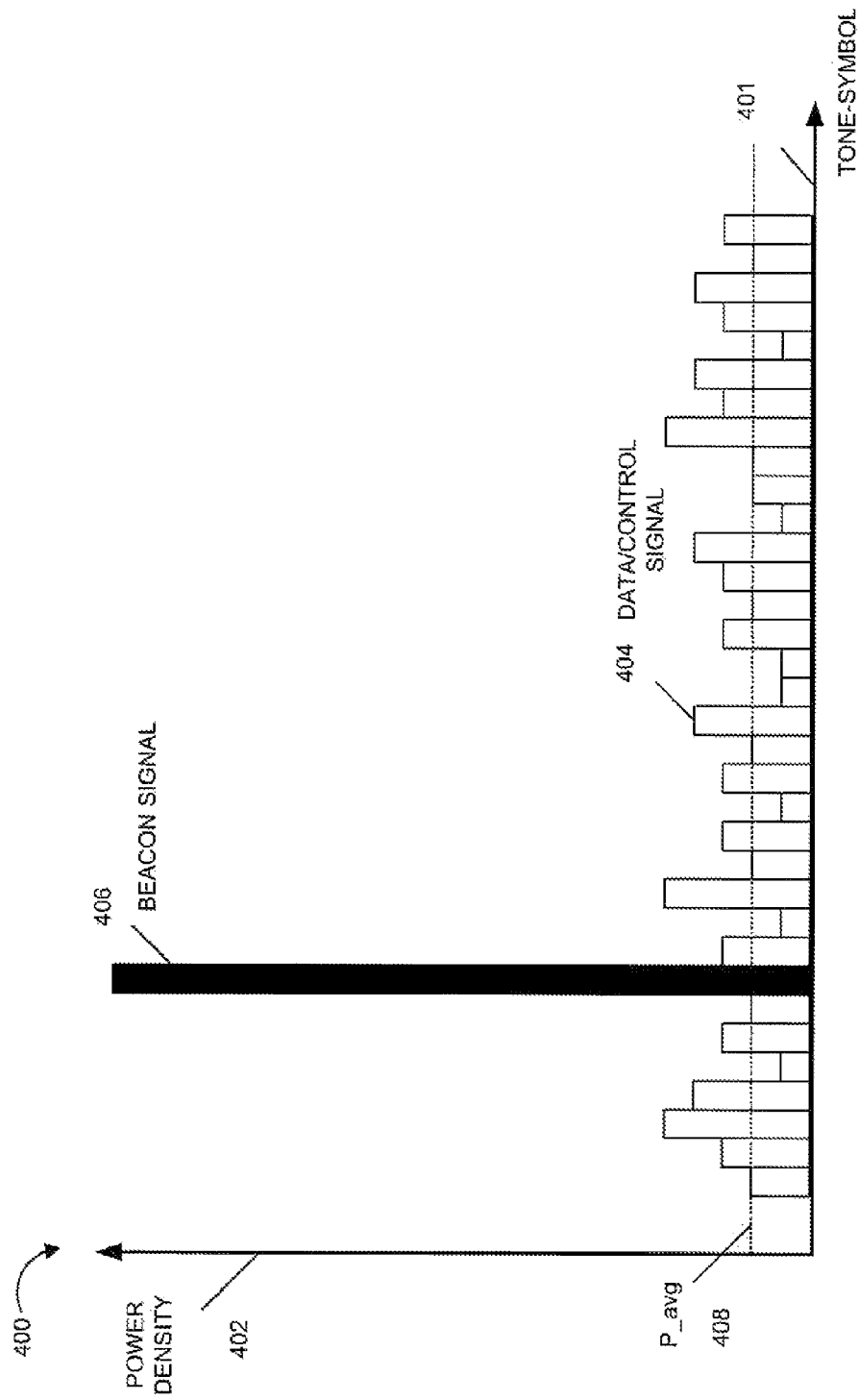
FIG. 4 illustrates an exemplary relative transmission power levels between a beacon symbol and a data/control signal in accordance with various embodiments.

The beacon signal can also be characterized from the transmission power perspective. In accordance with various embodiments, the transmission power of the beacon signal per minimum transmission unit is much higher, e.g., in some embodiments at least 10 dB higher, than the average transmission power of data and control signals per degree of freedom when the terminal transmitter is in an ordinary data session. In accordance with some embodiments, the transmission power of the beacon signal per minimum transmission unit is at least 16 dB higher than the average transmission power of data and control signals per degree of freedom when the terminal transmitter is in an ordinary data session. For example, drawing 400 of FIG. 4 plots the transmission powers used in each of the tone-symbols in a reasonably long time interval, e.g., of one or two seconds, in which the wireless terminal is in a data session, i.e., the terminal is sending data and control information using the spectrum of interest. The order of those tone-symbols, represented by the horizontal axis 401, is immaterial for purposes of this discussion. A small vertical rectangular 404 represents the power of individual tone-symbols conveying user data and/or control information. As a comparison, a tall black rectangular 406 is also included to show the power of a beacon tone-symbol.

In another embodiment, a beacon signal includes a sequence of beacon signal bursts transmitted at intermittent time periods. A beacon signal burst includes one or more (a small number) of time-domain impulses. A time-domain impulse signal is a special signal that occupies a very small transmission time duration over a certain spectrum bandwidth of interest. For example, in a communication, system where the available bandwidth is 30 kHz, a time-domain impulse signal occupies a significant portion of the 30 kHz bandwidth for a short duration. In any reasonably long time interval, e.g., a few seconds, the total duration of the time-domain impulses is a small fraction, e.g., in some embodiments no more than 0.1% of the total time duration. Moreover, the per degree of freedom transmission power in the time interval during which the impulse signal is transmitted is significantly higher, e.g., in some embodiments 10 dB higher, than the average transmission power per degree of freedom when the transmitter is in an ordinary data session. In some embodiments, the per degree of freedom transmission power in the time interval during which the impulse signal is transmitted is at least 16 dB higher than the average transmission power per degree of freedom when the transmitter is in an ordinary data session.

FIG. 4 shows that the transmission power may vary from one tone-symbol to another. Denote $P_{avg}$ the average transmission power per tone-symbol (408). In accordance with various embodiments, the per tone-symbol transmission power of the beacon signal is much higher, e.g., at least 10 dB higher, than $P_{avg}$. In some embodiments, the per tone-symbol transmission power of the beacon signal is at least 16 dB higher than $P_{avg}$. In one exemplary embodiment, the per tone-symbol transmission power of the beacon signal is 20 dBs higher than $P_{avg}$.

In one embodiment, the per tone-symbol transmission power of the beacon signal is constant for a given terminal. That is, the power does not vary with time or with tone. In another embodiment, the per tone-symbol transmission power of the beacon signal is the same for multiple terminals, or even each of the terminals in the network.

Figure 5:
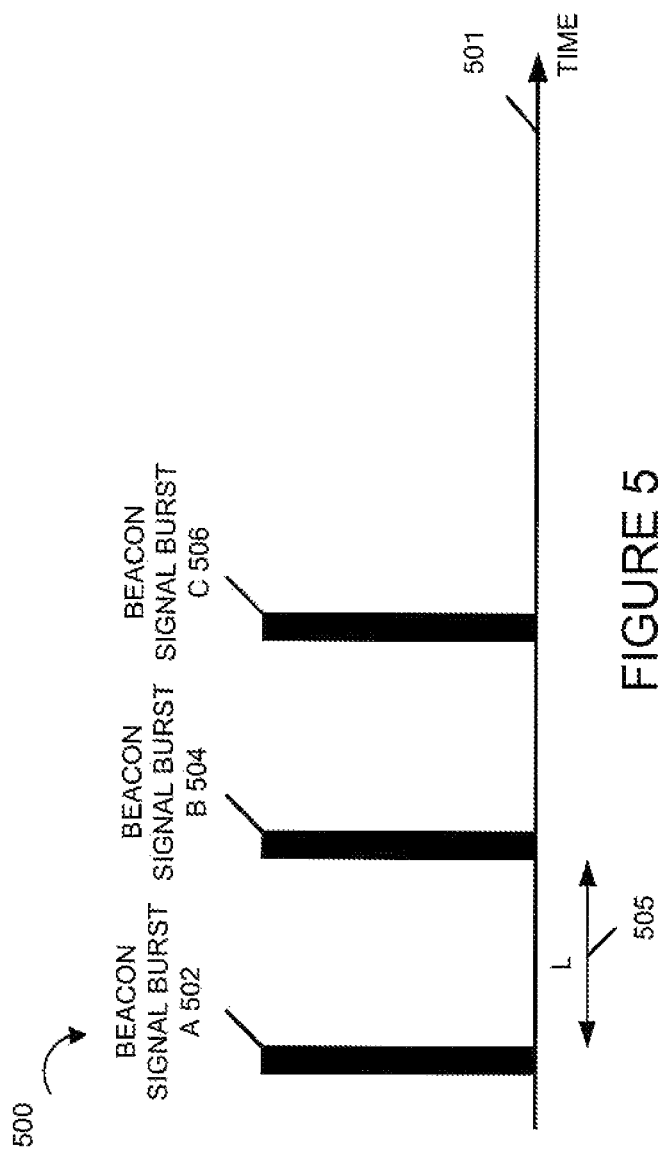
FIG. 5 illustrates one exemplary embodiment of transmitting beacon signal bursts.

Drawing 500 of FIG. 5 illustrates one embodiment of transmitting beacon signal bursts. A wireless terminal keeps on transmitting the beacon signal bursts, e.g., beacon signal burst A 502, beacon signal burst B 504, beacon signal burst C 506, etc., even if the wireless terminal determines that there is no other terminal in the vicinity or even if the terminal has already detected other terminals and may even have established communication links with them.

The terminal transmits the beacon signal bursts in an intermittent (i.e., non-continuous) manner so that there are a number of symbol periods between two successive beacon signal bursts. In general, the time duration of a beacon signal burst is much shorter, e.g., in some embodiments at least 50 times shorter, than the number of symbol periods in-between two successive beacon signal bursts, denoted as L 505. In one embodiment, the value of L is fixed and constant, in which case the beacon signal is periodic. In some embodiments the value of L is the same and known for each of the terminals. In another embodiment, the value of L varies with time, e.g., according to a predetermined or pseudo-random pattern. For example, the number can be a number, e.g., random number, distributed between constants $L_0$ and $L_1$.

Figure 6:
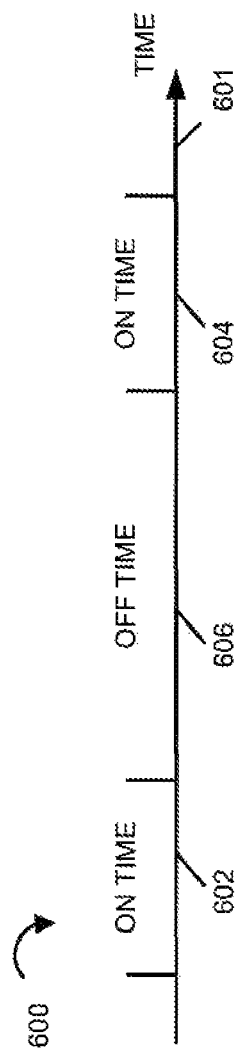
FIG. 6 illustrates one exemplary embodiment in which receiving beacon signal bursts can occur during certain designated time intervals, while at other times the receiver is off to conserve power.

Drawing 600 of FIG. 6 illustrates one exemplary embodiment in which receiving beacon signal bursts can occur during certain designated time intervals, while at other times the receiver is off to conserve power. The wireless terminal listens to the spectrum of interest and attempts to detect a beacon signal, which may be sent by a different terminal. The wireless terminal may continuously be in the listening mode for a time interval of a few symbol periods, which is called on time. The on time 602 is followed by an off time 606 during which the wireless terminal is in a power saving mode and does not receive any signal. In the off time, the wireless terminal, in some embodiments, completely turns off the receive modules. When the off time 606 ends, the terminal resumes to the on time 604 and starts to detect a beacon signal again. The above procedure repeats.

Preferably, the length of an on time interval is shorter than that of an off time interval. In one embodiment, an on time interval may be less than ⅕ of an off time interval. In one embodiment, the length of each of the on time intervals are the same, and the length of each of the off time intervals are also the same.

In some embodiments the length of an off time interval depends on the latency requirement for a first wireless terminal to detect the presence of another (second) wireless terminal, if the second wireless terminal is actually present in the vicinity of the first wireless terminal. The length of an on time interval is determined so that the first wireless terminal has a great probability of detecting at least one beacon signal burst in the on time interval. In one embodiment, the length of the on time interval is a function of at least one of the transmission duration of a beacon signal burst and the duration between successive beacon signal bursts. For example, the length of the on time interval is at least the sum of the transmission duration of a beacon signal burst and the duration between successive beacon signal bursts.

Figure 7:
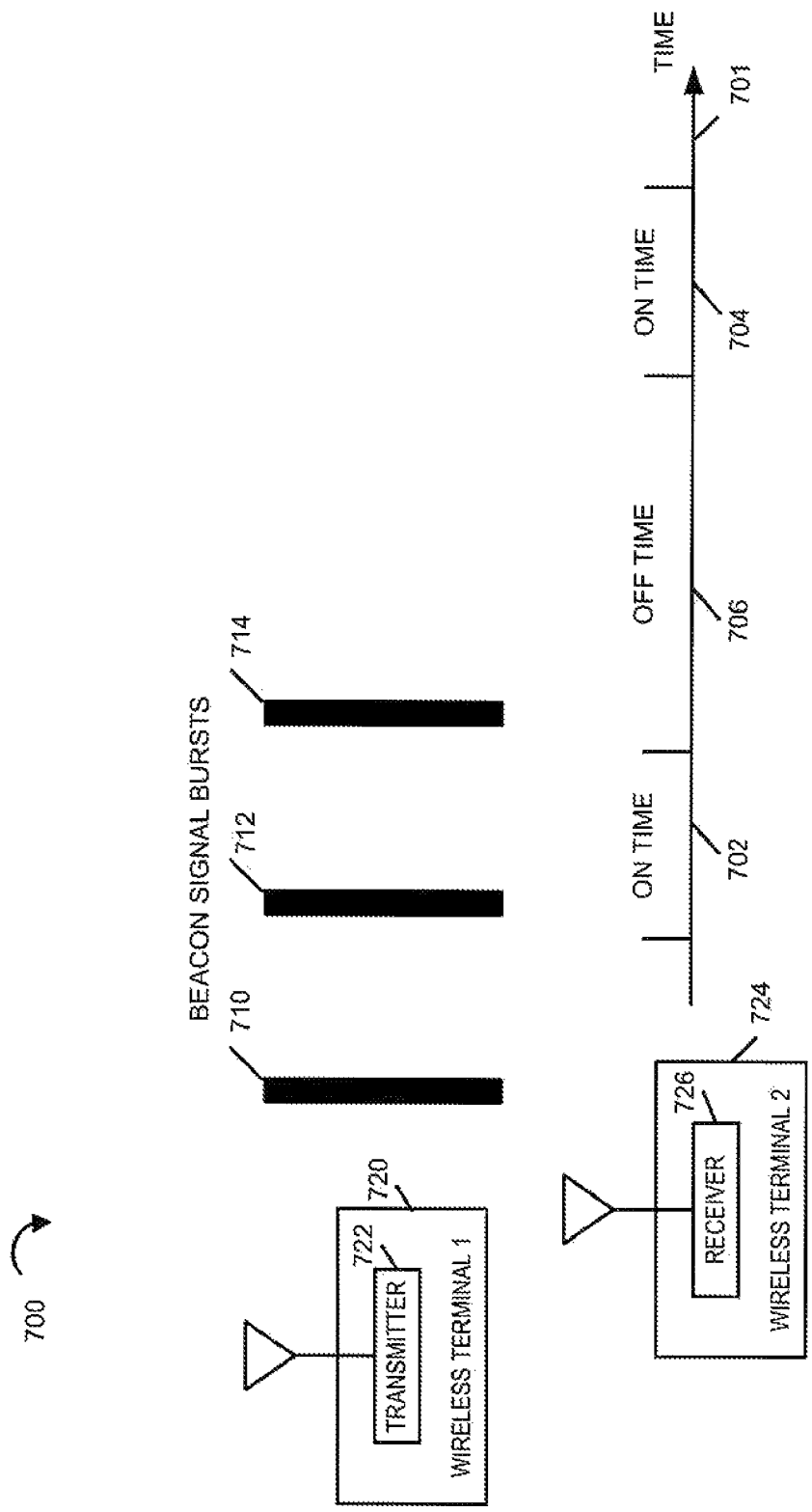
FIG. 7 is used to describe how a user misdetection problem is solved when two terminals transmit and receive beacon signal bursts, as implemented in accordance with various embodiments.

Drawing 700 of FIG. 7 illustrates how a terminal detects the presence of a second terminal when the two terminals use the beacon signal transmission and reception procedure implemented in accordance with various embodiments.

The horizontal axis 701 represents time. The first wireless terminal 720 arrives at the ad hoc network before the second wireless terminal 724 shows up. The first wireless terminal 720, using transmitter 722, starts to transmit the beacon signal, which includes a sequence of beacon signal bursts 710, 712, 714, etc. The second wireless terminal 724 shows up after the first wireless terminal 720 has already transmitted burst 710. Suppose that the second wireless terminal 724, including receiver 726, starts the on time interval 702. Note that the on time interval is sufficiently large to cover the transmission duration of a beacon signal burst 712 and the duration between bursts 712 and 714. Therefore, the second wireless terminal 724 can detect the presence of beacon signal burst 712 in the on time interval 702, even though the first and the second wireless terminals (720, 724) do not have a common timing reference.

Figure 8:
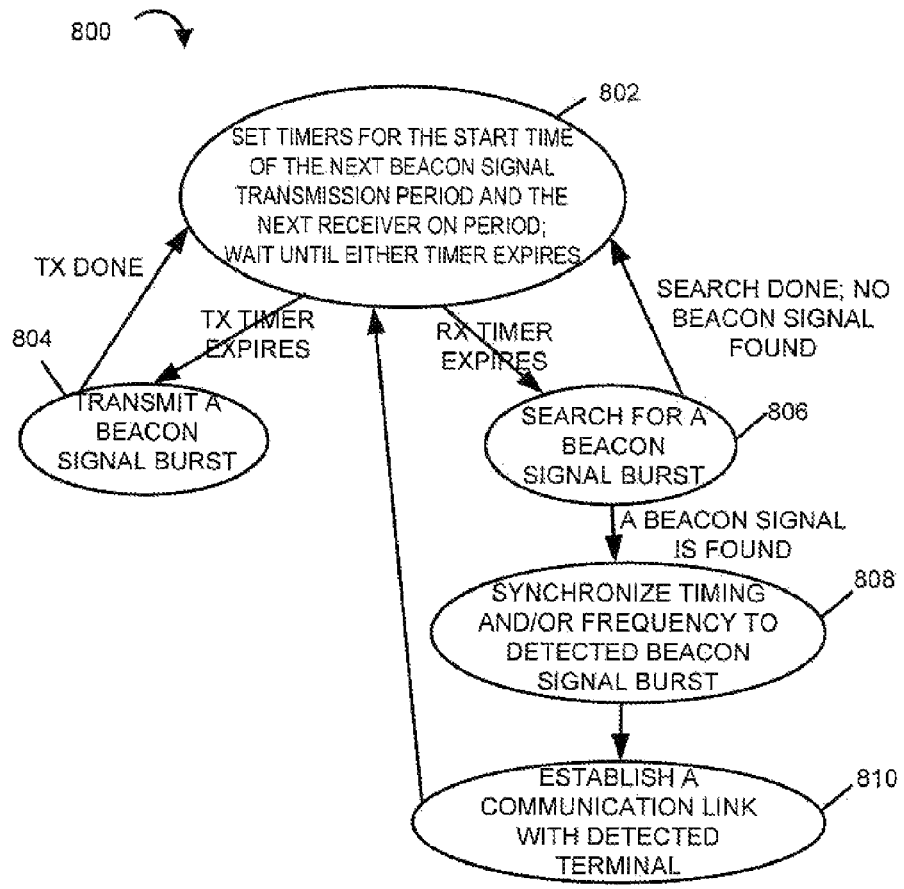
FIG. 8 illustrates one exemplary embodiment of a state diagram implemented in a terminal.

FIG. 8 illustrates one embodiment of an exemplary state diagram 800 implemented in a wireless terminal in accordance with various embodiments.

When the wireless terminal is powered up, the wireless terminal enters the state of 802, in which the terminal determines the start time of the next beacon signal burst to be transmitted. In addition, the wireless terminal determines the start time of the next on time interval for the receiver. The wireless terminal may, and in some embodiments does, use a transmitter timer and a receiver timer to manage the start times. The wireless terminal waits until either timer expires. Note that either timer may expire instantaneously, meaning that the wireless terminal is to transmit or detect a beacon signal burst upon power up.

Upon the expiration, of the TX timer, the terminal enters the state of 804. The wireless terminal determines the signal form of the burst including the frequency tone to be used by the burst, and transmits the beacon signal burst. Once the transmission is done, the terminal returns to the state of 802.

Upon the expiration of the RX timer, the wireless terminal enters the state of 806. The wireless terminal is in the listening mode and searches for a beacon signal burst. If the wireless terminal has not found a beacon signal burst when the on time interval ends, then the wireless terminal returns to the state of 802. If the wireless terminal detects a beacon signal burst of a new wireless terminal, the wireless terminal may proceed to the state of 808 if the wireless terminal intends to communicate with the new terminal. In the state of 808, the wireless terminal derives the timing and/or frequency of the new wireless terminal from the detected beacon signal and then synchronizes its own timing and/or frequency to the new wireless terminal. For example, the wireless terminal can use the beacon location in time and/or in frequency as a basis for estimating the timing phase and/or frequency of the new wireless terminal. This information can be used to synchronize the two wireless terminals.

Once the synchronization is done, the wireless terminal may send (810) additional signal to the new terminal and establish a communication link. The wireless terminal and the new wireless terminal may then set up a peer-to-peer communication session. When the wireless terminal has established a communication link with another terminal, the terminal should keep on intermittently transmitting the beacon signal so that other terminals, e.g., new wireless terminals can detect the wireless terminal. In addition, the wireless terminal, in some embodiments, keeps on periodically entering the on time intervals to detect new wireless terminals.

Figure 9:
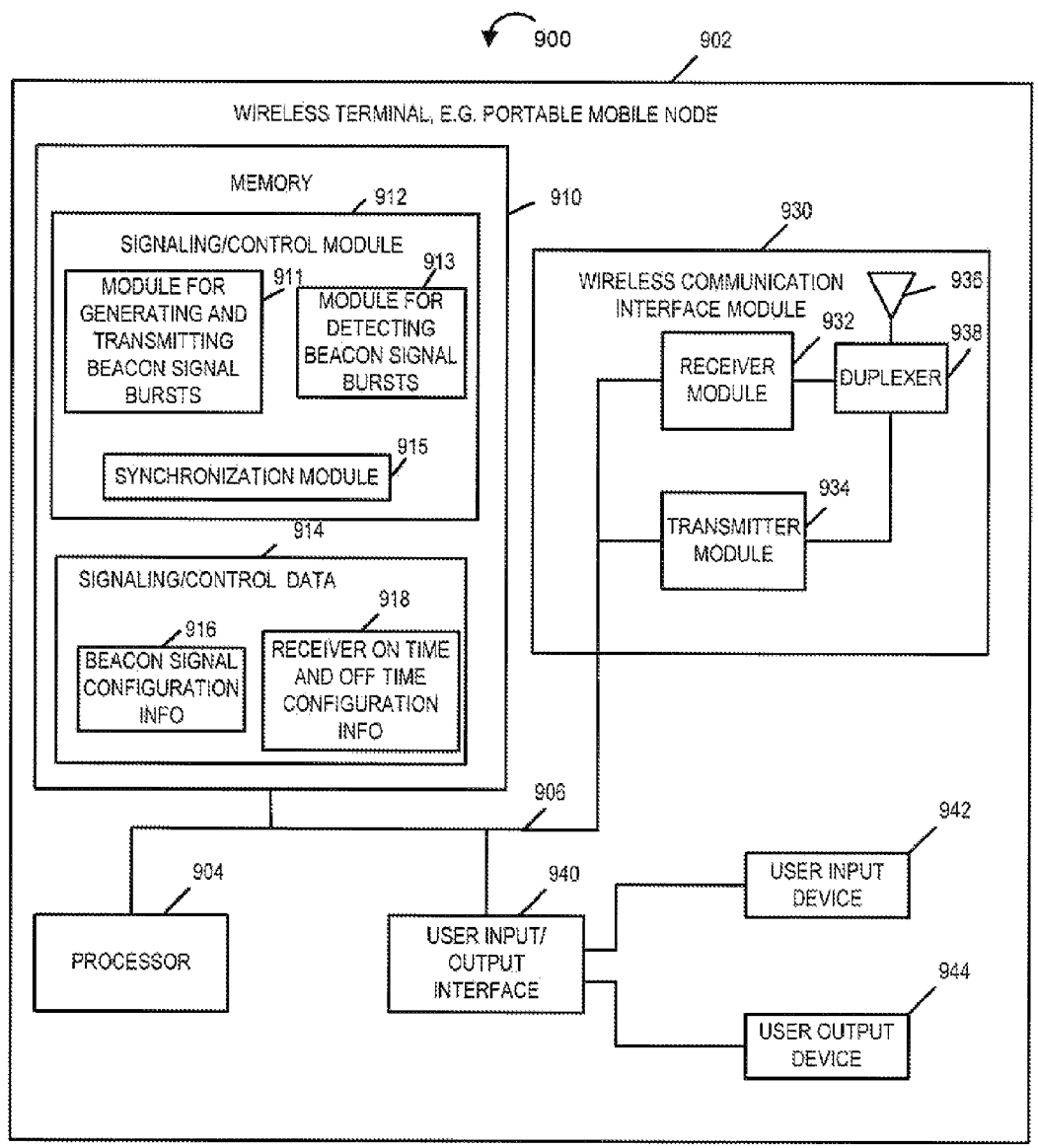
FIG. 9 illustrates a detailed illustration of an exemplary wireless terminal implemented in accordance with various embodiments.

FIG. 9 provides a detailed illustration of an exemplary wireless terminal 900, e.g., portable mobile node, implemented in accordance with various embodiments. The exemplary wireless terminal 900, depicted in FIG. 9, is a detailed representation of an apparatus that may be used as any one of terminals 102 and 104 depicted in FIG. 1. In the FIG. 9 embodiment, the terminal 900 includes a processor 904, a wireless communication interface module 930, a user input/output interface 940 and memory 910 coupled together by bus 906. Accordingly, via bus 906 the various components of the terminal 900 can exchange information, signals and data. The components 904, 906, 910, 930, 940 of the terminal 900 are located inside a housing 902.

The wireless communication interface module 930 provides a mechanism by which the internal components of the wireless terminal 900 can send and receive signals to/from external devices and another wireless terminal. The wireless communication interface module 930 includes, e.g., a receiver module 932 and a transmitter module 934, which are connected with a duplexer 938 with an antenna 936 used for coupling the wireless terminal 900 to other terminals, e.g., via wireless communications channels.

The exemplary wireless terminal 900 also includes a user input device 942, e.g., keypad, and a user output device 944, e.g., display, which are coupled to bus 906 via the user input/output interface 940. Thus, user input/output devices 942, 944 can exchange information, signals and data with other components of the terminal 900 via user input/output interface 940 and bus 906. The user input/output interface 940 and associated devices 942, 944 provide a mechanism by which a user can operate the wireless terminal 900 to accomplish various tasks. In particular the user input device 942 and user output device 944 provide the functionality that allows a user to control the wireless terminal 900 and applications, e.g., modules, programs, routines and/or functions, that execute in the memory 910 of the wireless terminal 900.

The processor 904 under control of various modules, e.g., routines, included in memory 910 controls operation of the wireless terminal 900 to perform various signaling and processing. The modules included in memory 910 are executed on startup or as called by other modules. Modules may exchange data, information, and signals when executed. Modules may also share data and information when executed. In the FIG. 9 embodiment, the memory 910 of exemplary wireless terminal 900 includes a signaling/control module 912 and signaling/control data 914.

The signaling/control module 912 controls processing relating to receiving and sending signals e.g., messages, for management of state information storage, retrieval, and processing. Signaling/control data 914 includes state information, e.g., parameters, status and/or other information relating to operation of the terminal. In particular, the signaling/control data 914 includes beacon signal configuration information 916, e.g., the symbol periods in which the beacon signal bursts are to be transmitted and the signal forms of the beacon signal bursts including the frequency tones to be used, and receiver on time and off time configuration information 918, e.g., the starting and ending times of the on time intervals. The module 912 may access and/or modify the data 914, e.g., update the configuration information 916 and 918. The module 912 also includes the module for generating and transmitting beacon signal bursts 911, the module for detecting beacon signal bursts 913, and the synchronization module 915 for determining and/or implementing timing and/or frequency synchronization information as a function of received beacon signal information.

Figure 10:
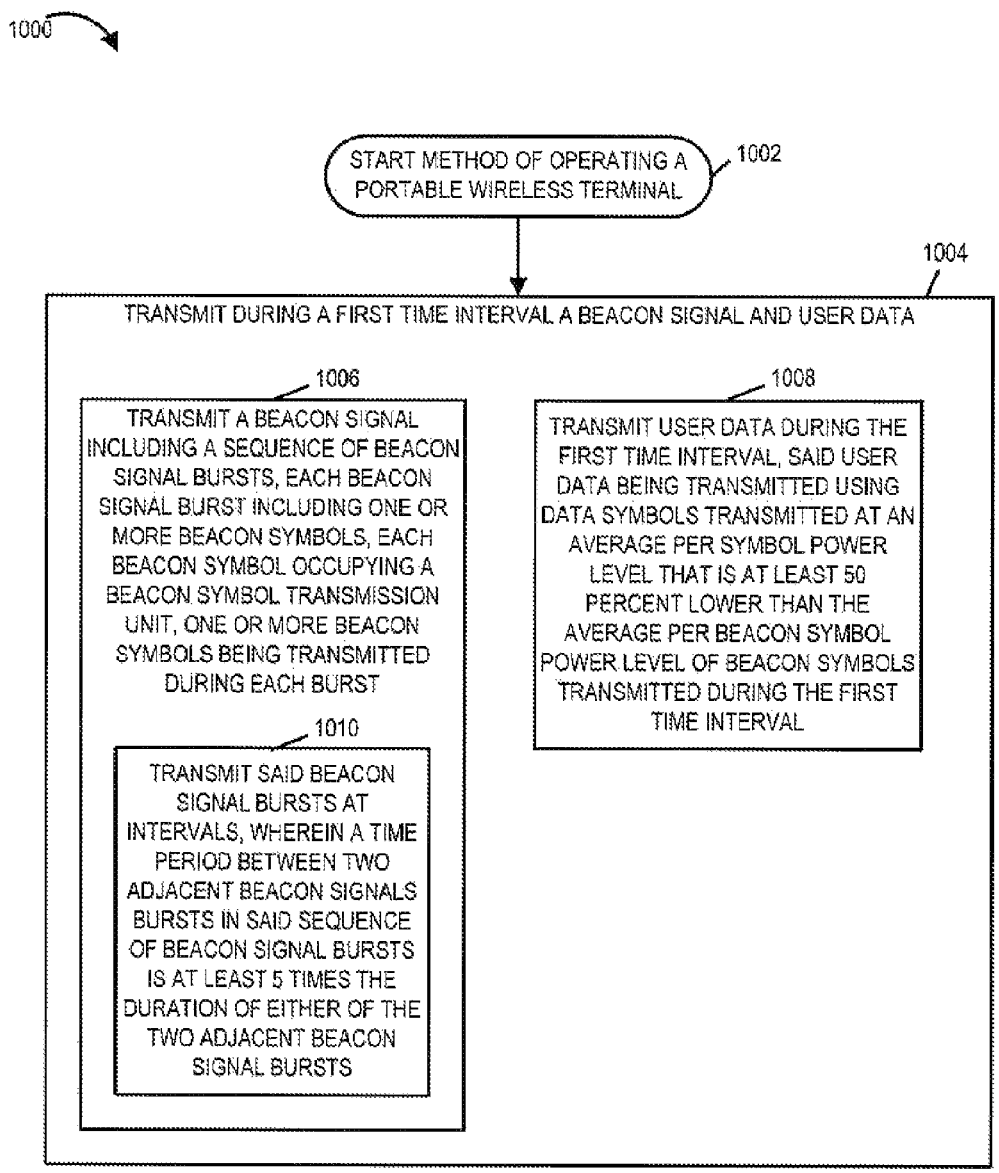
FIG. 10 is a drawing of a flowchart of an exemplary method of operating a portable wireless terminal in accordance with various embodiments.

FIG. 10 is a drawing of a flowchart 1000 of an exemplary method of operating a portable wireless terminal in accordance with various embodiments. Operation of the exemplary method starts in step 1002, where the wireless terminal is powered on and initialized and proceeds to step 1004. In step 1004, the wireless terminal is operated to transmit, during a first time interval, a beacon signal and user data. Step 1004 includes sub-step 1006 and sub-step 1008.

In sub-step 1006, the wireless terminal is operated to transmit a beacon signal including a sequence of beacon signal bursts, each beacon signal burst including one or more beacon symbols, each beacon symbol occupying a beacon symbol transmission unit, one or more beacon symbols being transmitted during each beacon symbol burst. In various embodiments, the transmission power used for transmitting the beacon signal is from a battery power source. In some embodiments, the number of beacon symbols in a beacon signal burst occupy less than 10 percent of the available beacon symbol transmission units. In some embodiments, each of the beacon signal bursts transmitted in the sequence of beacon signal bursts have the same period. In other embodiments, at least some of the beacon signal bursts transmitted in the sequence of beacon signal bursts have periods of different length.

Sub-step 1006 includes sub-step 1010. In sub-step 1010, the wireless terminal is operated to transmit said beacon signal bursts at intervals, wherein a time period between two adjacent beacon signal bursts in said sequence of beacon signal bursts is at least 5 times the duration of either of the two adjacent beacon signal bursts. In some embodiments, the time spacing between beacon signal bursts occurring during the first period of time is constant with the beacon signal bursts occurring in a periodic manner during the first period of time. In some such embodiments, the duration of beacon signal bursts during said first period of time is constant. In some embodiments, the time spacing between beacon signal bursts occurring during the first period of time varies with the beacon signal bursts occurring during the first period of time in accordance with a predetermined pattern. In some such embodiments, the duration of beacon signal bursts during said first period of time is constant. In some embodiments, the predetermined pattern varies depending on the wireless terminal performing the transmitting step. In various embodiments, the predetermined pattern is the same for all wireless terminals in the system. In some embodiments, the pattern is a pseudo random pattern.

In sub-step 1008, the wireless terminal is operated to transmit user data during the first time interval, said user data being transmitted using data symbols transmitted at an average per symbol power level that is at least 50 percent lower than the average per beacon symbol power level of beacon symbols transmitted during the first time interval. In some embodiments, the average per symbol transmission power level of each beacon symbol is at least 10 dB higher than the average per symbol transmission power level of symbols used to transmit data during the first time period. In some embodiments, the average per symbol transmission power level of each beacon symbol is at least 16 dB higher than the average per symbol transmission power level of symbols used to transmit data during the first time period.

In various embodiments, the beacon symbols are transmitted using OFDM tone-symbols, said beacon symbols occupying less than 1 percent of the tone-symbols of a transmission resource used by said wireless terminal during a period of time including multiple beacon symbol bursts. In some such embodiments, the beacon symbols occupy less than 0.1 percent of the tone-symbols in a portion of said period of time including one beacon signal burst and one interval between successive beacon signal bursts.

In sub-step 1008, in some embodiments, the wireless terminal is operated to transmit user data on at least 10 percent of the tone-symbols of the transmission resource used by said wireless terminal during said first period of time. In some such embodiments, the time duration of a beacon signal burst time period occurring in said first period of time is at least 50 times shorter than a time period occurring between two consecutive beacon signal bursts during said first period of time.

In some embodiments, the portable wireless terminal includes an OFDM transmitter which transmits said beacon signal and the beacon signal is communicated using a resource which is a combination of frequency and time. In some embodiments, the portable wireless terminal includes a CDMA transmitter which transmits said beacon signal and the beacon signal is communicated using a resource which is a combination of code and time.

Figure 11:
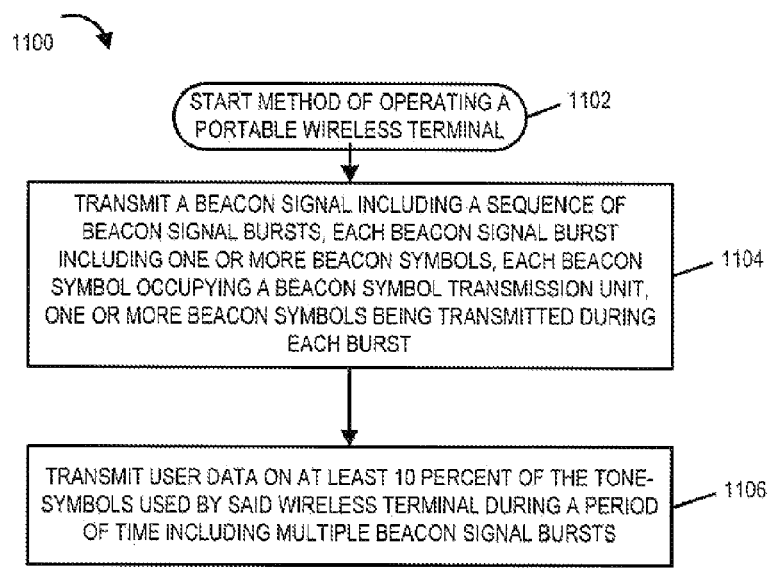
FIG. 11 is a drawing of a flowchart of an exemplary method of operating a portable wireless terminal in accordance with various embodiments.

FIG. 11 is a drawing of a flowchart 1100 of an exemplary method of operating a portable wireless terminal, e.g., a battery powered mobile node in accordance with various embodiments. Operation starts in step 1102, where the portable wireless terminal is powered on and initialized. Operation proceeds from start step 1102 to step 1104, where the portable wireless terminal is operated to transmit a beacon signal including a sequence of beacon signal bursts, each beacon symbol burst including one or more beacon symbols, each beacon symbol occupying a beacon symbol transmission unit, one or more beacon symbols being transmitted during each burst. In some such embodiments, the beacon symbols are transmitted using OFDM tone-symbols, and the beacon symbols occupy less than 1 percent of the tone-symbols of a transmission resource used by said wireless terminal during a period of time including multiple signal bursts. Operation proceeds from step 1104 to step 1106.

In step 1006, the portable wireless terminal is operated to transmit user data on at least to 10 percent of the tone-symbols used by said wireless terminal during a period of time including multiple signal bursts. In some such embodiments, the time duration of a beacon signal burst occurring in said period of time is at least 50 times shorter than a time period occurring between two consecutive beacon signal bursts during said period of time.

Figure 12:
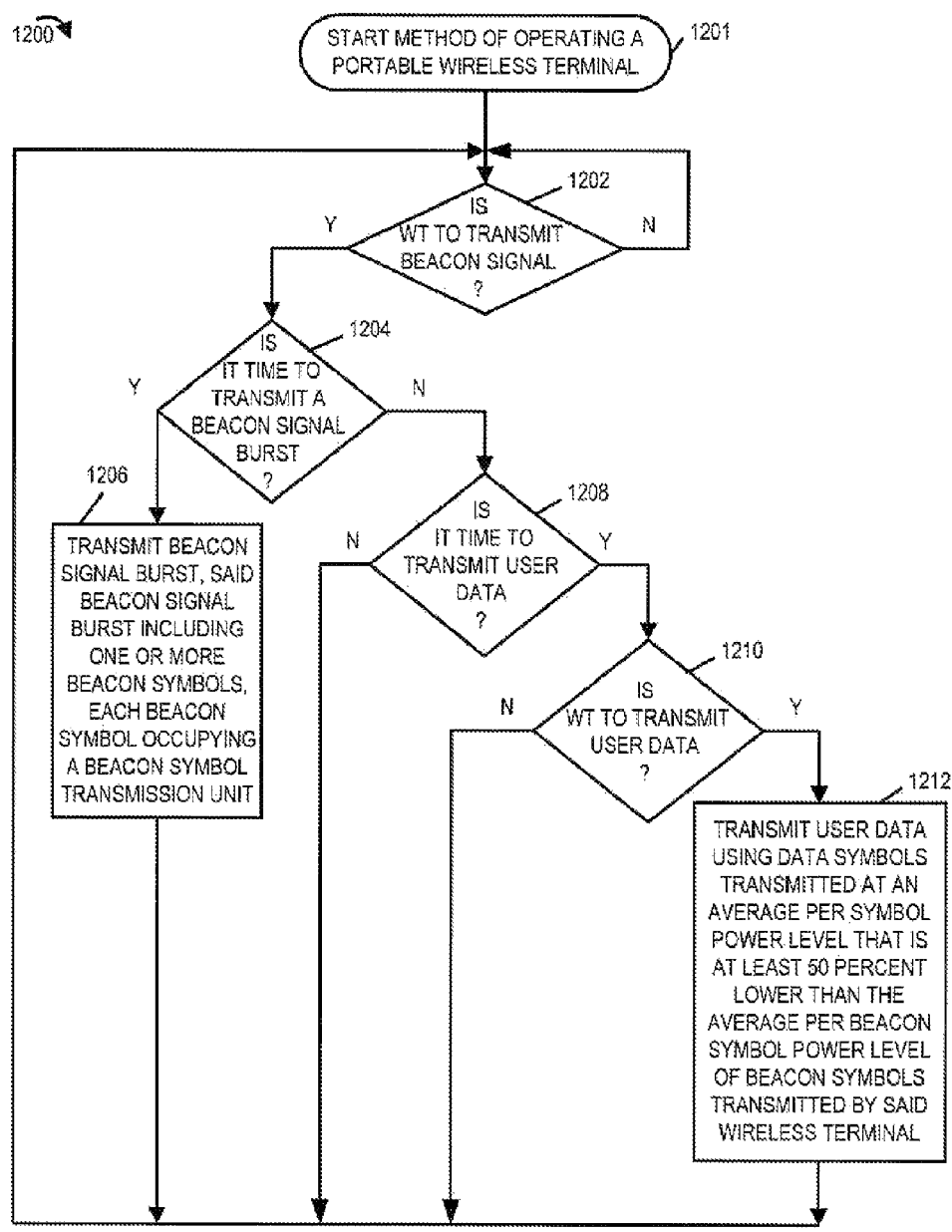
FIG. 12 is a drawing of a flowchart of an exemplary method of operating a portable wireless terminal, e.g., a battery powered mobile node, in accordance with various embodiments.

FIG. 12 is a drawing of a flowchart 1200 of an exemplary method of operating a portable wireless terminal, e.g., a battery powered mobile node, in accordance with various embodiments. Operation starts in step 1201, where the wireless terminal is powered on and initialized. Operation proceeds from start step 1201 to step 1202, where the wireless terminal checks as to whether the wireless terminal is to transmit beacon signals. If it is determined in step 1202 that the wireless terminal is to transmit beacon signals, e.g., the wireless terminal is in a mode of operation or state of operation in which the wireless terminal is to transmit beacon signals, operation proceeds from step 1202 to stop 1204; otherwise operation proceeds back to the input of step 1202 for another check as to whether a beacon signal is to be transmitted.

In step 1204, the wireless terminal checks whether or not it is time to transmit a beacon signal burst. If it is determined in step 1204 that it is time to transmit a beacon signal burst, then operation proceeds to step 1206, where the wireless terminal transmits a beacon signal burst including one or more beacon symbols, each beacon symbol occupying a beacon symbol transmission unit. Operation proceeds from step 1206 to step 1202.

If it is determined in step 1204 that it is not time to transmit a beacon signal burst, then operation proceeds to step 1208, in which the wireless terminal determines whether or not it is time for potential user data transmissions. If it is determined in step 1208 that it is the time allocated for potential user data transmissions, then operation proceeds from step 1208 to step 1210, otherwise operation proceeds from step 1208 to step 1202.

In step 1210, the wireless terminal determines if the wireless terminal is to transmit user data. If the wireless terminal is to transmit user data, then operation proceeds from step 1210 to step 1212, where the wireless terminal transmits user data using data symbols transmitted at an average per symbol power level that is at least 50 percent lower than the average per beacon symbol power level of beacon symbols transmitted by said wireless terminal. If it is determined in step 1210, that the wireless terminal is not to transmit user data at this time, e.g., the wireless terminal has no backlog of user data waiting to be transmitted and/or a peer node to which the wireless terminal wants to send the data is not ready to receive the user data, then operation proceeds back to step 1202.

Figure 13:
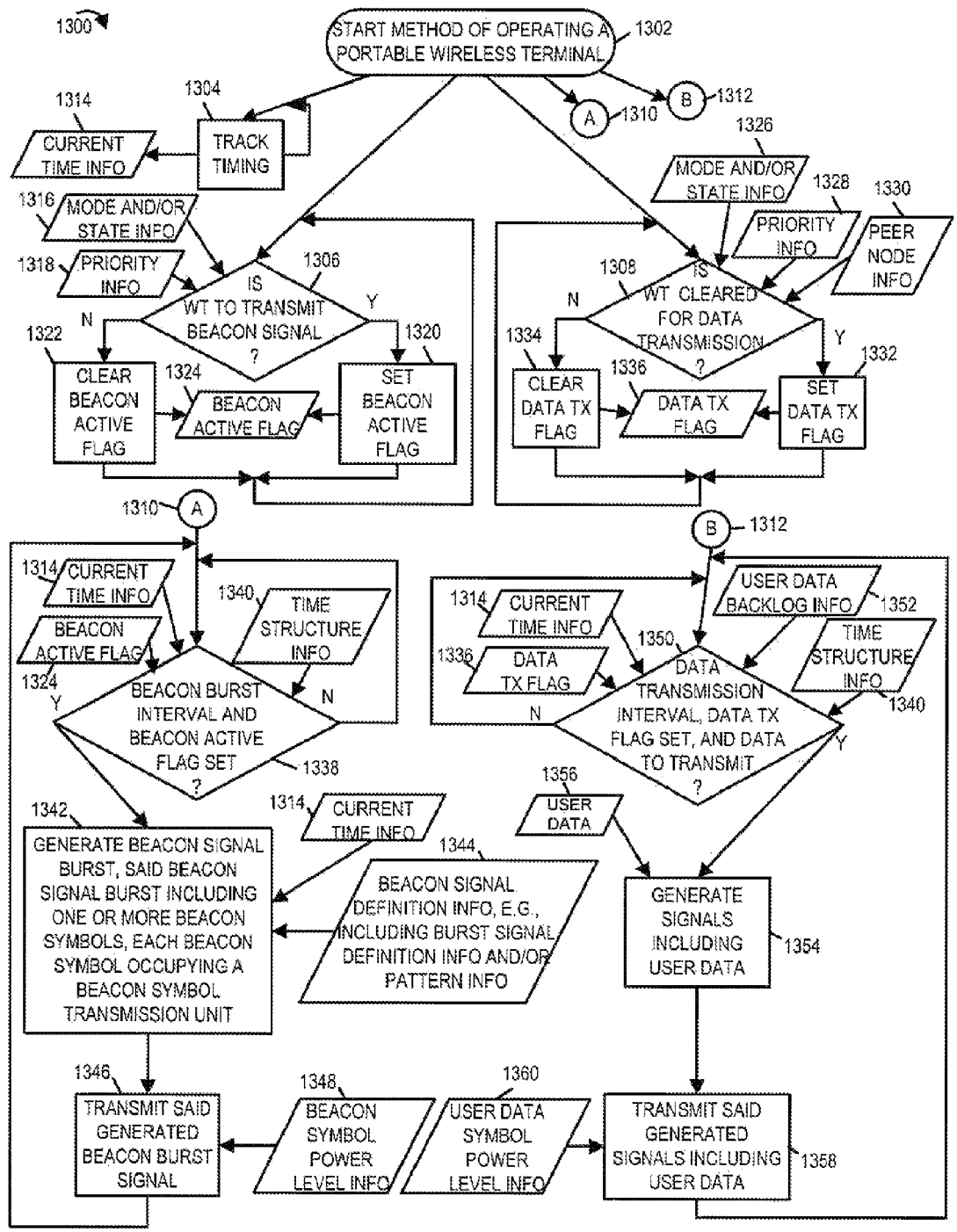
FIG. 13 is a drawing of a flowchart of an exemplary method of operating a portable wireless terminal, e.g., a battery powered mobile node, in accordance with various embodiments.

FIG. 13 is a drawing of a flowchart 1300 of all exemplary method of operating a portable wireless terminal, e.g., a battery powered mobile node, in accordance with various embodiments. Operation starts in step 1302, where the wireless terminal is powered on and initialized. Operation proceeds from start step 1302 to steps 1304, 1306, 1308, connecting node A 1310 and connecting node B 1312.

In step 1304, which is performed on an ongoing basis, the wireless terminal tracks timing, outputting current time information 1314. Current time information 1314 identifies, e.g., an index value in a recurring timing structure being used by the wireless terminal.

In step 1306, the wireless terminal determines whether or not the wireless terminal is to transmit a beacon signal. The wireless terminal uses mode and/or state information 1316 and/or priority information 1318 in determining whether or not the wireless terminal should transmit a beacon signal. If the wireless terminal decides in step 1306 that the wireless terminal is to transmit a beacon signal, operation proceeds to step 1320, where the wireless terminal sets beacon active flag 1324. However, if the wireless terminal decides in step 1306 that the wireless terminal is not to transmit a beacon signal operation proceeds to step 1322, where the wireless terminal clears the beacon active flag 1324. Operation proceeds from step 1320 or step 1322 back to step 1306, where the wireless terminal again tests as to whether or not a beacon signal should be transmitted.

In step 1308, the wireless terminal determines whether or not the wireless terminal is cleared for data transmissions. The wireless terminal uses mode and/or state information 1326, priority information 1328, and/or peer node information 1330, e.g., information indicating whether or not a peer wireless terminal is receptive and able to receive user data, in determining whether or not the wireless terminal is cleared for data transmission. If the wireless terminal decides in step 1308 that the wireless terminal is cleared to transmit user data, operation proceeds to step 1332, where the wireless terminal sets data transmission flag 1336. However, if the wireless terminal decides in step 1308 that the wireless terminal is not cleared for user data transmissions, operation proceeds to step 1334, where the wireless terminal clears the data transmission flag 1336. Operation proceeds from step 1332 or step 1334 back to step 1308, where the wireless terminal again tests as to whether or not the wireless terminal is cleared for data transmission.

Returning to connecting node A 1310, operation proceeds from connecting node A 1310 to step 1338. In step 1338, the wireless terminal checks as to whether the current time information 1314 indicates a beacon burst interval with respect to the time structure information 1340 and whether or not the beacon active flag 1324 is set. If the time indicates that it is a beacon burst interval and that the beacon active flag is set, then operation proceeds from step 1338 to step 1342; otherwise operation proceeds back to the input of step 1338 for another test of conditions.

In step 1342, the wireless terminal generates a beacon signal burst, said beacon signal burst including one or more beacon symbols, each beacon symbol occupying a beacon symbol transmission unit. The wireless terminal utilizes current time information 1314 and stored beacon signal definition information 1344 in generating the beacon signal burst. The beacon signal definition information 1344 includes, e.g., burst signal definition information and/or pattern information. In some embodiments, beacon signal burst information includes information identifying a subset of OFDM tone-symbols used for conveying beacon symbols corresponding to the generated beacon burst signal for the wireless terminal within a set of potential OFDM tone-symbols which may be used to carry beacon symbols. In some embodiments, the tone-subset for one beacon signal burst may be, and sometimes is, different from one beacon signal burst to the next within the same beacon signal, e.g., in accordance with a predetermined hopping pattern. In some embodiments, beacon signal information includes information identifying the modulation symbol values to be conveyed by the beacon tone symbols of the generated beacon burst signal. In some embodiments, a sequence of beacon signal bursts is used to define a beacon signal, e.g., corresponding to a particular wireless terminal. In some embodiments, a pattern of beacon symbols is utilized to define the beacon signal, e.g., a particular pattern within the beacon burst signal.

Operation proceeds from step 1342 to step 1346, in which the wireless terminal transmits the generated beacon burst signal. The wireless terminal uses stored beacon symbol power level information 1348 to determine the transmission power level of the beacon symbols within the transmitted beacon burst signal. Operation then proceeds from step 1346 to step 1338.

Returning to connecting node B 1312 operation proceeds from connecting node B 1312 to step 1350. In step 1350, the wireless terminal checks as to whether the current time information 1314 indicates a data transmission interval with respect to the time structure information 1340, whether or not the data transmission flag 1336 is set, and whether the wireless terminal has data to transmit as indicated by user backlog information 1352. If the indications are that it is a data transmission interval, that the data transmission flag 1336 is set and that the wireless terminal has data waiting to be transmitted, then operation proceeds from step 1350 to step 1354; otherwise operation proceeds back to the input of step 1350 for another test of conditions.

In step 1354, the wireless terminal generates signals including user data 1356. User data 1356 includes, e.g., audio, image, file, and/or text data/information intended for a peer of the wireless terminal.

Operation proceeds from step 1354 to step 1358, in which the wireless terminal transmits the generated signals including user data. The wireless terminal uses stored user data symbol power level information 1360 to determine the transmission power level of the user data symbols to be transmitted. Operation proceeds from step 1358 to step 1350 where the wireless terminal performs checks pertaining to user data transmission.

In some embodiments, the number of beacon symbols within a beacon signal burst occupy less than 10 percent of the available beacon symbol transmission units. In various embodiments, the user data symbols are transmitted at an average per symbol power level that is at least 50 percent lower than the average per beacon symbol power level of transmitted beacon symbols.

Figure 14:
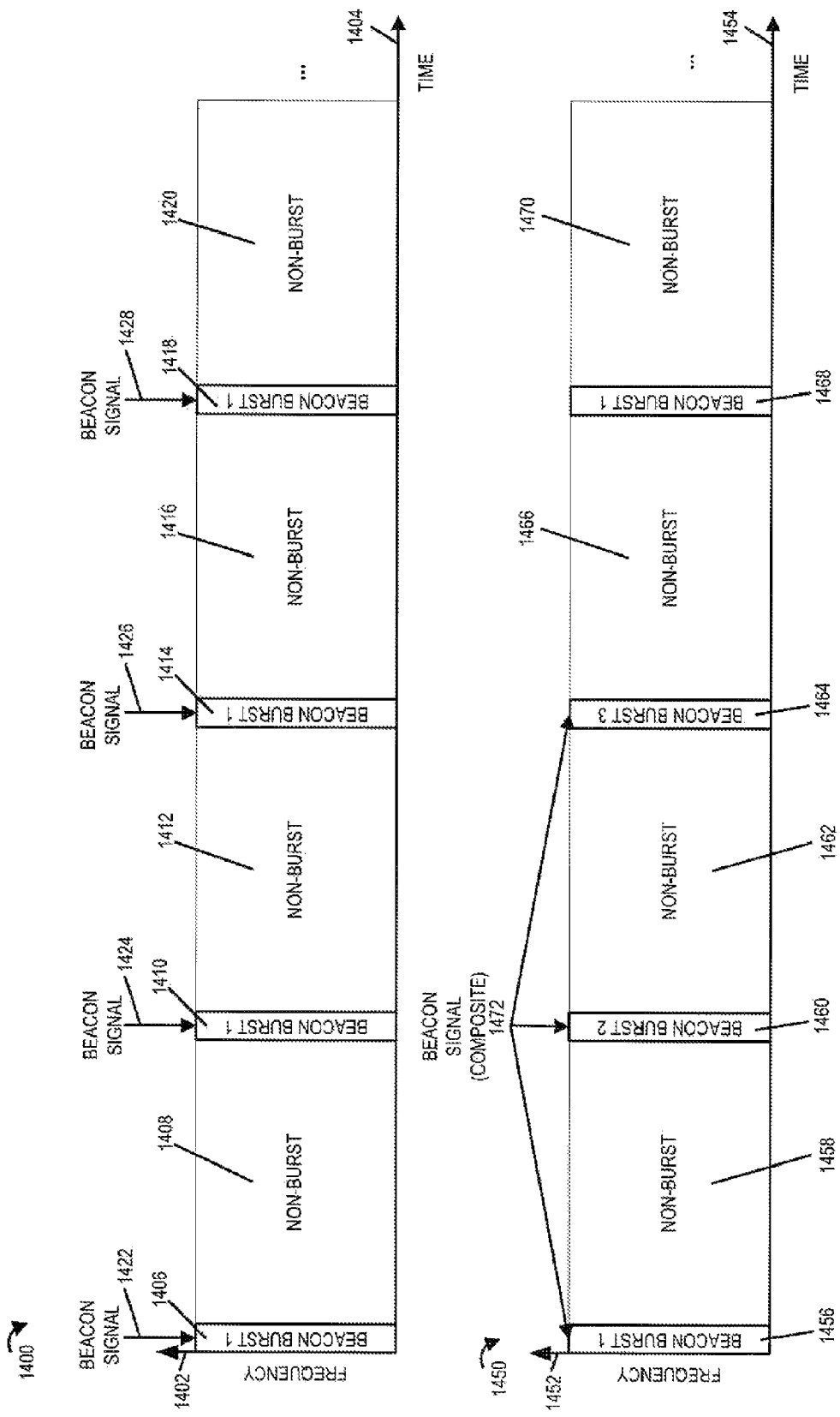
FIG. 14 includes drawings illustrating exemplary beacon signaling from a portable wireless terminal, in accordance with various embodiments

FIG. 14 includes drawing 1400 illustrating exemplary beacon signaling from a portable wireless terminal, in accordance with an exemplary embodiment in which the same beacon burst signal, beacon burst 1, is repeated between non-beacon burst intervals. Each beacon signal burst includes one or more beacon symbols, each beacon symbol occupying a beacon symbol transmission unit, one or more beacon symbols being transmitted during each beacon signal burst. Frequency, e.g., OFDM tones, is plotted on the vertical axis 1402, while time is plotted on horizontal axis 1404. The following sequence is illustrated in drawing 1400: beacon burst 1 signal interval including beacon burst 1 signal 1406, non-burst interval 1408, beacon burst 1 signal interval including beacon burst 1 signal 1410, non-burst interval 1412, beacon burst 1 signal interval including beacon burst 1 signal 1414, non-burst interval 1416, beacon burst 1 signal interval including beacon burst 1 signal 1418, non-burst interval 1420. In this example, each beacon burst signal (1406, 1410, 1414, 1418) corresponds to a beacon signal (1422, 1424, 1426, 1428). In addition in this example, each beacon burst signal (1422, 1424, 1426, 1428) is the same; each beacon burst signal includes the same beacon symbols.

FIG. 14 also includes drawing 1450 illustrating exemplary beacon signaling from a portable wireless terminal in which a beacon signal is a composite signal including a sequence of beacon burst signals. Each beacon signal burst includes one or more beacon symbols, each beacon symbol occupying a beacon symbol transmission unit, one or more beacon symbols being transmitted during each beacon signal burst. Frequency, e.g., OFDM tones, is plotted on the vertical axis 1452, while time is plotted on horizontal axis 1454. The following sequence is illustrated in drawing 1450: beacon burst 1 signal internal including beacon burst 1 signal 1456, non-burst interval 1458, beacon burst 2 signal interval including beacon burst 2 signal 1460, non-burst interval 1462, beacon burst 3 signal interval including beacon burst 3 signal 1464, non-burst interval 1466, beacon burst 1 signal interval including beacon burst 1 signal 1468, non-burst interval 1470. In this example, beacon signal 1472 is a composite signal including beacon burst 1 signal 1456, beacon burst 2 signal 1460 and beacon burst 3 signal 1464. In addition in this example, each beacon burst signal (beacon burst 1 signal 1456, beacon burst 2 signal 1460, beacon burst 3 signal 1464) is different; each beacon burst signal includes a set of beacon symbols which does not match either set corresponding to the other two beacon burst signals.

In some embodiments, the beacon symbols occupy less than 0.3 percent of the air resource including one beacon signal burst and one internal between successive beacon signal bursts. In some such embodiments, the beacon symbols occupy less than 0.1 percent of the air resource including one beacon signal burst and one interval between successive beacon signal bursts. The air resource in some embodiments includes a set of OFDM tone-symbols corresponding to a set of tones for a predetermined time interval.

Figure 15:
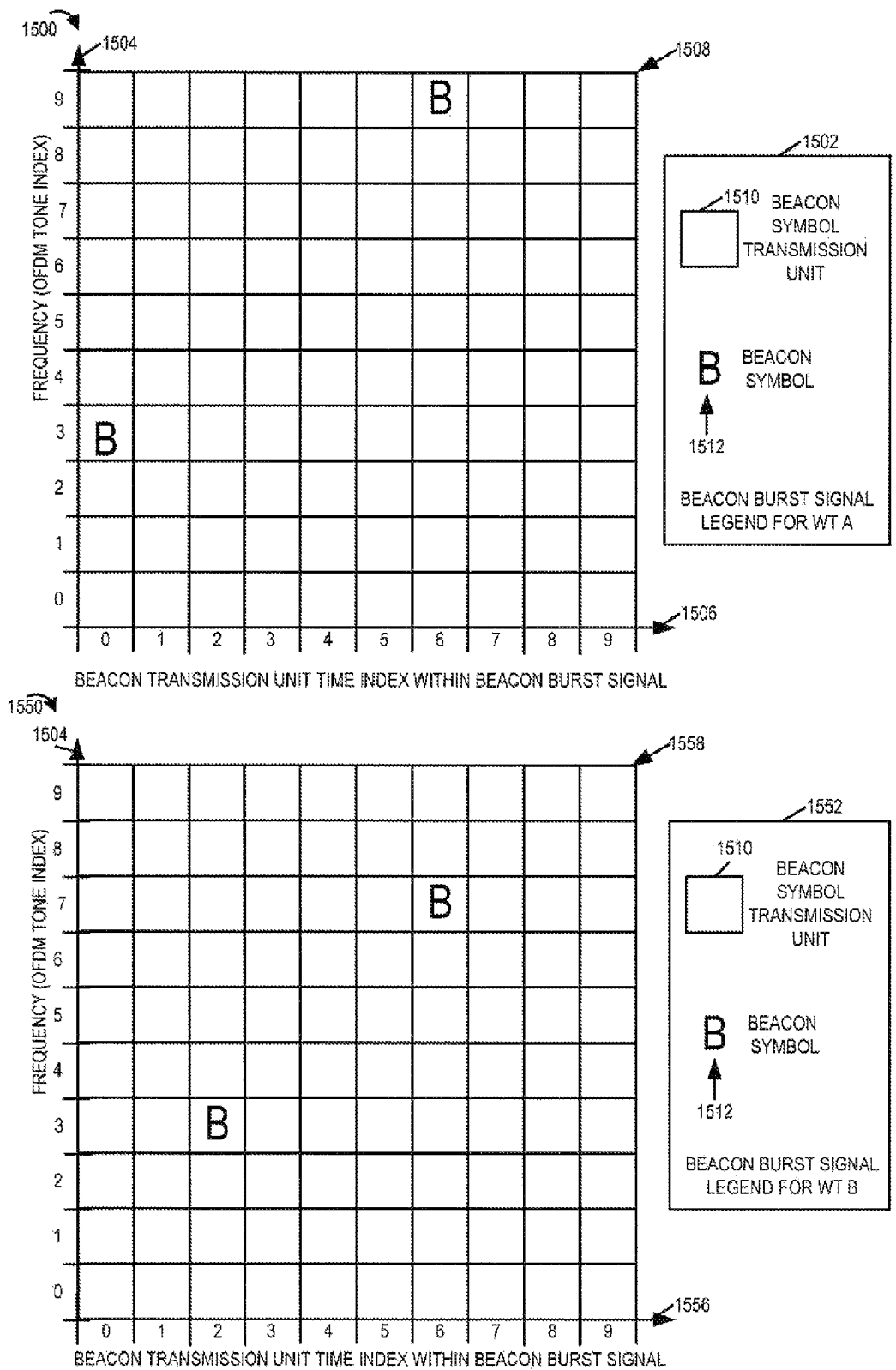
FIG. 15 illustrates that different wireless terminals, in some embodiments, transmit different beacon signals including different beacon burst signals.

FIG. 15 illustrates that different wireless terminals, in some embodiments, transmit different beacon signals including different beacon burst signals. Different beacon signals transmitted from wireless terminals can be, and sometimes are, used for wireless terminal identification. For example, consider that drawing 1500 includes a representation of a beacon burst signal associated with wireless terminal A, while drawing 1550 includes a representation of a beacon burst signal associated with wireless terminal B. Legend 1502 corresponds to drawing 1500, while legend 1552 corresponds to drawing 1550.

Legend 1502 indicates that with respect to the beacon burst signal for WT A, grid box 1510 represents a beacon symbol transmission unit, while large letter B 1512 represents a beacon symbol conveyed by a beacon transmission unit. In drawing 1500, vertical axis 1504 represents frequency, e.g., OFDM tone index, while horizontal axis 1506 represents beacon transmission unit time index within the beacon burst signal. Beacon burst signal 1508 includes 100 beacon symbol transmission units 1510. Two of those beacon symbol transmission units carry a beacon symbol B 1512. A first beacon symbol has frequency index=3 and time index=0; a second beacon symbol has frequency index=9 and time index=6. The other beacon symbol transmission units are left unused. Thus in this example 2% of the transmission resources of the beacon burst are used to convey beacon symbols. In some embodiments beacon symbols occupy less than 10% of the transmission resources of the beacon burst.

Legend 1552 indicates that with respect to the beacon burst signal for WT B, grid box 1510 represents a beacon symbol transmission unit, while large letter B 1512 represents a beacon symbol conveyed by a beacon transmission unit. In drawing 1550, vertical axis 1504 represents frequency, e.g., OFDM tone index, while horizontal axis 1556 represents beacon transmission unit time index within the beacon burst signal. Beacon burst signal 1558 includes 100 beacon symbol transmission units 1510. Two of those beacon symbol transmission units carry a beacon symbol B 1512. A first beacon symbol has frequency index=3 and time index=2, a second beacon symbol has frequency index=7 and time index=6. The other beacon symbol transmission units are left unused. Thus in this example 2% of the transmission resources of the beacon burst are used to convey beacon symbols.

FIG. 16 is a drawing 1600 and corresponding legend 1602 illustrating a feature of some embodiments, in which a beacon symbol transmission unit includes a plurality of OFDM symbol transmission units. In this example, a beacon symbol transmission unit occupies two adjacent OFDM symbol transmission units. In other embodiments, a beacon symbol transmission unit occupies a different number of OFDM transmission units, e.g., 3, or 4. This feature of using multiple OFDM transmission units for a beacon symbol transmission unit can facilitate easy detection of a beacon signal, e.g., where precise timing and/or frequency synchronization between wireless terminals may not exist. In some embodiments, the beacon symbol includes an initial beacon symbol portion followed by an extension beacon symbol portion. For example, the initial beacon symbol portion includes a cyclic prefix portion followed by a body portion, and the extension beacon symbol portion is a continuation of the body portion.

Legend 1602 illustrates that for the exemplary beacon burst signal 1610, an OFDM transmission unit is represented by square box 1612, while a beacon symbol transmission unit is represented by rectangular box 1614 with heavy borders. Large letters BS 1616 represent a beacon symbol conveyed by a beacon transmission unit. In drawing 1600, vertical axis 1604 represents frequency, e.g., OFDM tone index, while horizontal axis 1606 represents beacon transmission unit time index within the beacon burst signal, and horizontal axis 1608 represents OFDM symbol time interval index within the beacon burst signal. Beacon burst signal 1610 includes 100 OFDM symbol transmission units 1612 and 50 beacon symbol transmission units 1614. Two of those beacon symbol transmission units carry a beacon symbol BS 1616. A first beacon symbol has frequency index=3, beacon transmission unit time index=0, and OFDM time index 0-1; a second beacon symbol has frequency index=9, beacon transmission unit time index=3, and OFDM time index 6-7. The other beacon symbol transmission units are left unused. Thus in this example 4% of the transmission resources of the beacon burst are used to convey beacon symbols. In some embodiments beacon symbols occupy less than 10% of the transmission resources of the beacon burst.

Figure 17:
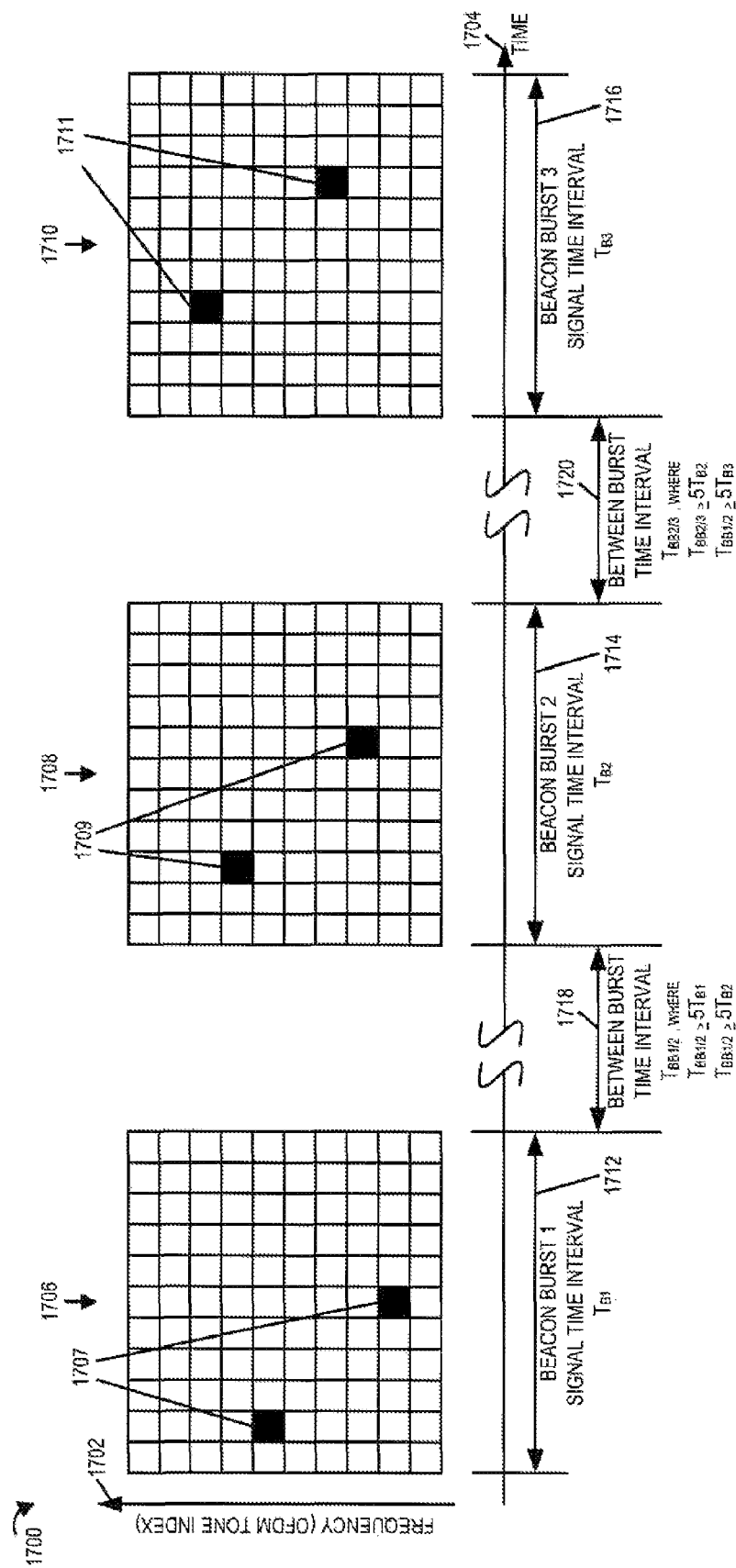
FIG. 17 is a drawing used to illustrate an exemplary beacon signal comprising a sequence of beacon burst signals and to illustrate timing relationships of some embodiments.

FIG. 17 is a drawing 1700 used to illustrate an exemplary beacon signal comprising a sequence of beacon burst signals and to illustrate timing relationships of some embodiments. Drawing 1700 includes a vertical axis 1702 representing frequency, e.g., OFDM tone index, while the horizontal axis 1704 represents time. The exemplary beacon signal anal of drawing 1700 includes beacon burst 1 signal 1706, beacon burst 2 signal 1708 and beacon burst 3 signal 1710. The exemplary beacon signal of drawing 1700 is, e.g., the composite beacon signal 1472 of drawing 1450 of FIG. 14.

Beacon burst signal 1706 includes two beacon symbols 1707; beacon burst signal 1708 includes two beacon symbols 1709; beacon burst signal 1710 includes two beacon symbols 1711. In this example, the beacon symbols in each burst occur in different beacon transmission unit positions in the time/frequency grid. In addition in this example, the change of positions is in accordance with a predetermined tone hopping sequence.

Along time axis 1704, there is a beacon burst 1 signal time interval $T_{B1}$ 1712 corresponding to beacon burst 1 signal 1706, followed by a between burst time interval $T_{BB1/2}$ 1718, followed by a beacon burst 2 signal time interval $T_{B2}$ 1714 corresponding to beacon burst 2 signal 1708, followed by a between burst time interval $T_{BB2/3}$ 1720, followed by a beacon burst 3 signal time interval $T_{B3}$ 1716 corresponding to beacon burst 3 signal 1710. In this example, the time between beacon bursts is at least 5 times greater than the time of an adjacent burst. For example, $T_{BB1/2} \geq 5\, T_{B1}$ and $T_{BB1/2} \geq 5\, T_{B2}$; $T_{BB2/3} \geq 5\, T_{B2}$ and $T_{BB2/3} \geq 5\, T_{B3}$. In this example, each of the beacon bursts (1706, 1708, 1710) have the same time duration: e.g., $T_{B1}=T_{B2}=T_{B3}$.

Figure 18:
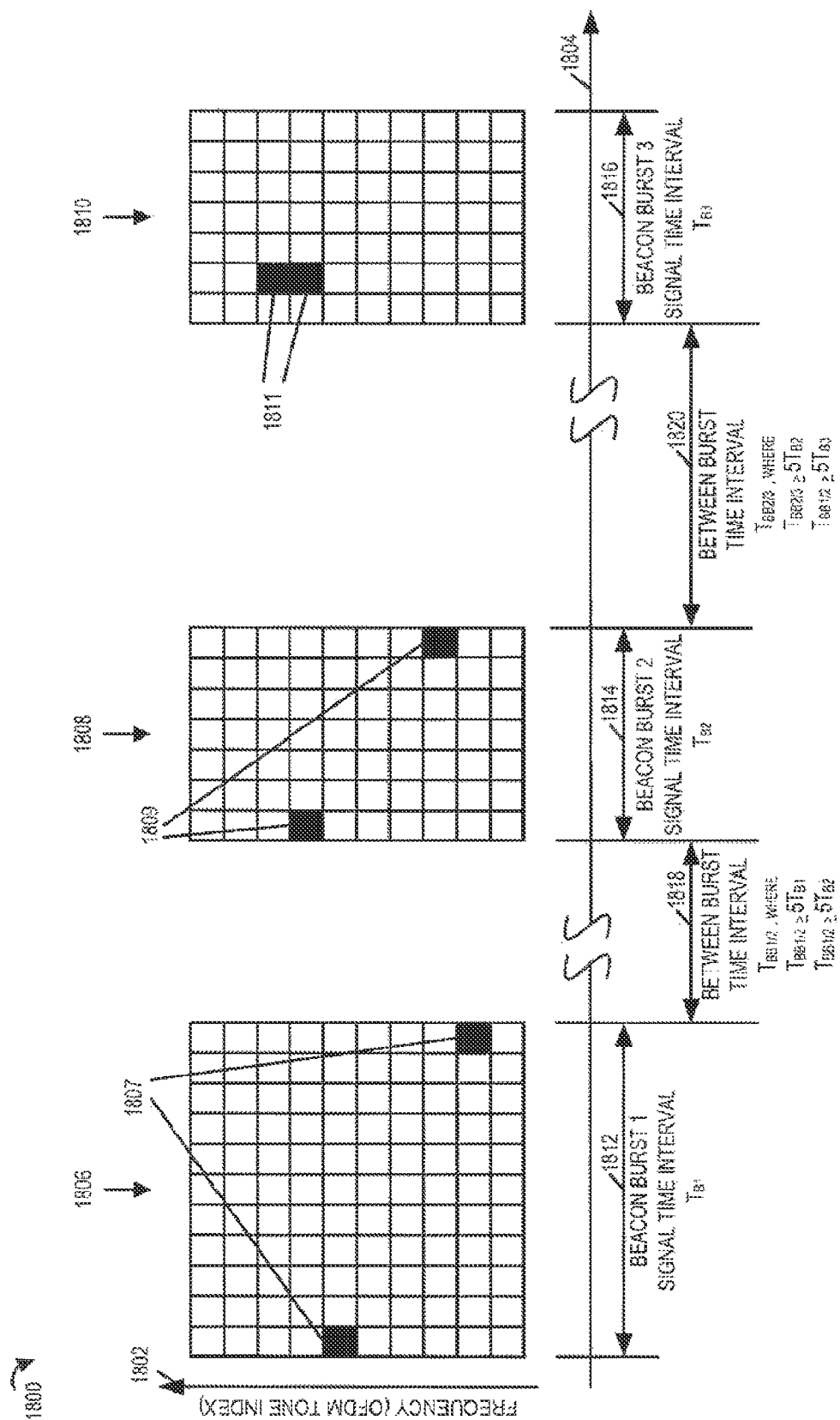
FIG. 18 is a drawing used to illustrate an exemplary beacon signal comprising a sequence of beacon burst signals and to illustrate timing relationships of some embodiments.

FIG. 18 is a drawing 1800 used to illustrate an exemplary beacon signal comprising a sequence of beacon burst signals and to illustrate timing relationships of some embodiments. Drawing 1800 includes a vertical axis 1802 representing frequency, e.g., OFDM tone index, while the horizontal axis 1804 represents time. The exemplary beacon signal of drawing 1800 includes beacon burst 1 signal 1806, beacon burst 2 signal 1808 and beacon burst 3 signal 1810. The exemplary beacon signal of drawing 1800 is, e.g., the composite beacon signal 1472 of drawing 1450 of FIG. 14.

Beacon burst signal 1806 includes two beacon symbols 1807; beacon burst signal 1808 includes two beacon symbols 1809; beacon burst signal 1810 includes two beacon symbols 1822. In this example, the beacon symbols in each burst occur in different beacon transmission unit positions in the time/frequency grid. In addition in this example, the change of positions is in accordance with a predetermined tone hopping sequence.

Along time axis 1804, there is a beacon burst 1 signal time interval $T_{B1}$ 1812 corresponding to beacon burst 1 signal 1806, followed by a between burst time interval $T_{BB1/2}$ 1818, followed by a beacon burst 2 signal time interval $T_{B2}$ 1814 corresponding to beacon burst 2 signal 1808, followed by a between burst time interval $T_{BB2/3}$ 1820, followed by a beacon burst 3 signal time interval $T_{B3}$ 1816 corresponding to beacon burst 3 signal 1810. In this example, the time between beacon bursts is at least 5 times greater than the time of an adjacent burst. For example, $T_{BB1/2} \geq 5\, T_{B1}$ and $T_{BB1/2} \geq 5\, T_{B2}$; $T_{BB2/3} \geq 5\, T_{B2}$ and $T_{BB2/3} \geq 5\, T_{B3}$. In this example, each of the beacon bursts (1806, 1808, 1810) have the different time duration, e.g., $T_{B1} \neq T_{B2} \neq T_{B3} \neq T_{B1}$. In some embodiments, at least two of the beacon burst signals in the composite beacon signal have different duration.

Figure 19:
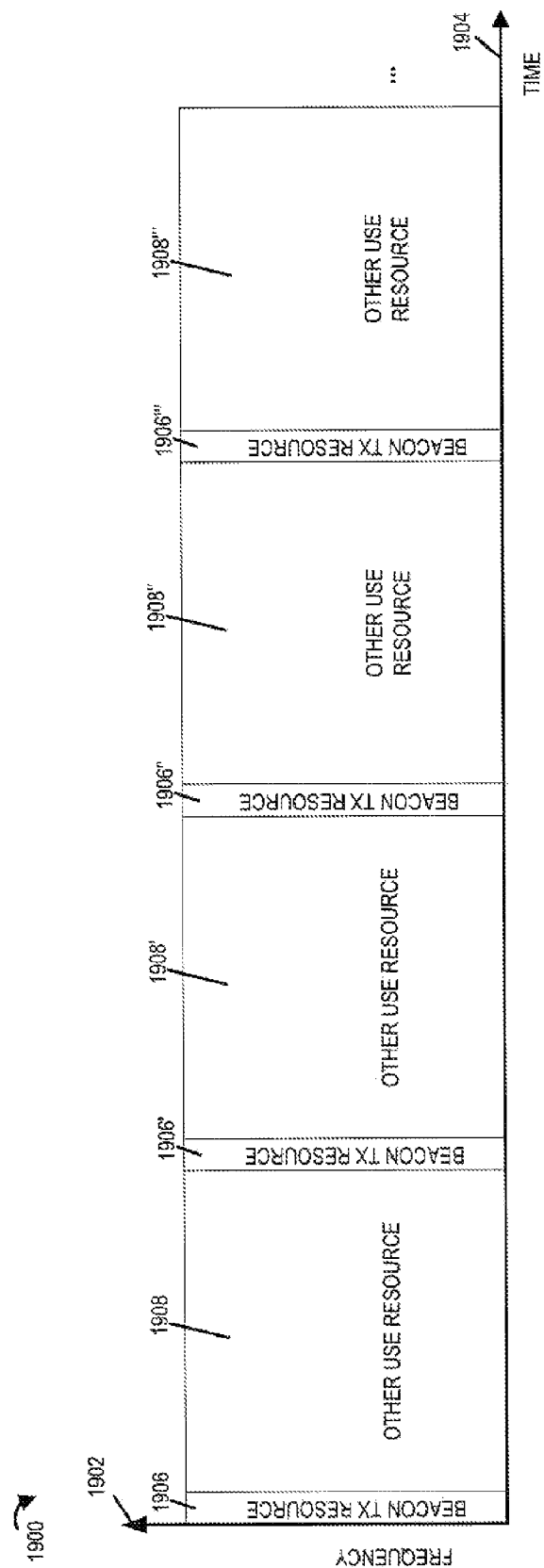
FIG. 19 is a drawing illustrating exemplary air link resource partitioning by a wireless terminal in a mode of operation in which the wireless terminal transmits a beacon signal.

FIG. 19 is a drawing 1900 illustrating exemplary air link resource partitioning by a wireless terminal in a mode of operation in which the wireless terminal transmits a beacon signal. Vertical axis 1902 represents frequency, e.g., OFD tones, while horizontal axis 1904 represents time. In this example, there is a beacon transmission resource 1906, followed by an other use resource 1908, followed by a beacon transmission resource 1906', followed by an other use resource 1908', followed by a beacon transmission resource 1906", followed by an other use resource 1908", followed by a beacon transmission resource 1906''', followed by an other use resource 1908'''. A beacon transmission resource of FIG.

19 corresponds, e.g., to a beacon burst of FIG. 14, while an other use resource of FIG. 19 corresponds, e.g., to a non-burst interval of FIG. 14.

Figure 20:
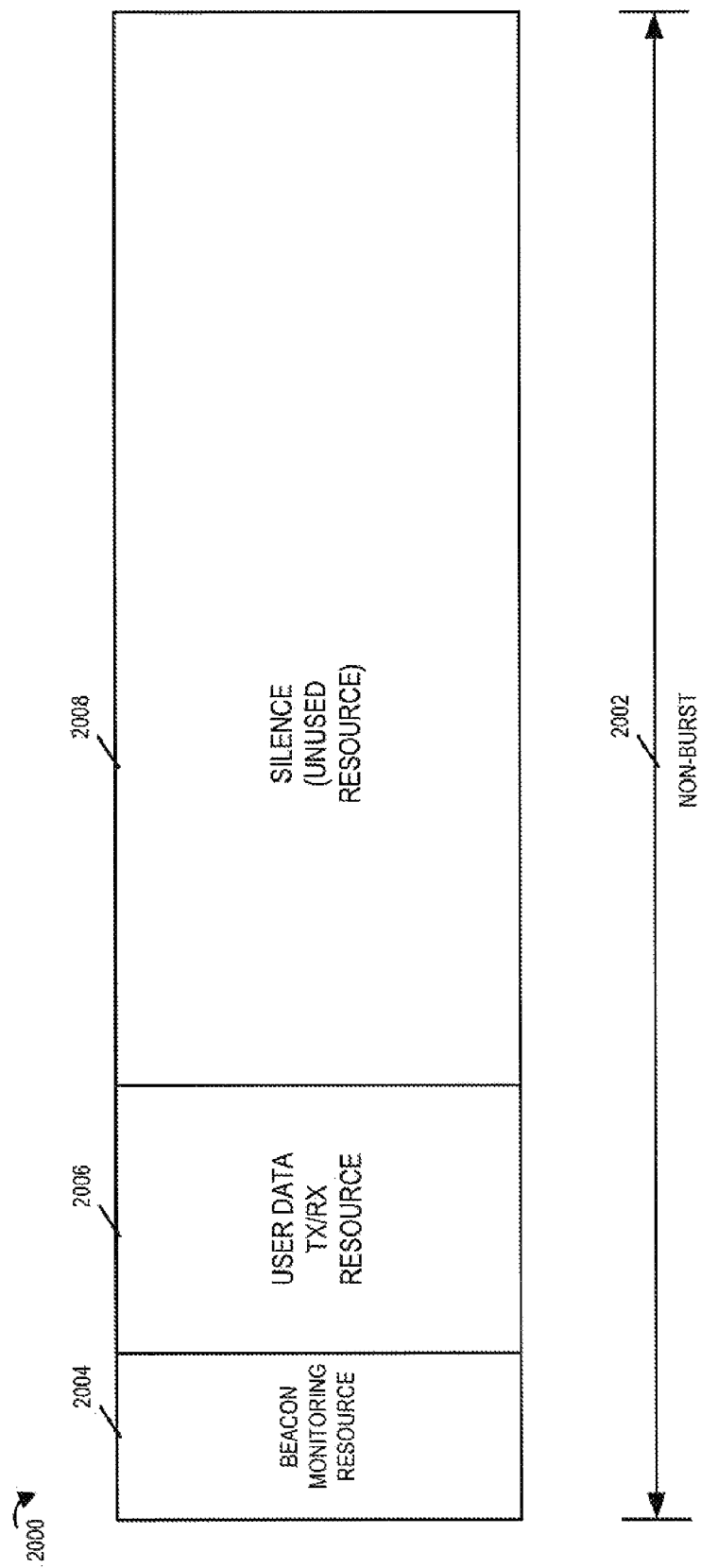
FIG. 20 describes an exemplary air link resource portion associated with uses other than beacon signal transmission for an exemplary mode of wireless terminal operation in which the wireless terminal transmits a beacon signal and can receive and/or transmit user data, e.g., an active mode of operation.

FIG. 20 describes an exemplary other use resource, e.g., resource 2000, for an exemplary mode of wireless terminal operation in which the wireless terminal transmits a beacon signal and can receive and/or transmit user data, e.g., an active mode of operation. Other use resource 2000 occurs during non-burst interval 2002 and includes: a beacon monitoring resource 2004, a user data transmission/receive resource 2006 and a silence or unused resource 2008. The beacon monitoring resource 2004 represents air link resources, e.g., a combination of frequency and time, in which the wireless terminal detects for the presence of other beacon signals, e.g., from other wireless terminals and/or fixed position reference beacon signal transmitters. The user data resource 2006 represents air link resources, e.g., a combination of frequency and time, in which the wireless terminal can transmit user data and/or receive user data. The silence air link resource 2008 represents unused air link resources, e.g., where the wireless terminal neither receives nor transmits. During the silence resource 2008, the wireless can be, and sometimes is, in a sleep state in which power consumption is lowered to conserve energy.

Figure 21:
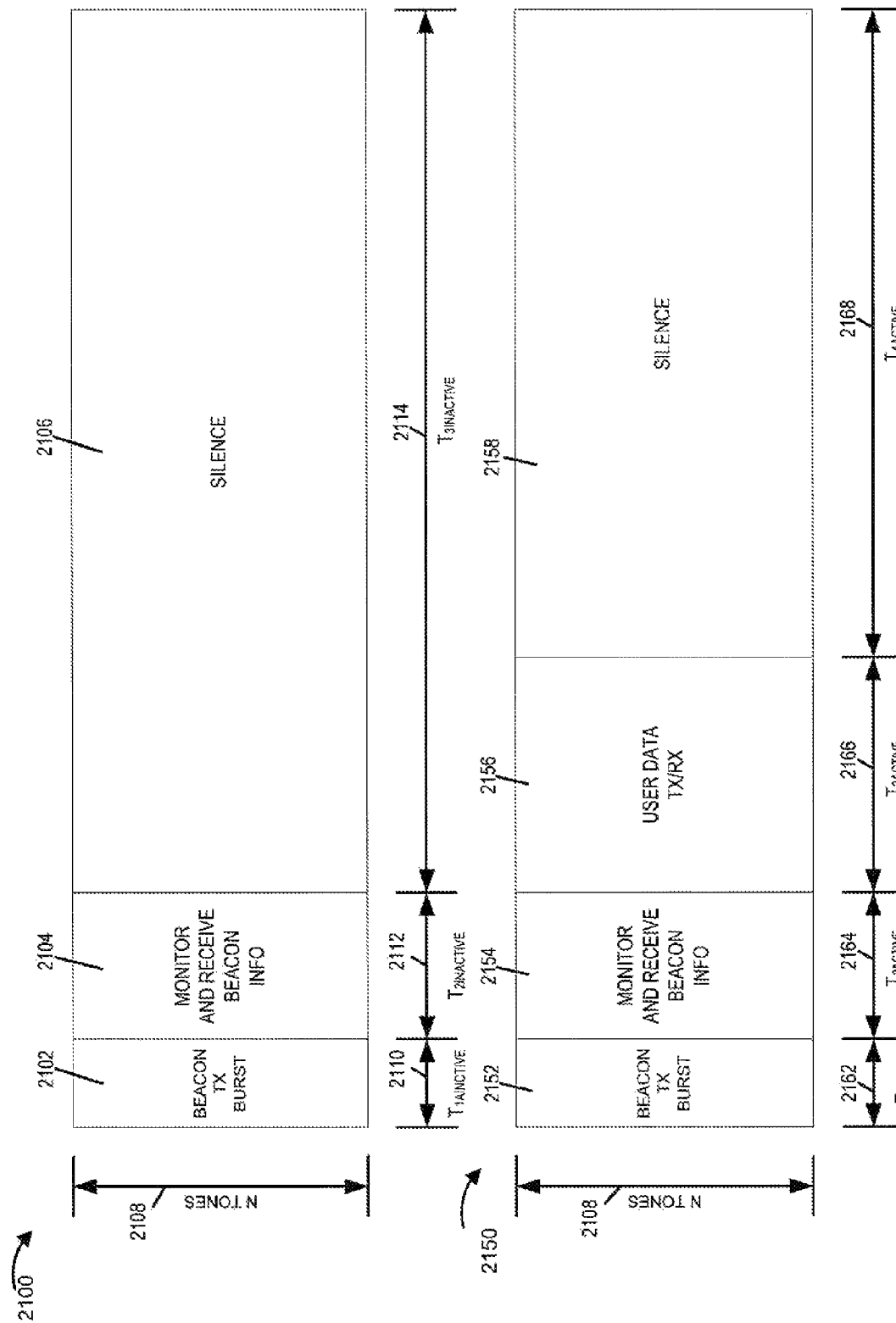
FIG. 21 illustrates two exemplary modes of wireless terminal operation in which the wireless terminal is transmitting a beacon signal, e.g., an inactive mode and an active mode.

FIG. 21 illustrates two exemplary modes of wireless terminal operation in which the wireless terminal is transmitting a beacon signal, e.g., an inactive mode and an active mode. Drawing 2100 corresponds to the exemplary inactive mode of operation, while drawing 2150 corresponds to the active mode of operation.

In the exemplary inactive mode of operation, the wireless terminal does not transmit or receiver user data. In drawing 2100, the air link resource used by the wireless terminal occupies N tones 2108. In some embodiments, N is greater than or equal to 100. In drawing 2100, there is a beacon transmission burst resource 2102 with a corresponding time duration $T_{1inactive}$ 2110, followed by a monitor and receive beacon information resource 2104 with a corresponding time duration $T_{2inactive}$ 2112, followed by a silence resource 2106 with a corresponding time duration $T_{3inactive}$ 2114. In various embodiments, $T_{1inactive} < T_{2inactive} < T_{3inactive}$. In some embodiments, $T_{2inactive} \geq 4T_{1inactive}$. In some embodiments, $T_{3inactive} \geq 10T_{2inactive}$. For, example, in one exemplary embodiment N>100, e.g. 113, $T_{1inactive}$=50 OFDM symbol transmission time intervals, $T_{2inactive}$=200 OFDM symbol transmission time intervals, and $T_{3inactive}$=2000 OFDM symbol transmission time intervals. In such an embodiment, if beacon symbols are allowed to occupy at most 10% of the burst beacon signal resource, beacon symbols occupy approximately at most 0.22% of the total resource.

In the exemplary active mode of operation, the wireless terminal can transmit and receive user data. In drawing 2150, the air link resource used by the wireless terminal occupies N tones 2108. In some embodiments, N is greater than or equal to 100. In drawing 2150, there is a beacon transmission burst resource 2152 with a corresponding time duration $T_{1active}$ 2162, followed by a monitor and receive beacon information resource 2154 with a corresponding time duration $T_{2active}$ 2164, followed by a user data transmit/receive resource 2156 with a corresponding time duration $T_{3active}$ 2166, followed by a silence resource 2158 with a corresponding time duration $T_{4active}$ 2168. In various embodiments, $T_{1active} < T_{2active} < T_{3active}$. In some embodiments, $T_{2active} \geq 4T_{1active}$. In some embodiments, $(T_{3active} + T_{4active}) \geq 10T_{2inactive}$. In various embodiments $T_{1inactive} = T_{1active}$. In some embodiments, there are guard intervals between at least some of the different types of intervals.

Figure 22:
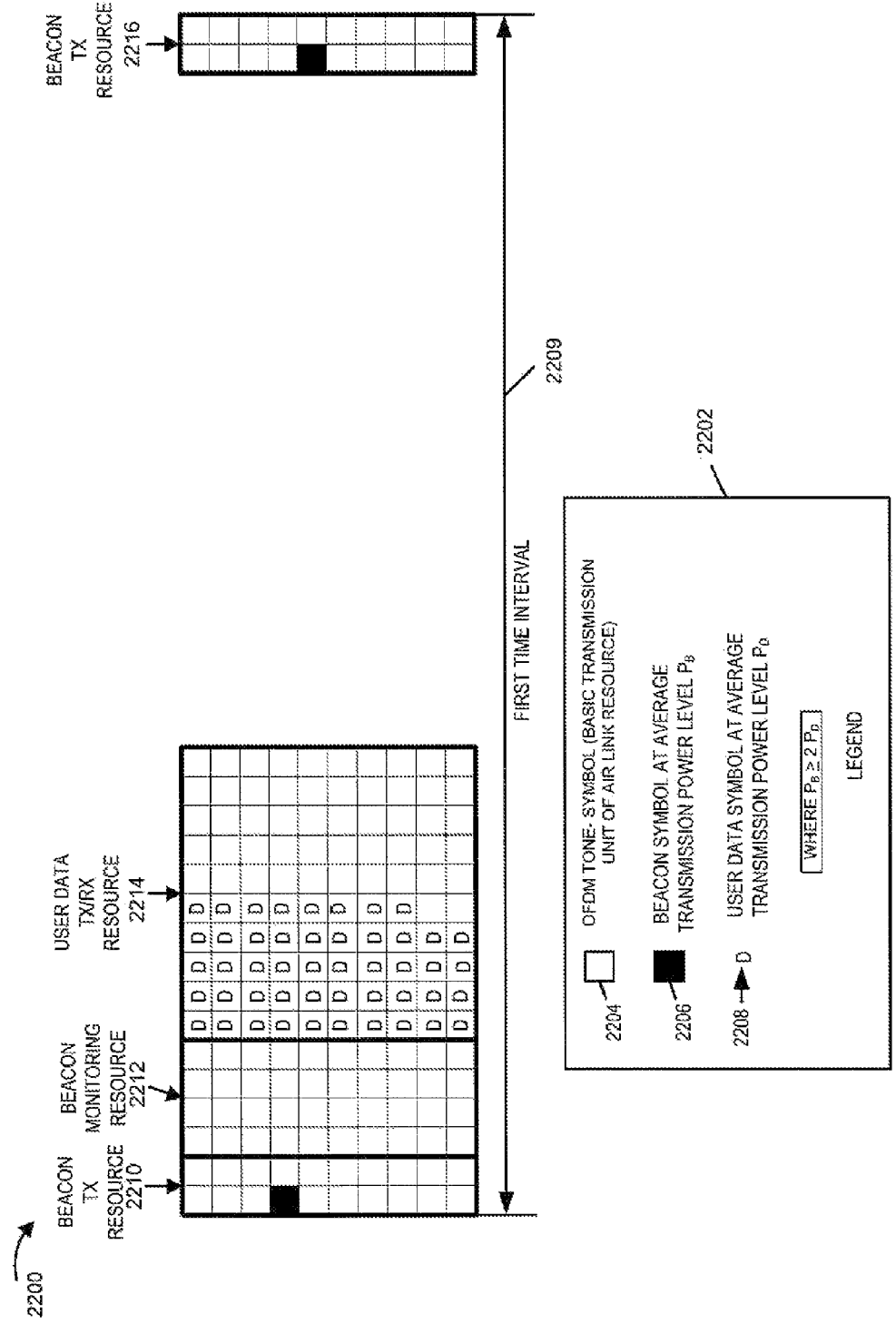
FIG. 22 includes a drawing and corresponding legend illustrating exemplary wireless terminal air link resource utilization during an exemplary first time interval including two beacon bursts.

FIG. 22 is a drawing 2200 and corresponding legend 2202 illustrating exemplary wireless terminal air link resource utilization during an exemplary first time interval 2209 including two beacon bursts. Legend 2202 indicates that a square 2204 indicates an OFDM tone-symbol, the basic transmission unit of the air link resource. Legend 2202 also indicates that: (i) a beacon symbol is indicated by a shaded square 2206 and is transmitted at an average transmission power level $P_B$, (ii) a user data symbol is indicated by a letter D 2208 and that data symbols are transmitted such as to have an average transmission power level $P_D$, and (iii) $P_B \geq 2P_D$.

In this example, the beacon transmission resource 2210 includes 20 OFDM tone-symbols; the beacon monitoring resource 2212 includes 40 OFDM tone-symbols; the user data transmission/receive resource 2214 includes 100 OFDM tone-symbols; and the beacon transmission resource 2216 include 20 OFDM tone-symbols.

Beacon transmission resources 2210 and 2216 each carry one beacon symbol 2206. This represents 5% of the transmission resources allocated for beacon burst signaling. Forty-eight (48) of the 100 OFDM symbols of the user data TX/RX resource 2214 carry a user data symbol being transmitted by the wireless terminal. This represents 48/180 OFDM symbols being used by the wireless terminal during the first time interval 2209. Assume that the WT switches from TX to receive for the 6th OFDM symbol transmission time interval of the user data portion, then user data symbols are transmitted on 48/90 OFDM tone-symbols used by the wireless terminal for transmission during the first time interval. In some embodiments, when the wireless terminal transmits user data, the wireless terminal transmits user data on at least 10% of the transmission resource used by the wireless terminal during a period of time including multiple beacon signal bursts.

In some embodiments, at different times the user data transmit/receive resource can be, and sometimes is used differently, e.g., exclusively for transmission including user data, exclusively for reception including user data, portioned between receive and transmit, e.g., on a time share basis.

Figure 23:
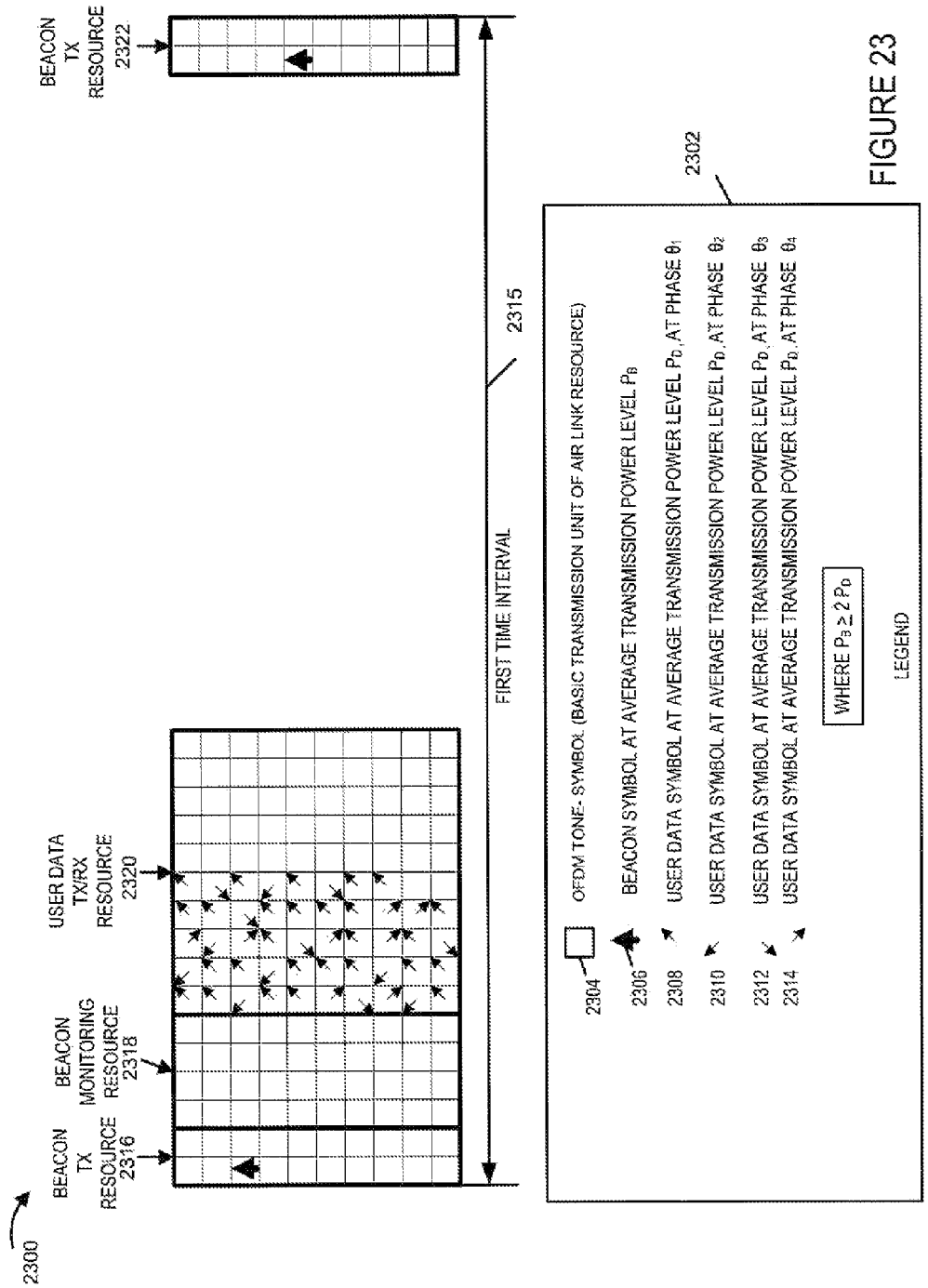
FIG. 23 includes a drawing and corresponding legend illustrating exemplary wireless terminal air link resource utilization during an exemplary first time interval including two beacon bursts.

FIG. 23 is a drawing 2300 and corresponding legend 2302 illustrating exemplary wireless terminal air link resource utilization during an exemplary first time interval 2315 including two beacon bursts. Legend 2302 indicates that a square 2304 indicates an OFDM tone-symbol, the basic transmission unit of the air link resource. Legend 2302 also indicates that: (i) a beacon symbol is indicated by a large vertical arrow 2306 and is transmitted at an average transmission power level $P_B$, (ii) user data symbols are indicated by small arrows 2308, 2310, 2312, 2314, which correspond to different phases ($\Theta_1, \Theta_2, \Theta_3, \Theta_4$), respectively, e.g., corresponding to QPSK, and that data symbols are transmitted such as to have an average transmission power level $P_D$, and (iii) $P_B \geq 2P_D$.

In this example, the beacon transmission resource 2316 includes 20 OFDM tone-symbols; the beacon monitoring resource 2318 includes 40 OFDM tone-symbols; the user data transmission/receive resource 2320 includes 100 OFDM tone-symbols; and the beacon transmission resource 2322 includes 20 OFDM tone-symbols.

Beacon transmission resources 2316 and 2322 each carry one beacon symbol 2306. In this embodiment, the beacon symbols have the same amplitude and phase. This amount of beacon symbols represents 5% of the transmission resources allocated for beacon burst signaling. Forty-eight (48) of the 100 OFDM symbols of the user data TX/RX resource 2320 carry a user data symbol. In this embodiment, different data symbols can and sometimes do, have different phase. In some embodiments, different data symbols can, and sometimes do have different amplitude. This amount of data symbols represents 48/180 OFDM symbols being used by the wireless terminal during the first time interval 2315. Assume that the WT switches from TX to receive for the $6^{th}$ OFDM symbol transmission time interval of the user data portion, then user data symbols are transmitted on 48/90 OFDM tone-symbols used by the wireless terminal for transmission during the first time interval. In some embodiments, when the wireless terminal transmits user data, the wireless terminal transmits user data on at least 10% of the transmission resource used by the wireless terminal during a period of time including multiple beacon signal bursts.

In some embodiments, at different times the user data transmit/receive resource can be, and sometimes is used differently, e.g., exclusively for transmission including user data, exclusively for reception including user data, portioned between receive and transmit, e.g., on a time share basis.

Figure 24:
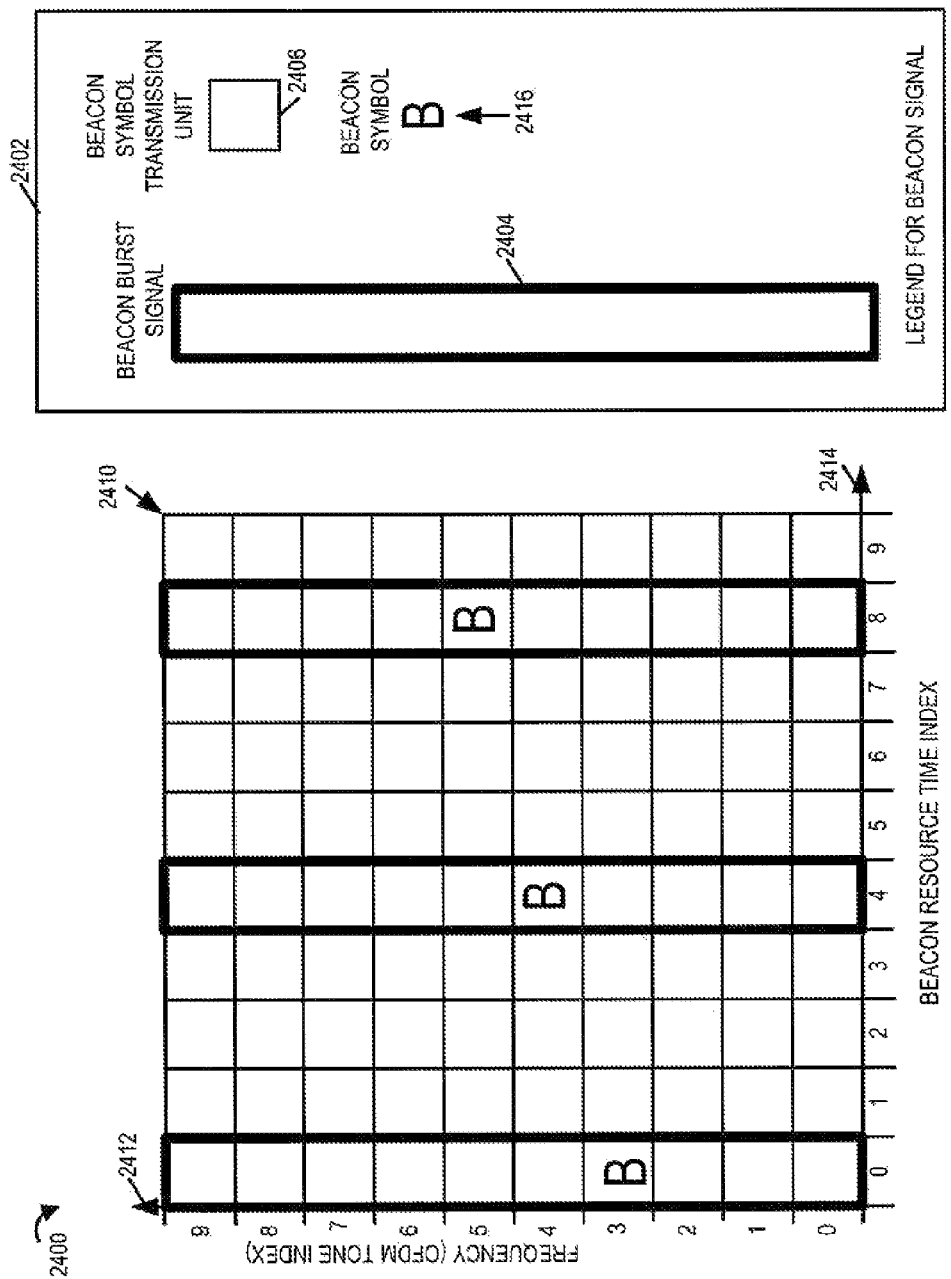
FIG. 24 illustrates an alternative descriptive representation with respect to beacon signals, in accordance with various embodiments.

FIG. 24 illustrates an alternative descriptive representation with respect to beacon signals. Drawing 2400 and associated legend 2402 are used to describe an exemplary beacon signal in accordance with various embodiments. Vertical axis 2412 represents frequency, e.g., OFDM tone index, while horizontal axis 2414 represents beacon resource time index. Legend 2402 identifies that a beacon signal burst is identified by heavy line rectangle 2404, a beacon symbol transmission unit is identified by a square box 2406, and a beacon symbol is represented by a bold letter B 2416. The beacon signal resource 2410 includes 100 beacon symbol transmission units 2406. Three beacon burst signals 2404 are shown corresponding to time index values=0, 4, and 8. One beacon symbol 2416 occurs in each beacon burst signal, and the location of the beacon symbol changes from one burst signal to the next within the beacon signal, e.g., in accordance with a predetermined pattern and/or equation. In this embodiment, the beacon symbol location follows a slope. In this example, the beacon bursts are separated from each other by three times the duration of a beacon burst. In various embodiments, the beacon bursts are separated from one another by at least twice the duration of a beacon symbol. In some embodiments, a beacon burst may occupy two or more successive beacon resource time intervals, e.g., with the same tone being used for multiple successive beacon time indexes. In some embodiments, a beacon burst includes multiple beacon symbols. In some such embodiments, beacon symbols occupy 10% or less of the beacon signal resource.

Figure 25:
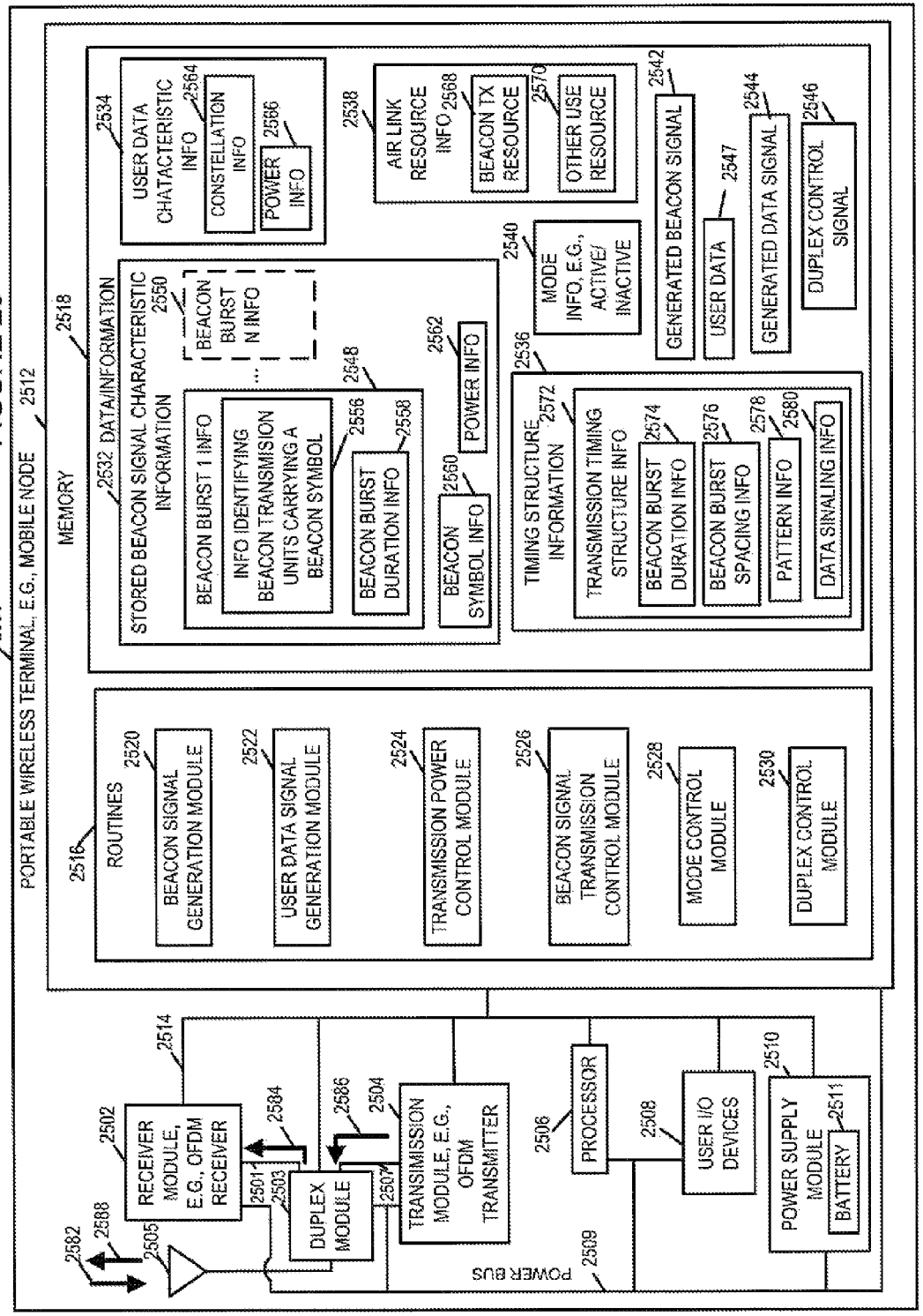
FIG. 25 is a drawing of an exemplary portable wireless terminal, e.g., mobile node, in accordance with various embodiments.

FIG. 25 is a drawing of an exemplary portable wireless terminal 2500, e.g., mobile node, in accordance with various embodiments. Exemplary portable wireless terminal 2500 may be any of the wireless terminals of FIG. 1.

Exemplary wireless terminal 2500 includes a receiver module 2502, a transmission module 2504, a duplex module 2503, a processor 2506, user I/O devices 2508, a power supply module 2510 and memory 2512 coupled together via a bus 2514 over which the various elements may interchange data and information.

Receiver module 2502, e.g., an OFDM receiver, receives signals from other wireless terminals and/or fixed location beacon transmitters, e.g., beacon signals and/or user data signals.

Transmission module 2504, e.g., an OFDM transmitter, transmits signals to other wireless terminals, said transmitted signals including beacon signals and user data signals. A beacon signal includes a sequence of beacon signal bursts, each beacon signal burst including one or more beacon symbols, and each beacon symbol occupies a beacon symbol transmission unit. One or more beacon symbols are transmitted by transmission module 2504 for each transmitted beacon signal burst.

In various embodiments, the transmission module 2504 is an OFDM transmitter which transmits beacon signals and the beacon signal is communicated using a resource which is a combination of frequency and time. In various other embodiments, the transmission module 2504 is a CDMA transmitter which transmits beacon signals and the beacon signal is communicated using a resource which is a combination of code and time.

Duplex module 2503 is controlled to switch the antenna 2505 between the receiver module 2502 and transmission module 2504, as part of a time division duplex (TDD) spectrum system implementation. The duplex module 2503 is coupled to antenna 2505 via which the wireless terminal 2500 receives signals 2582 and transmits signals 2588. Duplex module 2503 is coupled to receiver module 2502 via link 2501 over which received signals 2584 are conveyed. Signal 2584 is, in some embodiments, a filtered representation of signal 2582. Signal 2584 is, in some embodiments, the same as signal 2582, e.g., module 2503 functions as a pass thru device without filtering. Duplex module 2503 is coupled to transmission module 2504 via link 2507 over which transmit signals 2586 are conveyed. Signal 2588 is, in some embodiments, a filtered representation of signal 2586. Signal 2588 is, in some embodiments, the same signal 2586, e.g., duplex module 2503 functions as a pass thru device without filtering.

User I/O devices 2508 include, e.g., microphone, keyboard, keypad, switches, camera, speaker, display, etc. User devices 2508, allow a user to input data information, access output data/information, and control at least some operations of the wireless terminal, e.g., initiate a power up sequence, attempt to establish a communications sessions, terminate a communications session.

The power supply module 2510 includes a battery 2511 utilized as a source of portable wireless terminal power. The output of the power supply module 2510 is coupled to the various components (2502, 2503, 2504, 2506, 2508, and 2512) via power bus 2509 to provide power. Thus, transmission module 2504 transmits beacon signals using battery power.

Memory 2512 includes routines 2516 and data/information 2518. The processor 2506, e.g., a CPU, executes the routines 2516 and uses the data/information 2518 in memory 2512 to control the operation of the wireless terminal 2500 and implement methods. Routines 2516 include beacon signal generation module 2520, user data signal generation module 2522, transmission power control module 2524, beacon signal transmission control module 2526, mode control module 2528 and duplex control module 2530.

Beacon signal generation module 2520 uses the data information 2518 in memory 2512 including stored beacon signal characteristic information 2532 to generate beacon signals, a beacon signal including a sequence of beacon signal bursts, each beacon signal burst including one or more beacon symbols.

User data signal generation module 2522 uses the data/information 2518 including user data characteristic information 2534 and user data 2547 to generate a user data signal, said user data signal including user data symbols. For example, information bits representing the user data 2547 are mapped to a set of data symbols, e.g., OFDM data modulation symbols in accordance with constellation information 2564. Transmission power control module 2524 uses the data/information 2518 including beacon power information 2562 and user data power information 2566 to control the transmission power level of beacon symbols and data symbols. In some embodiments, during a first period of time, the transmission power control module 2524 controls the data symbols to be transmitted at an average per symbol power level that is at least 50 percent lower than the average per beacon symbol power level of the beacon symbols transmitted. In some embodiments, the transmission power control module 2524 controls the average per symbol transmission power level of each beacon symbol transmitted during a first period of time to be at least 10 dB higher than the average per symbol transmission power level of symbols used to transmit user data during a first period of time. In some embodiments, the transmission power control module 2524 controls the average per symbol transmission power level of each beacon symbol transmitted during a first period of time to be at least 16 dB higher than the average per symbol transmission power level of symbols used to transmit user data during a first period of time. In some embodiments, the beacon symbol power level and one or more data symbol power levels are interrelated with respect to a reference being used by the wireless terminal, and the reference may be, and sometimes does change. In some such embodiments, the first period of time is a time interval during which the reference level does not change.

Beacon signal transmission control module 2526 uses the data/information 2518 including the timing structure information 2536 to control the transmission module 2504 to transmit beacon signal bursts at intervals. In some embodiments, the time period between two adjacent beacon signal bursts in a sequence of beacon signal bursts is controlled to be at least 5 times the duration of either of the two adjacent beacon signal bursts. In various embodiments, at least some different beacon signal bursts have periods of different lengths.

Mode control module 2528 controls the wireless terminal's mode of operation with the current mode of operation being identified by mode information 2540. In some embodiments, the various modes of operation include an OFF mode, a receive only mode, an inactive mode, and an active mode. In the inactive mode, the wireless terminal can send and receive beacon signals but is not permitted to transmit user data. In the active mode, the wireless can send and receive user data signals in addition to beacon signals. In inactive mode, the wireless terminal is in a silence, e.g., sleep, state of low power consumption, for a longer time than in an active mode of operation.

Duplex control module 2530 controls the duplex module 2503 to switch the antenna connection between receiver module 2502 and transmission module 2504 in response to TDD system timing information and/or user needs. For example, a user data interval in a timing structure is, in some embodiments, available for either receive or transmit with the selection being a function of the wireless terminal needs. In various embodiments, the duplex control module 2530 also operates to shut down at least some circuitry in receiver module 2502 and/or transmission module 2504, when not in use to conserve power.

Data/information 2518 includes stored beacon signal characteristic information 2532, user data characteristic information 2534, timing structure information 2536, air link resource information 2538, mode information 2540, generated beacon signal information 2542, generated data signal information 2544, duplex control signal information 2546, and user data 2547. Stored beacon signal characteristic information 2532 includes one or more sets of beacon burst information (beacon burst 1 information 2548, . . . , beacon burst N information 2550), beacon symbol information 2560, and power information 2562.

Beacon burst 1 information 2548 includes information identifying beacon transmission units carrying a beacon symbol 2556 and beacon burst duration information 2558. Information identifying beacon transmission units carrying a beacon symbol 2556 is used by beacon signal generation module 2520 in identifying which beacon transmission units in a beacon signal burst are to be occupied by beacon symbols. In various embodiments, the other beacon transmission units of the beacon burst are set to be nulls, e.g., no transmission power applied with respect to those other beacon transmission units. In some embodiments, the number of beacon symbols in a beacon signal burst occupy less than 10 percent of the available beacon symbol transmission units. In some embodiments, the number of beacon symbols in a beacon signal burst occupy less than or equal to 10 percent of the available beacon symbol transmission units. Beacon signal burst duration information 2558 includes information defining the duration of beacon burst 1. In some embodiments each of the beacon bursts have the same duration, while in other embodiments, different beacon bursts within the same composite beacon signal can, and sometimes do, have different duration. In some embodiments, one beacon burst in a sequence of beacon bursts has a different duration, and this may be useful for synchronization purposes.

Beacon symbol information 2560 includes information defining the beacon symbol, e.g., the modulation value and/or characteristic of the beacon symbol. In various embodiments, the same beacon symbol value is used for each of the identified positions to carry a beacon symbol in information 2556, e.g., the beacon symbol has the same amplitude and phase. In various embodiments, different beacon symbol values can be, and sometimes are used for at least some of the identified positions to carry a beacon symbol in information 2556, e.g., the beacon symbol value has the same amplitude but can have one of two potential phases, thus facilitating the communication of additional information via the beacon signal. Power information 2562 includes, e.g., power gain scale factor information used with respect to beacon symbol transmissions.

User data characteristic information 2534 includes constellation information 2564 and power information 2566. Constellation information 2564 identifies, e.g., QPSK, QAM 16, QAM 64, and/or QAM256, etc, and modulation symbol values associated with the constellation. Power information 2566 includes, e.g., power gain scale factor information used with respect to data symbol transmissions.

Timing structure information 2536 includes information identifying intervals associated with various operations, e.g., a beacon transmission time interval, an interval for monitoring for beacon signals from other wireless terminals and/or fixed location beacon transmitters, a user data interval, a silence, e.g., sleep, interval, etc. Timing structure information 2536 includes transmission timing structure information 2572 which includes beacon burst duration information 2574, beacon burst spacing information 2576, pattern information 2578, and data signaling information 2580.

In some embodiments, the beacon burst duration information 2574 identifies that the duration of a beacon burst is a constant, e.g., 100 successive OFDM transmission time intervals. In some embodiments, the beacon burst duration information 2574 identifies that the duration of a beacon burst varies, e.g., in accordance with a predetermined pattern specified by pattern information 2578. In various embodiments, the predetermined pattern is a function of a wireless terminal identifier. In other embodiments, the predetermined pattern is the same for all wireless terminals in the system. In some embodiments, the predetermined pattern is a pseudo random pattern.

In some embodiments, beacon burst duration information 2574 and beacon burst spacing information 2576 indicate that the duration of a beacon burst is at least 50 times shorter than the interval of time from the end of the beacon burst to the start of the next beacon burst. IN some embodiments, the beacon burst spacing information 2576 indicates that the spacing between beacon bursts is constant with beacon bursts occurring in a periodic manner during a period of time in which the wireless terminal is transmitting beacon signals. In some embodiments, the beacon burst spacing information 2576 indicates that the beacon bursts are transmitted with the same interval spacing whether the wireless terminal is in an inactive mode or an active mode. In other embodiments, the beacon burst spacing information 2576 indicates that the beacon bursts are transmitted using different interval spacing as a function of the wireless terminal operational mode, e.g., whether the wireless terminal is in an inactive mode or an active mode.

Air link resource information 2538 includes beacon transmission resource information 2568 and other use resource information 2570. In some embodiments, air link resources are defined in terms of OFDM tone-symbols in a frequency time grid, e.g., as part of a wireless communication system such as a TDD system. Beacon transmission resource information 2568 includes information identifying air link resources allocated to WT 2500 for beacon signals, e.g., a block of OFDM tone-symbols to be used to transmit a beacon burst including at least one beacon symbol. Beacon transmission resource information 2568 also includes information identifying beacon transmission units. In some embodiments a beacon transmission unit is a single OFDM tone-symbol. In some embodiments, a beacon transmission unit is a set of OFDM transmission units, e.g., a set of contiguous OFDM tone-symbols. Other use resource information 2570 includes information identifying air link resources to be used by WT 2500 for other purposes such as, e.g., beacon signal monitoring, receive/transmit user data. Some of the air link resources may be, and sometimes are, intentionally not used, e.g., corresponding to a silence state, e.g., sleep state, which conserves power. In some embodiments a beacon symbol is transmitted using the air link resource of OFDM tone-symbols, and beacon symbols occupy less than 1 percent of the tone-symbols of the transmission resource used by said wireless terminal during a period of time including multiple beacon signal bursts and at least one user data signal. In various embodiments, beacon signals occupy less than 0.3 percent of the tone symbols in a portion of a period of time, said portion of said period of time including one beacon signal burst and one interval between successive beacon signal bursts. In various embodiments, beacon signals occupy less than 0.1 percent of the tone symbols in a portion of a period of time, said portion of said period of time including one beacon signal burst and one interval between successive beacon signal bursts. In various embodiments, during at least some modes of operation, e.g., an active mode of operation, the transmission module 2504 can transmit user data, and when the wireless terminal transmits user data, user data is transmitted on at least 10 percent of the tone-symbols of the transmission resource used by said wireless terminal during a period of time including the user data signal transmission and two adjacent beacon signal bursts.

Generated beacon signal 2542 is an output of beacon signal generation module 2520, while generated data signal 2544 is an output of user data signal generation module 2522. The generated signals (2542, 2544) are directed to transmission module 2504. User data 2547 includes, e.g., audio, voice, image, text and/or file data/information that is used as input by user data signal generation module 2522. Duplex control signal 2546 represents output of duplex control module 2530, and the output signal 2546 is directed to duplex module 2503 to control antenna switching and/or to a receiver module 2502 or transmitter module 2504 to shut down at least some circuitry and conserve power.

Figure 26:
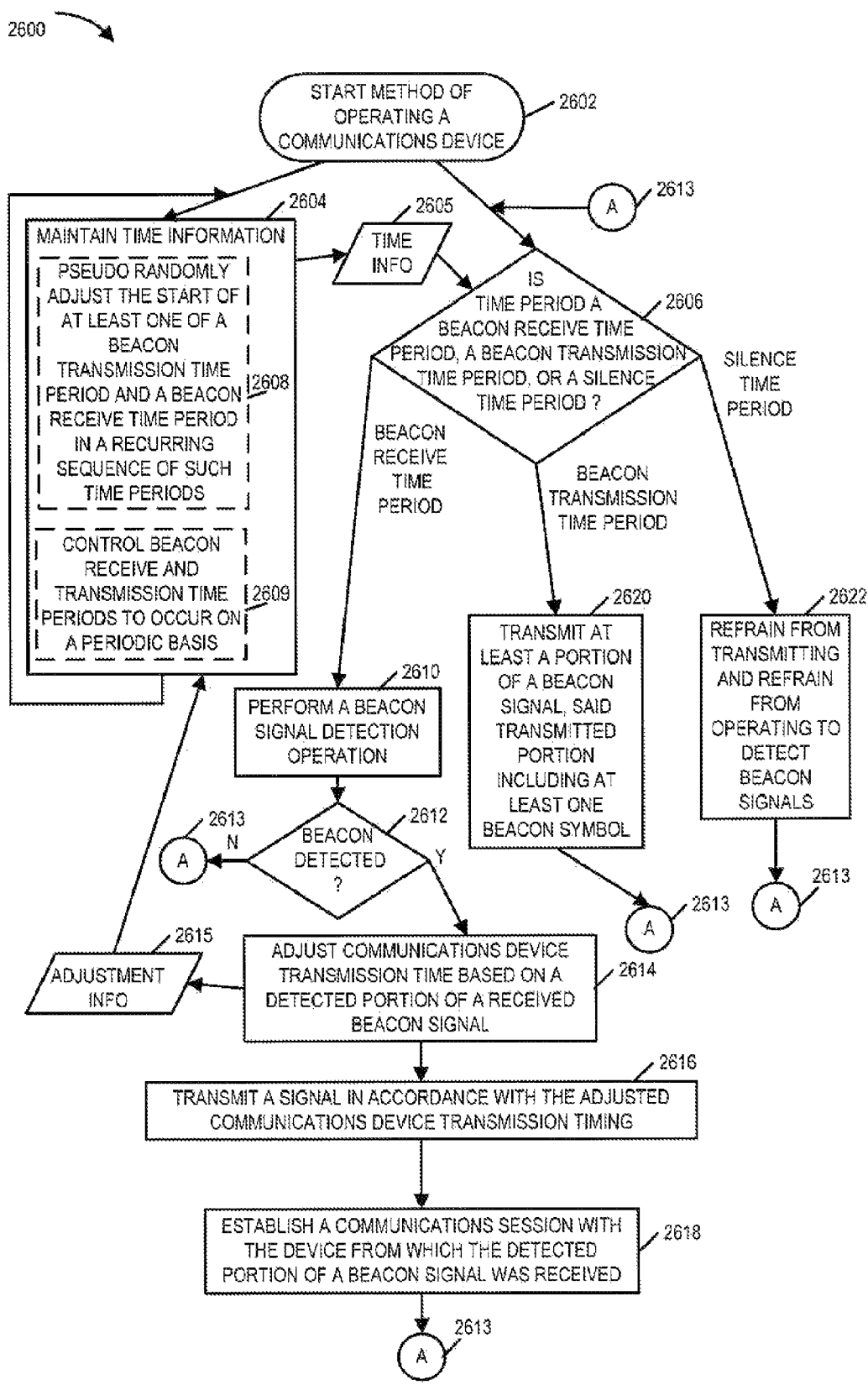
FIG. 26 is a drawing of a flowchart of an exemplary method of operating a communications device, e.g., a battery powered wireless terminal, in accordance with various embodiments.

FIG. 26 is a drawing of a flowchart 2600 of an exemplary method of operating a communications device, e.g., a battery powered wireless terminal, in accordance with various embodiments. Operation starts in step 2602, where the communications device is powered on and initialized. Operation proceeds from start step 2602 to step 2604 and step 2606.

In step 2604, which is performed on an ongoing basis, the communications device maintains time information. Time information 2605 is output from step 2604 and used in step 2606. In step 2606, the communications device determines whether a time period is a beacon receive time period, a beacon transmission time period, or a silence time period, and proceeds differently depending on the determination. If the time period is a beacon receive time period, then operation proceeds from step 2606 to step 2610, where the communications device performs a beacon signal detection operation.

If the time period is a beacon transmission time period, then operation proceeds from step 2606 to step 2620, where the communications device transmits at least a portion of a beacon signal, said transmitted portion including at least one beacon symbol.

If the time period is a silence time period, then operation proceeds from step 2606 to step 2622, where the communications device refrains from transmitting and refrains from operating to detect beacon signals. In some embodiments, the communications device goes into a silence, e.g., sleep, mode in step 2622 and conserves battery power.

Returning to step 2610, operation proceeds from step 2610 to step 2612. In step 2612, the communications device determines if a beacon has been detected. If a beacon has been detected, operation proceeds from step 2612 to step 2614. However, if a beacon was not detected, operation proceeds from step 2612 via connecting node A 2613 to step 2606. In step 2614, the communications device adjusts communications device transmission time based on a detected portion of a received signal. Adjustment information 2615, obtained from step 2614 is used in maintaining time information for the communications device in step 2604. In some embodiments, the timing adjustments adjusts the beacon signal transmission time period to occur during a time period known to by used by the device which transmitted the received beacon signal portion to receive beacon signals. Operation proceeds from step 2614 to step 2616, where the communications device transmits a signal in accordance with the adjusted communications device transmission timing, e.g., a beacon signal. Then, in step 2618, the communications device establishes a communications session with the device from which the detected portion of a beacon signal was received. Operation proceeds from any of steps 2618, 2620, or 2622 via connecting node A 2613 to step 2606.

In some embodiments, step 2604 includes at least one of sub-step 2608 and 2609. In sub-step 2608, the communications device pseudo randomly adjusts the start of at least one of a beacon transmission time period and a beacon receive time period in a recurring sequence of such time periods. For example, in some embodiments, a communication device at a particular time, e.g., following power on or entering a new region, may not be synchronized with respect to any other communication device, and may perform sub-step 2608 one or more times, in order to increase the probability of detecting a beacon signal from another communications device while having a limited beacon detection time interval in a recurring time structure. Thus sub-step 2608 can effectively shift relative timing between two peers. In sub-step 2609, the communications device sets beacon receive and transmission time periods to occur on a periodic basis.

In various embodiments, the beacon receive time period is longer than the beacon transmission time period. In some embodiments, the beacon receive and transmission time periods are non-overlapping, and the beacon receive time period is at least two times the beacon transmission time period. In some embodiments, the silence time period occurs between beacon receive and beacon transmission time periods. In various embodiments, the silence period is at least twice one of the beacon transmission time periods and beacon receive time periods.

Figure 27:
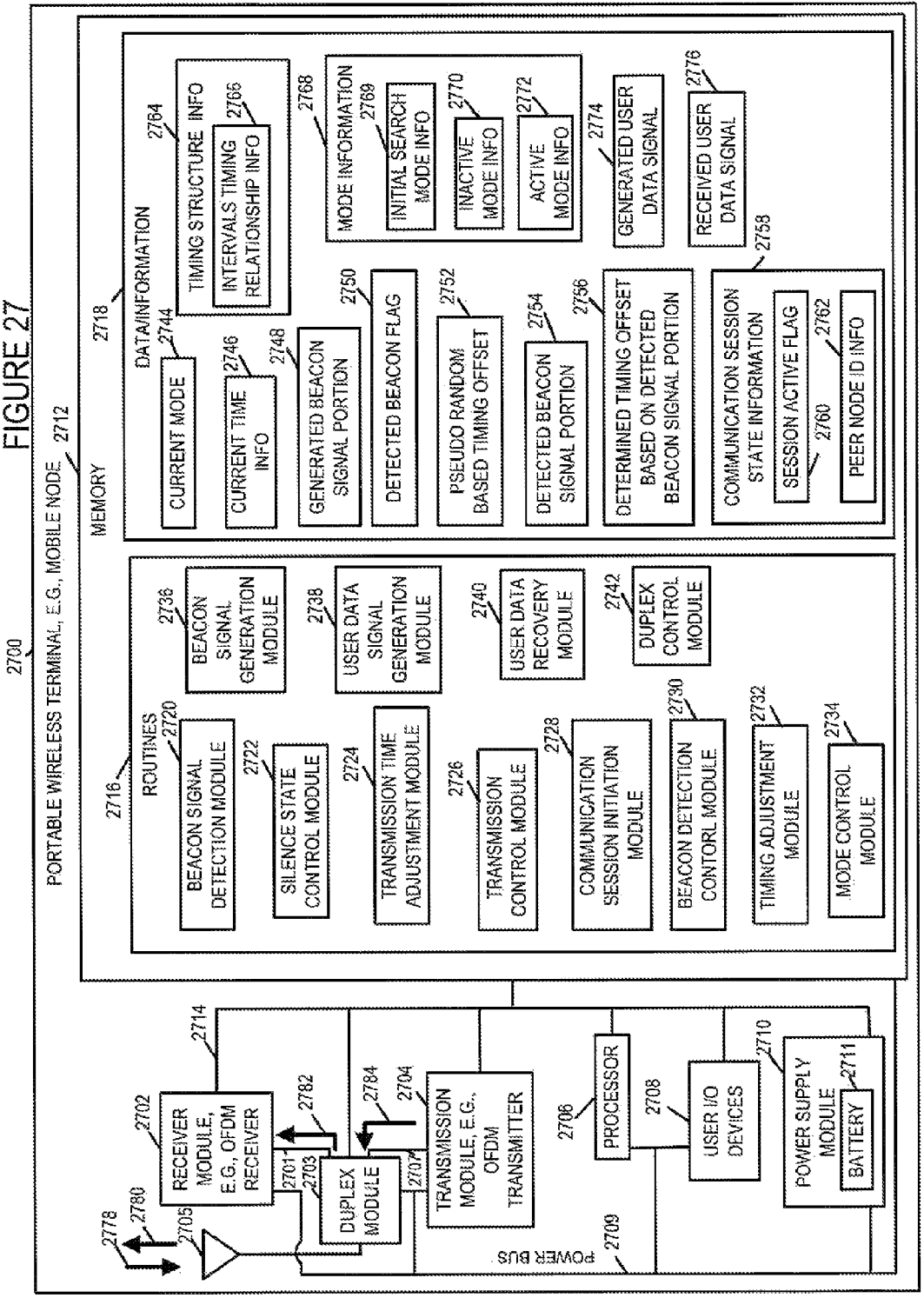
FIG. 27 is a drawing of an exemplary portable wireless terminal, e.g., mobile node, in accordance with various embodiments.

FIG. 27 is a drawing of an exemplary communications device which is portable wireless terminal 2700, e.g., mobile node, in accordance with various embodiments. Exemplary portable wireless terminal 2700 may be any of the wireless terminals of FIG. 1. Exemplary wireless terminal 2700 is, e.g., a communication device which is part of a time division duplex (TDD) orthogonal frequency division multiplexing (OFDM) wireless communications system supporting peer-peer direct communications between mobile nodes. Exemplary wireless terminal 2700 can both transmit and receive beacon signals. Exemplary wireless terminal 2700 performs timing adjustments based on detected beacon signals, e.g., from a peer wireless terminal transmitting beacon signals and/or from a fixed beacon transmitter, to establish timing synchronization.

Exemplary wireless terminal 2700 includes a receiver module 2702, a transmission module 2704, a duplex module 2703, a processor 2706, user I/O devices 2708, a power supply module 2710 and memory 2712 coupled together via a bus 2714 over which the various elements may interchange data and information.

Receiver module 2702, e.g., an OFDM receiver, receives signal from other wireless terminals and/or fixed location beacon transmitters, e.g., beacon signals and/or user data signals.

Transmission module 2704, e.g., an OFDM transmitter, transmits signals to other wireless terminals, said transmitted signals including beacon signals and user data signals. A beacon signal includes a sequence of beacon signal bursts, each beacon signal burst including one or more beacon symbols, and each beacon symbol occupies a beacon symbol transmission unit. One or more beacon symbols are transmitted by transmission module 2704 for each transmitted beacon signal burst. Transmission module 2704 transmits during a beacon transmission time period at least a portion of a beacon signal, e.g., a beacon burst signal, said transmitted portion including at least one beacon symbol, e.g., a relatively high power tone with respect to the power level of user data symbols.

In various embodiments, the transmission module 2704 is an OFDM transmitter which transmits beacon signals and the beacon signal is communicated using a resource which is a combination of frequency and time. In various other embodiments, the transmission module 2704 is a CDMA transmitter which transmits beacon signals and the beacon signal is communicated using a resource which is a combination of code and time.

Duplex module 2703 is controlled to switch the antenna 2705 between the receiver module 2702 and transmission module 2704, as part of a time division duplex (TDD) implementation. The duplex module 2703 is coupled to antenna 2705 via which the wireless terminal 2700 receives signals 2778 and transmits signals 2780. Duplex module 2703 is coupled to receiver module 2702 via link 2701 over which received signals 2782 are conveyed. Signal 2782 is, in some embodiments, a filtered representation of signal 2778. In some embodiments, signal 2782 is the same as signal 2778, e.g., where duplex module 2703 functions as a pass through device without filtering. Duplex module 2703 is coupled to transmission module 2704 via link 2707 over which transmit signals 2783 are conveyed. Signal 2780 is, in some embodiments, a filtered representation of signal 2784. In some embodiments, signal 2780 is the same as signal 2784, e.g., where duplex module 2703 functions as a pass through device without filtering.

User I/O devices 2708 include, e.g., microphone, keyboard, keypad, switches, camera, speaker, display, etc. User devices 2708, allow a user to input data/information, access output data/information, and control at least some operations of the wireless terminal, e.g., initiate a power up sequence, attempt to establish a communications session, terminate a communications session.

The power supply module 2710 includes a battery 2711 utilized as a source of portable wireless terminal power. The output of the power supply module 2710 is coupled to the various components (2702, 2703, 2704, 2706, 2708, and 2712 via power bus 2709 to provide power. Thus, transmission module 2704 transmits beacon signals using battery power.

Memory 2712 includes routines 2716 and data/information 2718. The processor 2706, e.g., a CPU, executes the routines 2716 and uses the data/information 2718 in memory 2712 to control the operation of the wireless terminal 2700 and implement methods. Routines 2716 include beacon signal detection module 2720, a silence state control module 2722, a transmission time adjustment module 2724, a transmission control module 2726, a communication session initiation module 2728, a beacon detection control module 2730, a timing adjustment module 2732, a mode control module 2734, a beacon signal generation module 2736, a user data signal generation module 2738, a user data recovery module 2740, and a duplex control module 2742.

Beacon signal detection module 2720 performs a beacon signal detection operation during a beacon receive time period to detect the receipt of at least a portion of a beacon signal. In addition, the beacon signal detection module 2720 sets the detected beacon flag 2750 indicating the receipt of a beacon signal portion in response to a detected beacon signal portion. Detected beacon signal portion 2754 is an output of beacon signal detection module 2720. In addition, the beacon signal detection module 2720 sets the detected beacon flag 2750 indicating the receipt of a beacon signal portion in response to a detected beacon signal portion. In some embodiments, the beacon signal detection module 2720 performs detections as a function of energy level comparisons. In some embodiments, the beacon signal detection module 2720 performs detections as a function of detected beacon symbol pattern information, e.g., in a monitored air link resource corresponding to a beacon burst. The beacon signal detection module 2720, in some embodiments, recovers information from the detected beacon signal portion, e.g., information identifying the source, e.g., wireless terminal, which transmitted the beacon signal. For example, different wireless terminals may, and sometimes do have different beacon burst patterns and/or signatures.

Silence state control module 2722 controls wireless terminal operation during a silence period, occurring, e.g., between beacon receive and beacon transmission time periods, to neither transmit nor operate to detect beacon signals.

Transmission time adjustment module 2724 adjusts the communications device's transmission time based on a detected portion of a received beacon signal. For example, consider that the communications system is, e.g., an ad hoc network, and the received beacon signal portion is from another wireless terminal. As another example, consider the system includes fixed location beacon transmitters serving as references, and that the detected beacon signal portion is sourced from such a transmitter; the transmission time adjustment module 2724 adjusts the wireless terminal's transmission time to synchronize with respect to the reference. Alternatively, consider the system does not include fixed location beacon transmitters, or that the wireless terminal can not currently detect such a beacon signal, and that the detected beacon signal portion is from another wireless terminal, then the transmission time adjustment module 2724 adjusts the wireless terminal's transmission time to synchronize with respect to the peer wireless terminal which had transmitted the beacon signal. In some embodiments, including both fixed location beacons and wireless terminal beacons, the fixed locations beacons are used, when available, to achieve a coarse level of system synchronization, and the wireless terminal beacons are used to achieve a higher degree of synchronization between peers. Detected timing offset based on detected beacon signal portion 2756 is an output of transmission time adjustment module 2724.

In various embodiments, the transmission time adjustment module 2724 adjusts the beacon signal transmission time period to occur during a time period known to be used by the device, e.g., other wireless terminal, which transmitted the received portion to receive beacon signals. Thus the transmission time adjustment module 2724 sets WT 2700's beacon to be transmitted such that it is expected to hit the time window in which the peer is attempting to detect beacons.

Transmission control module 2726 controls the transmission module 2704 to transmit a signal, e.g., a beacon signal in accordance with the adjusted communications device transmission timing. When stored communication session state information 2758 indicates that an established session is ongoing, via session active flag 2760 being set, the transmission control module 2726 controls the transmission module 2704 to repeat beacon signal portion transmission operations. In some embodiments, the transmission control module 2726 controls the wireless terminal to repeat beacon signal portion transmission operation in both the inactive and active modes of wireless terminal operation.

Communication session initiation module 2728 is used to control operations to establish a communications session with another wireless terminal, from which a beacon signal was received. For example, following a beacon signal detection, wherein the beacon signal is sourced from another wireless terminal, if wireless terminal 2700 desires to establish a communications session with said another wireless terminal, module 2728 is activated to start to initiate the communication session, e.g., generating and processing handshaking signals in accordance with a predetermined protocol.

Beacon detection control module 2730 controls the beacon signal detection module 2720 operation. For example, when stored communication session state information 2758 indicates that an established session is ongoing, via session active flag 2760 being set, the beacon detection control module 2730 controls the beacon signal detection module 2720 to repeat detection operations. In some embodiments, the beacon detection control module 2730 controls the wireless terminal to repeat beacon detection operations in both the inactive and active modes of wireless terminal operation.

Timing adjustment module 2732 pseudo randomly adjusts the start of at least one of a beacon transmission time period and a beacon receive time period in a recurring sequence of such time periods. Pseudo random based timing offset 2752 is an output of timing adjustment module 2732. Timing adjustment module 2732 is, in some embodiments, used to shift the wireless terminal's timing structure with respect to other wireless terminals, operating independently, such as to increase the likelihood of the wireless terminal and a peer being able to detect one another's presence while limiting beacon transmit and/or beacon detection time intervals.

Mode control module 2734 controls the communications device to operate during different times, in a first and second mode of operation, in which the communications device transmits beacon signals. For example, the first mode of operation is an inactive mode in which the communications device transmits beacon signals, detects for beacon signals, but is restricted from transmitting user data; the second mode of operation is an active mode in which the communications device transmits beacon signals, detects for beacon signals, and is permitted to transmit user data. Another mode of operation, in some embodiments, into which mode control module 2734 can control the communications device to operate is a search mode in which the wireless terminal searches for beacon signals but is not permitted to transmit.

Beacon signal generation module 2736 generates beacon signal portions 2748, e.g., beacon bursts including a least one beacon symbol, which are transmitted by transmission module 2704. User data signal generation module 2738, generates user data signals, 2774, e.g., signals conveying coded blocks of user data such as voice data, other audio data, image data, text data, file data, etc. User data signal generation module 2738 is active when the wireless terminal is in active mode and the generated user data signals 2774 are transmitted via transmission module 2704 during time intervals reserved for user data transmit/receive signals. User data recovery module 2740 recovers user data from received user data signals 2776 received from a peer in a communication session with wireless terminal 2700. The received user data signals 2776 are received via receiver module 2702, while the wireless terminal is in an active mode of operation during time intervals reserved for user data transmit/receive signals.

Duplex control module 2742 controls operation of duplex module 2703, e.g., controlling antenna 2705 to be coupled to receiver module 2702 for receive time intervals, e.g., beacon monitoring time intervals and intervals for receiving user data, and to be coupled to transmission module 2704 for transmission time intervals, e.g., beacon transmission time intervals and intervals for transmitting user data. Duplex control module 2742 also controls at least some circuits in at least one of receiver module 2702 and transmission module 2704 to be powered down during certain time intervals, thereby conserving battery power.

Data/information 2718 includes current mode information 2744, current time information 2746, generated beacon signal portion 2748, detected beacon flag 2750, pseudo random based timing offset 2752, detected beacon signal portion 2754, determined timing offset based on detected beacon signal portion 2756, communication session state information 2758, timing structure information 2764, mode information 2768, generated user data signal 2774, and received user data signal 2776.

Current mode information 2744 includes information identifying the wireless terminal's current mode of operation, sub-modes and/or state of operation, e.g., whether the wireless terminal is in a mode where it receives but does not transmit, whether the wireless terminal is an inactive mode including beacon signal transmission but not allowing user data transmissions, or whether the wireless terminal is in an active mode including beacon signal transmissions and permitting user data transmissions.

Current time information 2746 includes information identifying the wireless terminal time with respect to its position within a recurring timing structure being maintained by the wireless terminal, e.g., an indexed OFDM symbol transmission time period within the structure. Current time information 2746 also includes information identifying the wireless terminal's time with respect to another timing structure, e.g., of another wireless terminal or of a fixed location beacon transmitter.

Communication session state information 2758 includes a session active flag 2760 and peer node identification information 2762. Session active flag 2760 indicates whether or not the session is still active. For example, a peer node in a communication session with WT 2700 powers down, the wireless terminal 2700 ceases to detect the peer's beacon signal, and session active flag is cleared. Peer node identification information 2762 includes information identifying the peer. In various embodiments, the peer node ID information is conveyed, at least in part, via beacon signals.

Timing structure information 2764 includes information defining duration, ordering and spacing of various intervals such as, e.g., beacon transmission intervals, beacon detection intervals, user data signaling intervals and silence intervals. Timing structure information 2764 includes intervals' timing relationship information 2766. Intervals' timing relationship information 2766 includes, e.g., information defining: (i) that a beacon receive tine period is longer than a beacon transmission time period; (ii) that beacon receive and beacon transmission time periods are non-overlapping; (iii) that the beacon receive time period is at least two times the beacon transmit time period in duration; (iv) the silence period is at least twice one of the beacon transmission time period and the beacon receive time period.

Mode information 2768 includes initial search mode information 2769, inactive mode information 2770 and active mode information 2772. Initial search mode information 2769 includes information defining an initial extended duration search mode for beacon signals. In some embodiments, the duration of the initial search exceeds the expected internal between successive beacon burst transmissions by other wireless terminals which are transmitting sequences of beacon burst signals. In some embodiments, the initial search mode information 2769 is used for performing an initial search upon power up. In addition, in some embodiments the wireless terminal enters the initial search mode from the inactive mode occasionally, e.g., if no other beacon signals have been detected while in the inactive mode and/or if the wireless terminal wants to perform a faster and/or more thorough beacon search than is achieved using the inactive mode. Inactive mode information 2770 defines an inactive mode of wireless terminal operation including a beacon signal interval, a beacon monitoring interval and a silence interval. Inactive mode is a power saving mode where the wireless terminal conserves energy in the silence mode, yet is able to indicate its presence by the beacon signal and is able to maintain situational awareness of the presence of other wireless terminals by a limited duration beacon monitoring interval. Active mode information 2772 defines an active mode of wireless terminal operation including a beacon signal transmission interval, a beacon monitoring interval, a user data TX/RX interval, and a silence interval.

Figure 28:
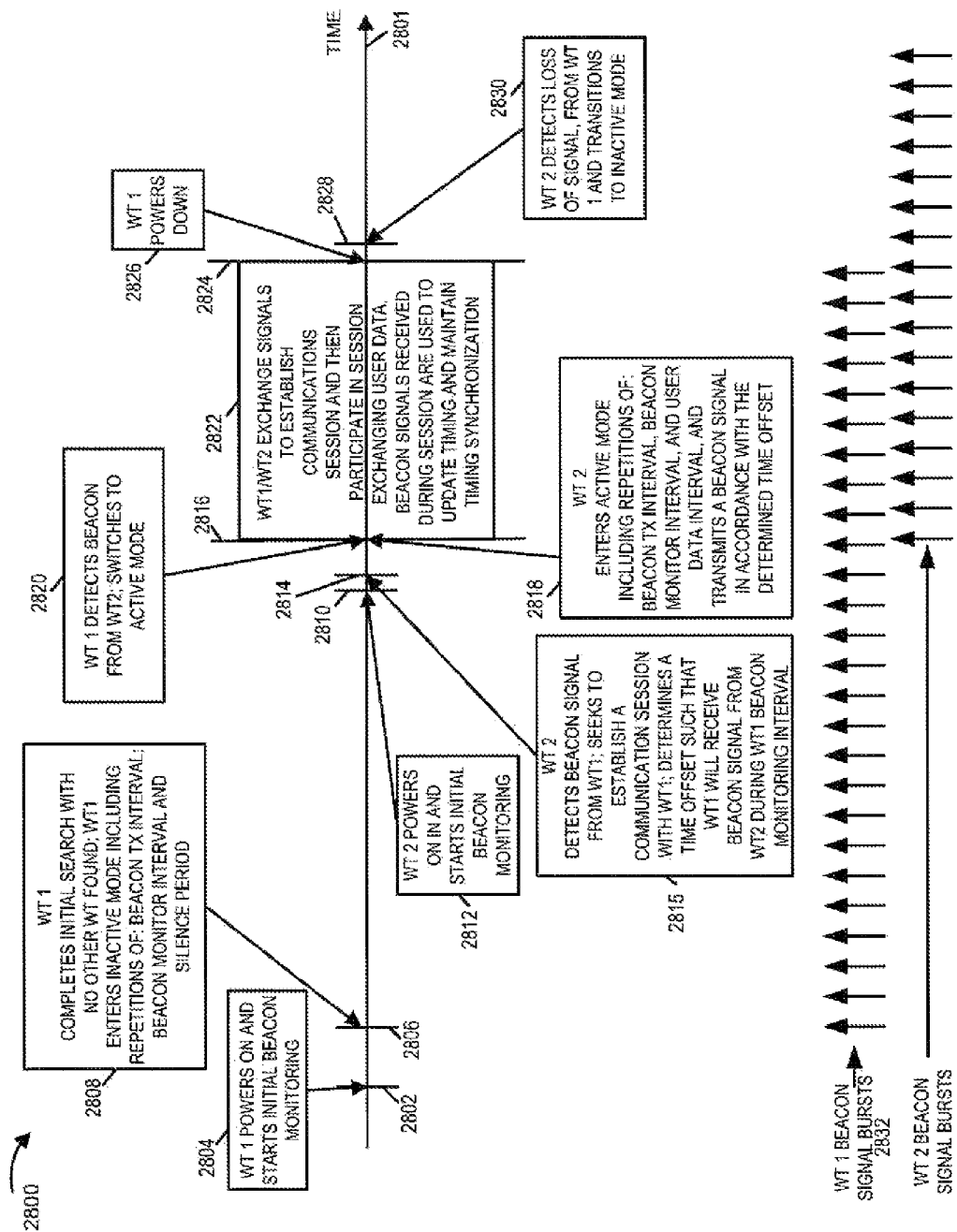
FIG. 28 is a drawing illustrating an exemplary time line, sequence of events, and operations with respect to two wireless terminals in an ad hoc network which become aware of the presence of each other and achieve timing synchronization via the use of wireless terminal beacon signals.

FIG. 28 is a drawing 2800 illustrating an exemplary time line, sequence of events, and operations with respect to two wireless terminals in an ad ho network which become aware of the presence of each other and achieve timing synchronization via the use of wireless terminal beacon signals. Horizontal axis 2801 represents a time line. At time 2802, wireless terminal 1 powers on and starts an initial monitoring for beacon signals, as indicated by block 2804. The monitoring continues until time 2806, at which point wireless terminal completes its initial search, with the result that no other wireless terminals were found; then, wireless terminal 1 enters an inactive mode of operation including repetitions of beacon transmission intervals in which wireless terminal 1 transmits a beacon signal burst, beacon monitoring intervals in which the wireless terminal monitors for beacon signals, and silence intervals in which the wireless terminal neither transmits nor receives, thus conserving power, as illustrated by block 2808.

Then, at time 2810, wireless terminal 2 powers on and starts initial beacon monitoring as indicated by block 2812. Then, at time 2814 wireless terminal 2 detects a beacon signal from wireless terminal 1, decides that it seeks to establish a communication session with wireless terminal 1, and determines a time offset such that wireless terminal will receive a beacon signal burst from wireless terminal 2 during a wireless terminal 1 beacon monitoring interval, as indicated by block 2815.

At time 2816, wireless terminal 2 has entered active mode which includes repetitions of: beacon transmission intervals, beacon monitoring intervals, and user data intervals, and at time 2816 wireless terminal 2 transmits a beacon signal in accordance with the determined time offset of step 2815, as indicated by block 2818. Then wireless terminal 1 detects the beacon signal from wireless terminal 2 and switches to active mode as indicated by block 2820.

Between time interval 2816 and 2824 wireless terminal 1 and wireless terminal 2 exchange signals to establish a communications session and then participate in the session exchanging user data, as indicated by block 2822. In addition, during this time interval beacon signals received during the session are used to update timing and maintain synchronization. Wireless terminal 1 and wireless terminal 2 may be, and sometimes are, mobile nodes which can be moving during the communication sessions.

At time 2824, wireless terminal 1 powers down, as indicated by block 2826. Then, at time 2828, wireless terminal 2 determines that signal has been lost from wireless terminal 1 and the wireless terminal transitions to an inactive mode, as indicated by block 2830. Signal can also be, and sometime is, lost due to other conditions, e.g., wireless terminals 1 and 2 moved far enough away from each other such that the channel conditions were insufficient to maintain the session.

Sequence of arrows 2832 illustrates wireless terminal 1 beacon signal bursts, while sequence of arrows 2834 illustrates wireless terminal 2 beacon signal bursts. It should be observed that the timing between the two wireless terminals has been synchronized, as a function of a received beacon signal from wireless terminal 1, such that wireless terminal 1 is able to detect a beacon, signal burst from wireless terminal 2, during its beacon signal monitoring interval.

In this example, a wireless terminal, which has powered up, performs monitoring during an initial beacon, monitoring period until a beacon is detected or until the initial beacon monitoring period expires, whichever comes first. The initial beacon monitoring period is, e.g., an extended duration monitoring period having a duration which exceeds one iteration including a beacon transmission interval. In this example, the initial beacon monitoring period is performed prior to entering a mode in which beacon signals are transmitted. In some embodiments, a wireless terminal in an inactive mode, said inactive mode including beacon transmission intervals, beacon monitoring, intervals and silence intervals, occasionally enters a long duration beacon monitoring interval, e.g., to cover a corner case condition in which two wireless terminals should happen to start up simultaneously.

In some other embodiments, a wireless terminal enters an inactive mode, said inactive mode including beacon transmission intervals and limited duration beacon monitoring intervals following power on without first having an extended beacon monitoring interval. In some such embodiments, a wireless terminal may, and sometimes does, perform pseudo-random time shifts while searching for other beacon signals to facilitate alignment between its own beacon monitoring intervals and other wireless terminal beacon transmission intervals.

Figure 29:
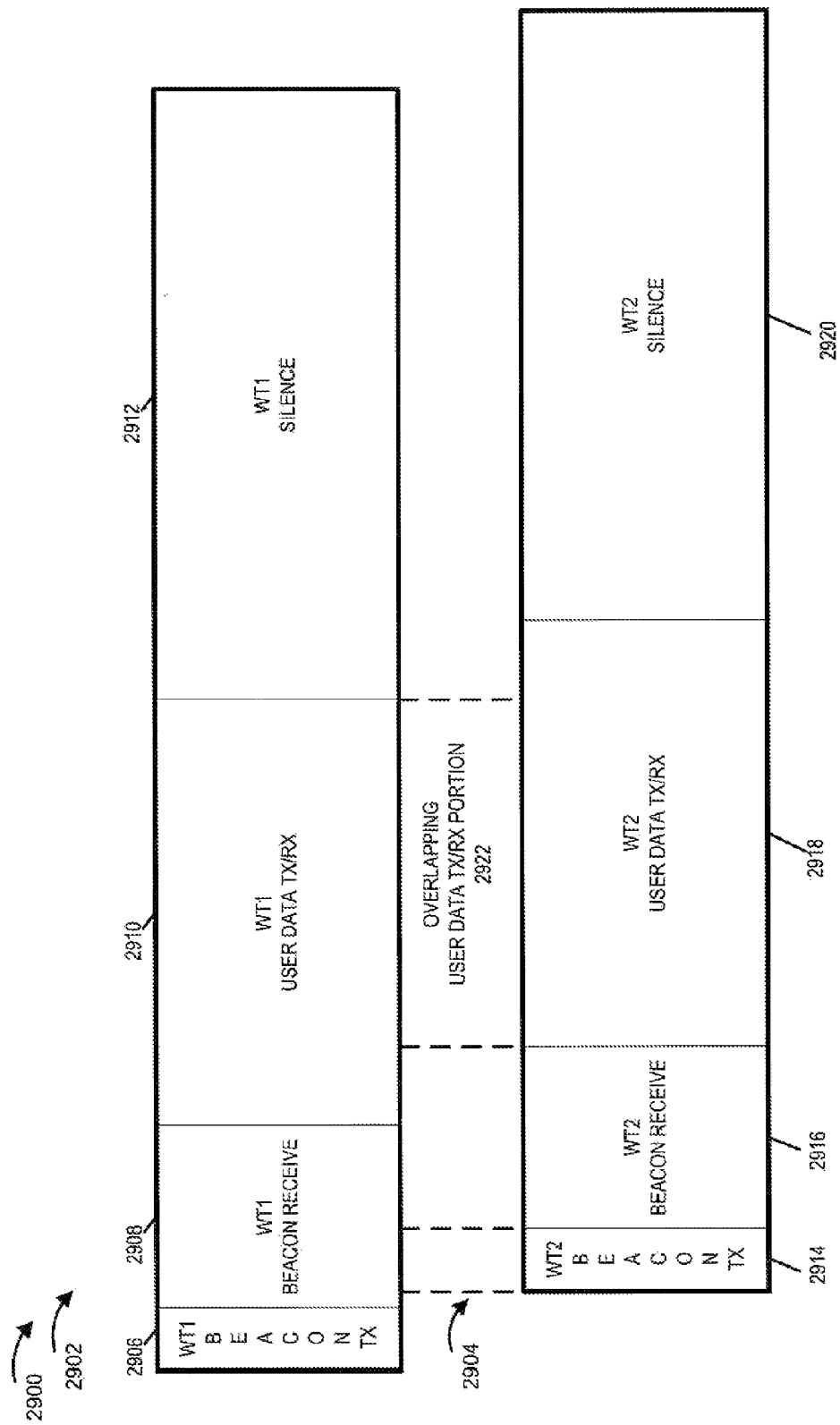
FIG. 29 illustrates exemplary synchronized timing between two wireless terminals based on beacon signals in accordance with an exemplary embodiment.

Drawing 2900 of FIG. 29 illustrates exemplary synchronized timing between two wireless terminals based on beacon signals in accordance with an exemplary embodiment. Drawing 2902 illustrates timing structure information with respect to wireless terminal 1, while drawing 2904 includes timing structure information with respect to wireless terminal 2. Drawing 2900 may correspond to FIG. 28 after the wireless terminals have been timing synchronized, e.g., based on wireless terminal 2 detecting a beacon signal from wireless terminal 1. Drawing 2902 includes a wireless terminal 1 beacon transmission interval 2906, a wireless terminal 1 beacon receive time interval 2908, a wireless terminal 1 user data TX/RX interval 2910 and a WT 1 silence interval 2912. Drawing 2904 includes a wireless terminal 2 beacon transmission interval 2914, a wireless terminal 2 beacon receive time interval 2916, a wireless terminal 2 user data TX/RX interval 2918 and a WT silence interval 2920. It should be observed that wireless terminal 2 has adjusted its timing such that when it transmits a beacon signal burst during WT 2 beacon transmit interval 2914, WT 1 will receive the beacon signal burst during its beacon receive interval 2908. It should also be observed that there is an overlapping portion of the user data TX/RX regions 2922 which can be used for user data signaling. This approach maintains the same basic timing structure for different wireless terminals, and uses a determined timing shift of one of the wireless terminal's timing to achieve synchronization.

Figure 30:
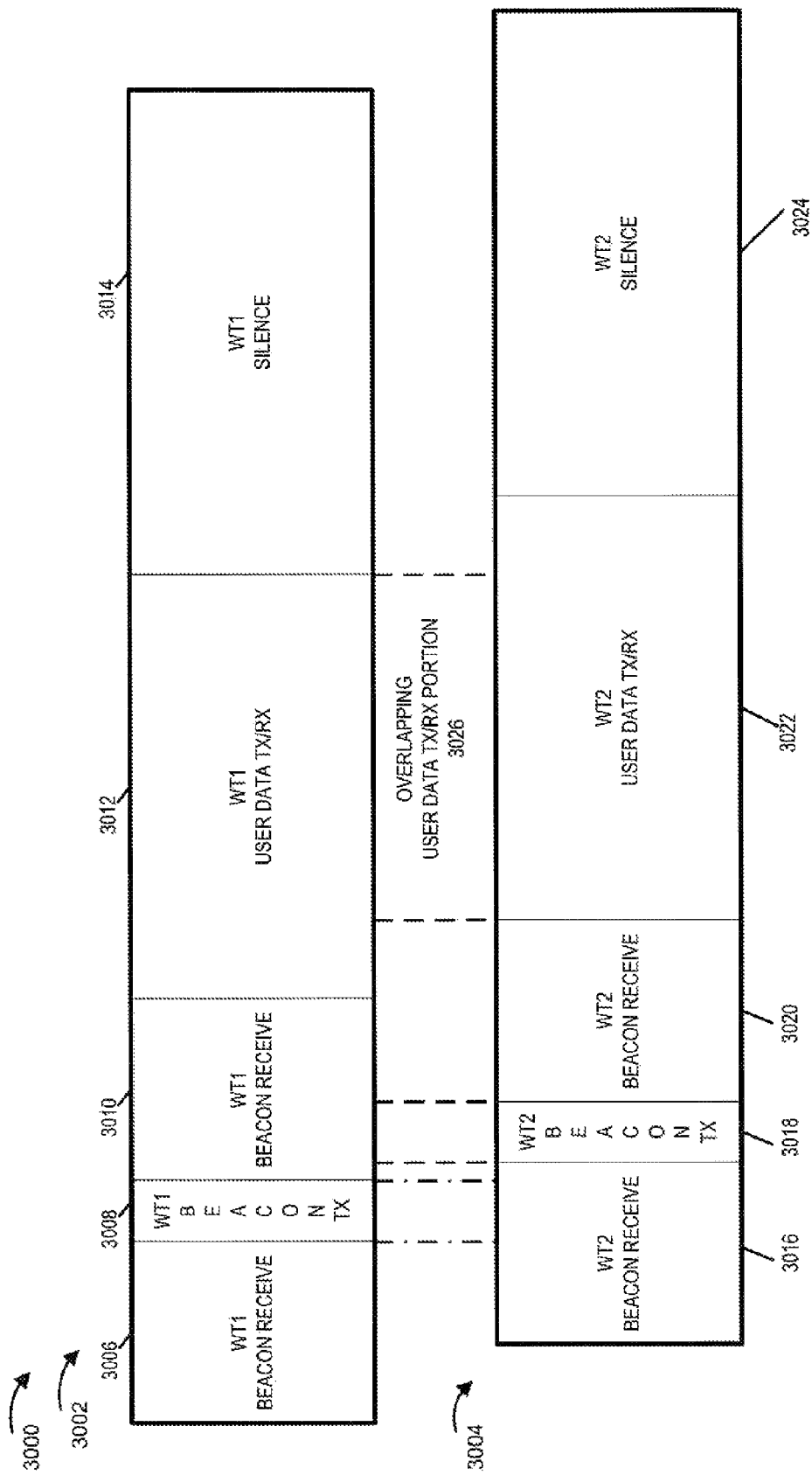
FIG. 30 illustrates exemplary synchronized timing between two wireless terminals based on beacon signals in accordance with another exemplary embodiment.

Drawing 3000 of FIG. 30 illustrates exemplary synchronized timing between two wireless terminals based on beacon signals in accordance with another exemplary embodiment. Drawing 3002 includes timing structure information with respect to wireless terminal 1, while drawing 3004 includes timing structure information with respect to wireless terminal 2. Drawing 3000 may correspond to FIG. 28 after the wireless terminals have been timing synchronized, e.g., based on wireless terminal 2 detecting a beacon signal from wireless terminal 1. Drawing 3002 includes a wireless terminal 1 beacon receive interval 3006, a wireless terminal 1 beacon transmission interval 3008, a wireless terminal 1 beacon receive time interval 3010, a wireless terminal 1 user data TX/RX interval 3012 and a WT 1 silence interval 3014. Drawing 3004 includes a wireless terminal 2 beacon receive interval 3016, a wireless terminal 2 beacon transmission interval 3018, a wireless terminal 2 beacon receive time interval 3020, a wireless terminal 2 user data TX/RX interval 3022 and a WT 2 silence interval 3024. It should be observed that wireless terminal 2 has adjusted its timing such that when it transmits a beacon signal burst during WT 2 beacon transmit interval 3018, WT 1 will receive the beacon signal burst during its beacon receive interval 3010. It can also be observed that, in this embodiment, following wireless terminal 2's timing adjustment, wireless terminal 2 receives a beacon burst transmitted by wireless terminal 1 during wireless terminal 1 beacon transmission interval 3008 during its beacon receive interval 3016. It should also be observed that there is an overlapping portion of the user data TX/RX regions 3026 which can be used for user data signaling. This approach maintains the same basic timing structure for different wireless terminals, and uses a determined timing shift of one of the wireless terminal's timing to achieve synchronization, and both wireless terminals are able to receive beacon signal bursts from each other, on an ongoing basis following synchronization.

Figure 31:
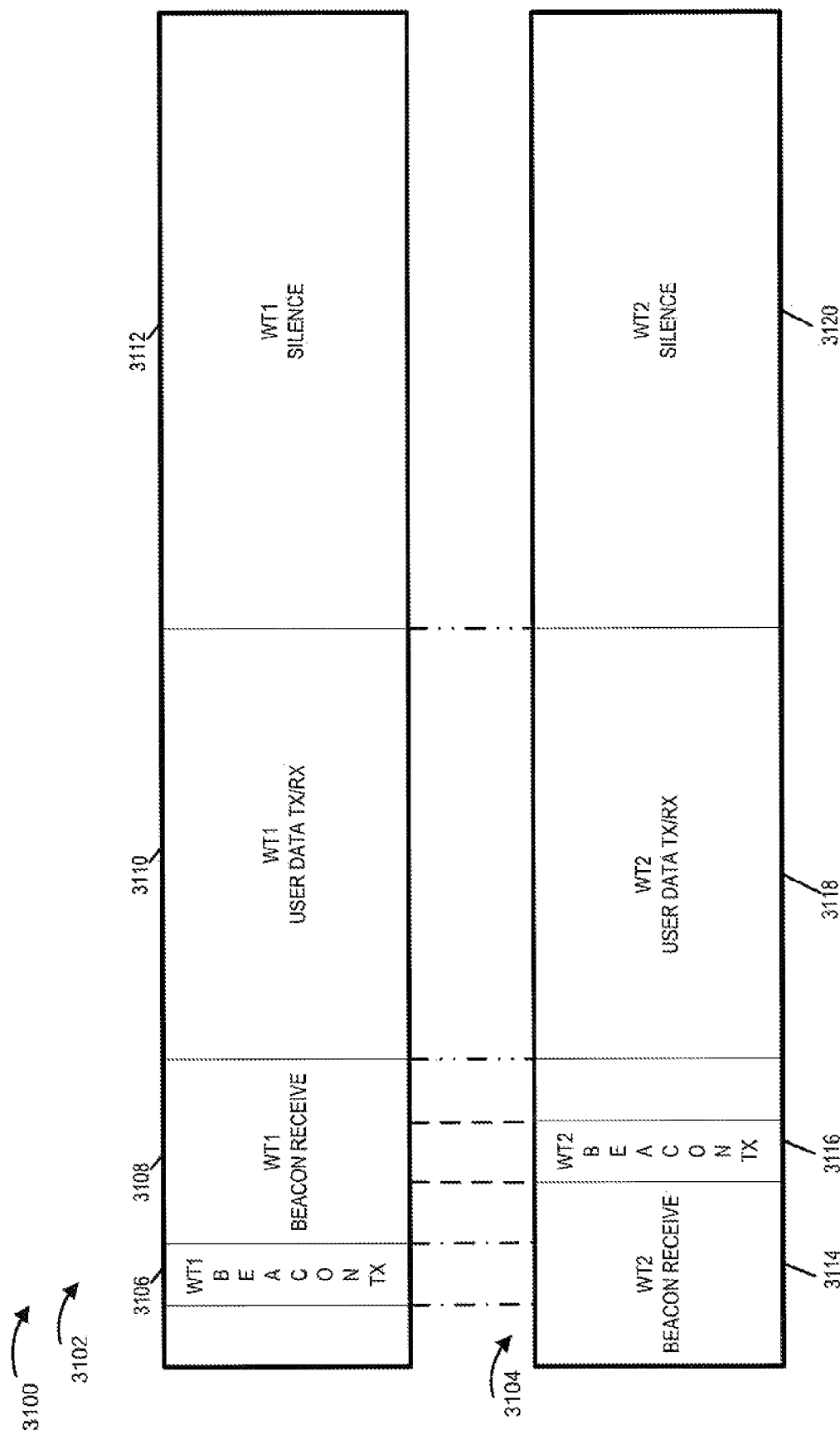
FIG. 31 illustrates exemplary synchronized timing between two wireless terminals based on beacon signals in accordance with another exemplary embodiment.

Drawing 3100 of FIG. 31 illustrates exemplary synchronized timing between two wireless terminals based on beacon signals in accordance with another exemplary embodiment. Drawing 3102 includes timing structure information with respect to wireless terminal 1, while drawing 3104 includes timing structure information with respect to wireless terminal 2. Drawing 3100 may correspond to FIG. 28 after the wireless terminals have been timing synchronized, e.g., based on wireless terminal 2 detecting a beacon signal from wireless terminal 1. Drawing 3102 includes a wireless terminal 1 beacon transmission interval 3106, a wireless terminal 1 beacon receive time interval 3108, a wireless terminal 1 user data TX/RX interval 3110 and a WT 1 silence interval 3112. Drawing 3104 includes a wireless terminal 2 beacon transmission interval 3114, a wireless terminal 2 beacon receive time interval 3116, a wireless terminal 2 user data TX/RX interval 3118 and a WT 2 silence interval 3120. It should be observed that wireless terminal 2 has adjusted its timing such that when it transmits a beacon signal burst during WT 2 beacon transmit interval 3116, WT 1 will receive the beacon signal burst during its beacon receive interval 3108. It can also be observed that, in this embodiment, following wireless terminal 2's timing adjustment, wireless terminal 2 receives a beacon burst transmitted by wireless terminal 1 during wireless terminal 1 beacon transmission interval 3106 during its beacon receive interval 3114. It should also be observed that user data TX/RX intervals 3110, 3118 overlap. This approach uses a different timing structure for the two wireless terminals, e.g., the wireless terminal which performed the first detection of the other beacon and adjusts its internal timing, e.g., WT 2, uses the interval ordering of drawing 3104. In some such cases, upon wireless terminal 2 ending the communications session and entering an inactive state including beacon signal transmission wireless terminal 2 goes to the ordered timing sequence represented by figure 3102.

While described in the context of an OFDM TDD system, the methods and apparatus of various embodiments are applicable to a wide range of communications systems including many non-OFDM, many non-TDD systems, and/or many non-cellular systems.

In various embodiments nodes described herein are implemented using one or more•modules•to perform the•steps corresponding to one or more methods, for example, generating a beacon signal, transmitting a beacon signal, receiving beacon signals, monitoring for beacon signals, recovering information from received beacon signals, determining a timing adjustment, implementing a timing adjustment, changing a mode of operation, initiating a communication session, etc,. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, and floppy disk to control a machine, e.g., general purpose-computer with or without additional hardware, to implement all or portions of the above described methods, e,g., in one or more nodes. Accordingly, among other things, various embodiments are directed to a machine-readable medium including machine executable instructions for causing a machine, e.g., processor and associated hardware, to perform one or more of the steps of the above described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a first wireless terminal comprising:
   transmitting a beacon signal burst during a beacon transmission time period in accordance with a timing structure including said beacon transmission time period and a beacon receive time period which recur in accordance with said timing structure, said beacon receive time period being longer than said beacon transmission time period, said beacon signal burst including one or more beacon symbols, each beacon symbol occupying a beacon symbol transmission unit;
   monitoring for beacon signals from other devices during said beacon receive time period in accordance with said timing structure, said other devices including a second wireless terminal;
   communicating data symbols using OFDM symbol transmission units during a user data time period which occurs in said timing structure following said beacon receive time period, said user data time period being distinct from said beacon receive time period in said timing structure; and
   wherein said timing structure is used by both the first and second wireless terminals but with the start of the timing structure used by the first wireless terminal being offset from the start of the timing of the timing structure used by the second wireless terminal by an amount which is greater than the duration of the beacon transmission time period and less than the duration of the beacon receive time period and the start of the of the beacon transmission time period of the second wireless terminal following the end of the beacon transmission time period of the first wireless terminal by an amount which is less than the duration of the beacon transmission time period.

2. The method of claim 1,
   wherein said beacon symbols each have a duration of 3 or 4 OFDM symbol times;
   the method further comprising:
   providing transmission power used for transmitting the beacon signal burst from a battery power source.

3. The method of claim 1,
   wherein transmitting a beacon signal burst during a beacon transmission time period includes transmitting no transmission power during a majority of beacon symbol transmission time periods in the beacon signal burst, said beacon symbol time periods in which no transmission power is transmitted corresponding to nulls in said beacon signal burst, said nulls occupying the majority of beacon symbol transmission units in the beacon signal burst.

4. The method of claim 3, wherein transmitting a beacon signal burst further includes:
   using a hopping sequence to determine the position of beacon symbols in a time frequency grid.

5. The method of claim 1,
   wherein said beacon transmission time period is an uninterrupted contiguous time period including multiple sequential occurring symbol transmission time periods.

6. The method of claim 5, wherein at least some different beacon signal bursts transmitted in a sequence of beacon signal bursts have periods of different lengths.

7. The method of claim 1, wherein the average per symbol transmission power level of each beacon symbol transmitted during a first period of time is at least 10 dB higher than the average per symbol transmission power level of symbols used to transmit user data during said first period of time.

8. The method of claim 1, wherein said beacon symbols are transmitted using OFDM tone symbols, said beacon symbols occupying less than 1 percent of the tone symbols of a transmission resource used by said wireless terminal during a period of time including multiple beacon signal bursts.

9. The method of claim 8, wherein beacon symbols occupy less than 0.1 percent of the tone symbols in a portion of said period of time, said portion of said period of time including one beacon signal burst and one interval between successive beacon signal bursts.

10. The method of claim 9, further comprising:
    transmitting user data on at least 10 percent of the tone symbols of the transmission resource used by said wireless terminal during said period of time including multiple beacon signal bursts.

11. The method of claim 10, wherein the time duration of a beacon signal burst time period occurring in said period of time is at least 50 times shorter than a time period occurring between two consecutive beacon signal bursts during said period of time.

12. The method of claim 8, wherein the time spacing between beacon signal bursts occurring during a first period including multiple beacon signal bursts is constant with said beacon signal bursts occurring in a periodic manner during said first period of time.

13. The method of claim 12, wherein duration of beacon signal bursts during said first time period is constant.

14. The method of claim 8, wherein the time spacing between beacon signal bursts occurring during a first period including multiple beacon symbol transmission bursts varies, with said beacon symbol bursts occurring during said first period of time in accordance with a predetermined pattern.

15. The method of claim 14, wherein duration of beacon signal bursts during said first time period is constant.

16. The method of claim 14, wherein said predetermined pattern various depending on the wireless terminal performing said transmitting step.

17. The method of claim 16, wherein said predetermined pattern is the same for all wireless terminals in a system.

18. The method of claim 14, wherein said pattern is a pseudo random pattern.

19. The method of claim 1, wherein said first wireless terminal includes an OFDM transmitter which transmits said beacon signal burst and wherein said beacon signal burst is communicated using a resource which is a combination of frequency and time.

20. The method of claim 1, wherein said first wireless terminal includes a CDMA transmitter which transmits said beacon signal burst and wherein said beacon signal burst is communicated using a resource which is a combination of code and time.

21. A portable wireless terminal comprising:
a beacon signal generation module for generating a beacon signal including a sequence of beacon signal bursts, each beacon signal burst including one or more beacon symbols;
a transmission module for transmitting a beacon signal burst during a beacon transmission time period in accordance with a timing structure including said beacon transmission time period and a beacon receive time periods which recur in accordance with said timing structure, using beacon signal transmission units, said beacon receive time period being longer than said beacon transmission time period, each beacon symbol occupying a beacon symbol transmission unit;
a detection module for monitoring and detecting beacon signals from other devices during said beacon receive time period in accordance with said timing structure, said other devices including a second wireless terminal;
wherein said transmission module is configured to transmit data symbols using OFDM symbol transmission units during a user data time period which occurs in said timing structure following said beacon receive time period, said user data time period being distinct from said beacon receive time period in said timing structure; and
wherein the portable wireless terminal is a first wireless terminal, said timing structure is used by both the first and second wireless terminals but with the start of the timing structure used by the first wireless terminal being offset from the start of the timing of the timing structure used by the second wireless terminal by an amount which is greater than the duration of the beacon transmission time period and less than the duration of the beacon receive time period and the start of the of the beacon transmission time period of the second wireless terminal following the end of the beacon transmission time period of the first wireless terminal by an amount which is less than the duration of the beacon transmission time period.

22. The portable wireless terminal of claim 21 further comprising:
a battery power source for providing transmission power used for transmitting the beacon signal burst; and
wherein said beacon symbols each have a duration of 3 or 4 OFDM symbol times.

23. The portable wireless terminal of claim 21, wherein said stored beacon characteristic information identifies which beacon transmission units in a beacon signal burst are to be occupied by intentional nulls, and wherein the majority of beacon symbol transmission units in a transmitted beacon signal burst are to occupied by intentional nulls.

24. The portable wireless terminal of claim 21, further comprising:
a user data signal generation module for generating a user data signal, said user data signal including data symbols, and wherein said transmitter module transmits said user data signal in addition to said beacon signal burst;
a transmission power control module for controlling the transmission power level of beacon symbols and data symbols, and wherein the transmission power control module controls, during a first period of time, the data symbols to be transmitted at an average per symbol power level that is at least 50 percent lower than the average per beacon symbol power level of beacon symbols transmitted during said first period of time.

25. The portable wireless terminal of claim 21, wherein said beacon transmission time period is an uninterrupted contiguous time period including multiple sequential occurring symbol transmission time periods.

26. The portable wireless terminal of claim 25, wherein at least some different beacon signal bursts transmitted in a sequence of beacon signal bursts have periods of different lengths.

27. The portable wireless terminal of claim 21, further comprising:
a transmission power control module, and wherein the transmission power control module controls the average per symbol transmission power level of each beacon symbol transmitted during a first period of time to be at least 10 dB higher than the average per symbol transmission power level of symbols used to transmit user data during said first period of time.

28. The portable wireless terminal of claim 21, wherein said transmission module is an OFDM transmitter, and
wherein said beacon symbols are transmitted using OFDM tone symbols, said beacon symbols occupying less than 1 percent of the tone symbols of a transmission resource used by said wireless terminal during a period of time including multiple beacon signal bursts.

29. The portable wireless terminal of claim 28, wherein beacon symbols occupy less than 0.1 percent of the tone symbols in a portion of said period of time, said portion of said period of time including one beacon signal burst and one interval between successive beacon signal bursts.

30. The portable wireless terminal of claim 29, wherein said transmission module transmits user data in addition to said beacon signal burst, and wherein user data is transmitted on at least 10 percent of the tone symbols of the transmission resource used by said wireless terminal during said period of time including multiple beacon signal bursts.

31. The portable wireless terminal of claim 30, wherein the time duration of a beacon signal burst time period occurring in said period of time is at least 50 times shorter than a time period occurring between two consecutive beacon signal bursts during said period of time.

32. The portable wireless terminal of claim 28, wherein the time spacing between beacon signal bursts occurring during a first period including multiple beacon signal bursts is constant with said beacon signal bursts occurring in a periodic manner during said first period of time.

33. The portable wireless terminal of claim 32, wherein duration of beacon signal bursts during said first time period is constant.

34. The portable wireless terminal of claim 28, further comprising:
memory including stored transmission timing structure information used by the beacon signal generation module to generate said beacon signal, and
wherein the stored transmission timing structure information includes information defining the time spacing between beacon signal bursts occurring during a first period including multiple beacon symbol transmission bursts to vary, with said beacon symbol bursts occurring during said first period of time in accordance with a predetermined pattern.

35. The portable wireless terminal of claim 34,
wherein said memory further includes beacon signal characteristic information used by said beacon signal generation module in generating said beacon signal; and wherein the beacon signal characteristic information defines the duration of beacon signal bursts during said first time period to be constant.

36. The portable wireless terminal of claim 34, wherein said predetermined pattern various depending on the wireless terminal performing said transmitting step.

37. The portable wireless terminal of claim 36, wherein said predetermined pattern is the same for all wireless terminals in a system.

38. The portable wireless terminal of claim 34, wherein said pattern is a pseudo random pattern.

39. The portable wireless terminal of claim 21, wherein said transmission module is an OFDM transmitter which transmits said beacon signal burst and wherein said beacon signal burst is communicated using a resource which is a combination of frequency and time.

40. The portable wireless terminal of claim 21, wherein said transmission module is a CDMA transmitter which transmits said beacon signal burst and wherein said beacon signal burst is communicated using a resource which is a combination of code and time.

41. A portable wireless terminal comprising:
means for generating a beacon signal including a sequence of beacon signal bursts, each beacon signal burst including one or more beacon symbols;
means for transmitting said beacon signal burst during a beacon transmission time period in accordance with a timing structure including said beacon transmission time period and a beacon receive time period which recur in accordance with said timing structure, said beacon receive time period being longer than said beacon transmission time period, said beacon signal burst including one or more beacon symbols, each beacon symbol occupies a beacon symbol transmission unit;
means for monitoring for beacon signals from other devices during said beacon receive time period in accordance with said timing structure, said other devices including a second wireless terminal;
wherein said means for transmitting said beacon signal burst includes means for transmitting data symbols using OFDM symbol transmission units during a user data time period which occurs in said timing structure following said beacon receive time period, said user data time period being distinct from said beacon receive time period in said timing structure; and
wherein the portable wireless terminal is a first wireless terminal, said timing structure is used by both the first and second wireless but with the start of the timing structure used by the first wireless terminal being offset from the start of the timing of the timing structure used by the second wireless terminal by an amount which is greater than the duration of the beacon transmission time period and less than the duration of the beacon receive time period and the start of the of the beacon transmission time period of the second wireless terminal following the end of the beacon transmission time period of the first wireless terminal by an amount which is less than the duration of the beacon transmission time period.

42. The portable wireless terminal of claim 41, further comprising:
means for storing energy for providing transmission power used for transmitting the beacon signal burst; and
wherein said beacon symbols each have a duration of 3 or 4 OFDM symbol times.

43. The portable wireless terminal of claim 41, further comprising:

means for generating a user data signal, said user data signal including data symbols, and wherein said means for transmitting transmits said user data signal in addition to said beacon signal burst;
means for controlling transmission power levels of beacon symbols and data symbols, and wherein the means for controlling transmission power levels controls, during a first period of time, the data symbols to be transmitted at an average per symbol power level that is at least 50 percent lower than the average per beacon symbol power level of beacon symbols transmitted.

44. The portable wireless terminal of claim 41,
wherein said beacon transmission time period is an uninterrupted contiguous time period including multiple sequential occurring symbol transmission time periods.

45. The portable wireless terminal of claim 44, wherein at least some different beacon signal bursts transmitted in a sequence of beacon signal bursts have periods of different lengths.

46. The portable wireless terminal of claim 41, further comprising:
means for controlling transmission power, and wherein the means for controlling transmission power controls the average per symbol transmission power level of each beacon symbol transmitted during a first period of time to be at least 10 dB higher than the average per symbol transmission power level of symbols used to transmit user data during said first period of time.

47. The portable wireless terminal of claim 41, wherein said means for transmitting includes means for performing OFDM transmission, and
wherein said beacon symbols are transmitted using OFDM tone symbols, said beacon symbols occupying less than 1 percent of the tone symbols of a transmission resource used by said wireless terminal during a period of time including multiple beacon signal bursts.

48. A non-transitory computer readable storage medium embodying machine executable instruction for controlling a portable wireless terminal in a wireless communications system, the non-transitory computer readable medium comprising:
instructions for causing the portable wireless terminal to transmit a beacon signal burst during a beacon transmission time period in accordance with a timing structure including said beacon transmission time period and a beacon receive time period which recur in accordance with said timing structure, said beacon receive time period being longer than said beacon transmission time period, said beacon signal burst including one or more beacon symbols, each beacon symbol occupying a beacon symbol transmission unit; and
instructions for causing the portable wireless terminal to monitor for beacon signals from other devices during said beacon receive time period in accordance with said timing structure, said other devices including a second wireless terminal;
instructions for causing the portable wireless terminal to transmit data symbols using OFDM symbol transmission units during a user data time period which occurs in said timing structure following said beacon receive time period, said user data time period being distinct from said beacon receive time period in said timing structure; and
wherein said timing structure is used by both the first and second wireless terminals but with the start of the timing structure used by the first wireless terminal being offset from the start of the timing of the timing structure used by the second wireless terminal by an amount which is greater than the duration of the beacon transmission time period and less than the duration of the beacon receive time period and the start of the of the beacon transmission time period of the second wireless terminal following the end of the beacon transmission time period of the first wireless terminal by an amount which is less than the duration of the beacon transmission time period.

49. The non-transitory computer readable storage medium of claim 48 further embodying machine executable instructions for:
controlling the transmission power level used for transmitting the beacon signal burst, wherein the transmission power is from a battery power source; and
wherein said beacon symbols each have a duration of 3 or 4 OFDM symbol times.

50. The non-transitory computer readable storage medium of claim 48, further embodying machine executable instructions for:
controlling the transmission, during a first time interval, of user data in addition to said beacon symbols, said user data being transmitted using data symbols transmitted at an average per symbol power level that is at least 50 percent lower than the average per beacon symbol power level of beacon symbols transmitted during said first time interval.

51. The non-transitory computer readable storage medium of claim 48, wherein said beacon transmission time period is an uninterrupted contiguous time period including multiple sequential occurring symbol transmission time periods.

52. An apparatus comprising:
a first communications device processor configured to:
control wireless transmission of a beacon signal burst from a first communications device during a beacon transmission time period in accordance with a timing structure including said beacon transmission time period and a beacon receive time period which recur in accordance with said timing structure, said beacon receive time period being longer than said beacon transmission time period, each beacon signal burst including one or more beacon symbols, each beacon symbol occupying a beacon symbol transmission unit;
control monitoring for beacon signals from other devices during said beacon receive time period in accordance with said timing structure, said other devices including a second wireless terminal;
control a transmitter to transmit data symbols using OFDM symbol transmission units during a user data time period which occurs in said timing structure following said beacon receive time period, said user data time period being distinct from said beacon receive time period in said timing structure; and
wherein said timing structure is used by both the first and second communications devices but with the start of the timing structure used by the first communications device being offset from the start of the timing of the timing structure used by the second communications device by an amount which is greater than the duration of the beacon transmission time period used by said first and second communications devices and less than the duration of the beacon receive time period and the start of the of the beacon transmission time period of the second wireless terminal following the end of the beacon transmission time period of the first wireless terminal by an amount which is less than the duration of the beacon transmission time period.

53. The apparatus of claim 52, wherein said processor is further configured to:
control transmission power levels used for transmitting the beacon signal burst, said transmission power being from a battery power source; and
wherein said beacon symbols each have a duration of 3 or 4 OFDM symbol times.

54. The apparatus of claim 52, wherein said processor is further configured to:
control wireless transmission, during a first time interval, of user data in addition to said beacon symbols, said user data being transmitted using data symbols transmitted at an average per symbol power level that is at least 50 percent lower than the average per beacon symbol power level of beacon symbols transmitted during said first time interval.

55. The apparatus of claim 52,
wherein said beacon transmission time period is an uninterrupted contiguous time period including multiple sequential occurring symbol transmission time periods.

56. The method of claim 1, wherein each beacon symbol has a duration longer than the duration of an OFDM symbol transmission unit.

57. The portable wireless terminal of claim 21, wherein each beacon symbol has a duration longer than the duration of an OFDM symbol transmission unit.

58. The portable wireless terminal of claim 41, wherein each beacon symbol has a duration longer than the duration of an OFDM symbol transmission unit.

59. The non-transitory computer readable medium of claim 48, wherein each beacon symbol has a duration longer than the duration of an OFDM symbol transmission unit.

60. The apparatus of claim 52, wherein each beacon symbol has a duration longer than the duration of an OFDM symbol transmission unit.

61. The method of claim 1, wherein said timing structure includes a single beacon receive time period for each beacon transmission time period included in said timing structure.

62. The method of claim 61, wherein each beacon receive time period in said timing structure follows a corresponding beacon transmission time period.

63. The method of claim 1, wherein said beacon signal burst includes two beacon symbols separated in time by a plurality of symbol time periods, no receive time periods occurring between said two beacon symbols.

64. The method of claim 1,
wherein said beacon receive time period immediately follows said beacon transmit time period in said timing structure; and
wherein said user data time period immediately follows said beacon receive time period in said timing structure.

65. The method of claim 1, wherein said user data time period is a time period in which said first wireless terminal can receive user data, the number of user data time periods in said timing structure in which said first wireless terminal can receive user data from another device being the same as the number of beacon receive time periods in said timing structure and wherein the number of beacon transmit time periods in which the first wireless terminal can transmit is equal to said number of user data time periods in said timing structure in which the first wireless terminal can receive user data, said user data time period being a distinct time period which does not overlap said beacon receive time period.

66. The method of claim 1,
wherein said timing structure includes the beacon transmission time period which is immediately followed by the beacon receive time, the beacon receive time period being immediately followed by said user data time period, said user data time period being immediately followed by a silence time period; and wherein said recurring timing structure includes a single one of each of said beacon transmission time period, said beacon receive time period, said user data time periods and said silence time period.

67. The method of claim 5, wherein said beacon transmission time period does not include a beacon receive time period or a user data receive time period.

68. The method of claim 1, wherein each time period defined in said timing structure used by the first and second wireless terminals is of the same duration for the first and second wireless terminals.

* * * * *